US012628061B2

(12) United States Patent
Zhu et al.

(10) Patent No.: US 12,628,061 B2
(45) Date of Patent: May 12, 2026

(54) SIGNALING FOR A USER EQUIPMENT MOBILITY PREDICTION

(71) Applicant: QUALCOMM Incorporated, San Diego, CA (US)

(72) Inventors: Xipeng Zhu, San Diego, CA (US); Ajay Gupta, San Diego, CA (US); Gavin Bernard Horn, La Jolla, CA (US); Taesang Yoo, San Diego, CA (US); Rajeev Kumar, San Diego, CA (US); Shankar Krishnan, San Diego, CA (US); Eren Balevi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 17/804,720

(22) Filed: May 31, 2022

(65) Prior Publication Data
US 2023/0388888 A1 Nov. 30, 2023

(51) Int. Cl.
| | |
|---|---|
| *H04W 36/32* | (2009.01) |
| *H04W 36/00* | (2009.01) |
| *H04W 76/30* | (2018.01) |

(52) U.S. Cl.
CPC ....... *H04W 36/32* (2013.01); *H04W 36/0033* (2013.01); *H04W 36/008375* (2023.05); *H04W 76/30* (2018.02)

(58) Field of Classification Search
CPC ............. H04W 36/32; H04W 36/0033; H04W 36/008375; H04W 36/322; H04W 36/324; H04W 76/30
See application file for complete search history.

(56) References Cited

U.S. PATENT DOCUMENTS

| | | | | |
|---|---|---|---|---|
| 2014/0254550 A1* | 9/2014 | Salvador | ....... | H04W 36/008375 370/331 |
| 2015/0038180 A1* | 2/2015 | Quick, Jr. | ............. | H04W 72/51 455/458 |
| 2016/0345160 A1* | 11/2016 | Diachina | ................. | H04W 8/00 |
| 2017/0169356 A1* | 6/2017 | Dousse | ................. | G06Q 10/10 |
| 2019/0215798 A1* | 7/2019 | Kim | .................... | H04W 68/005 |

(Continued)

OTHER PUBLICATIONS

Alcatel-Lucent Shanghai Bell, et al., "RAN3 Related Parameters for SDDTE CN-Assistance Procedure (Solution 5.1.2.3.1)", 3GPP TSG-RAN WG3#82, R3-132159, 3rd Generation Partnership Project, Mobile Competence Centre, 650, Route Des Lucioles, F-06921 Sophia-Antipolis Cedex, France, vol. RAN WG3, No. San Francisco, USA, Nov. 11, 2013-Nov. 15, 2013, Nov. 12, 2013, XP050738230, pp. 1-3, Paragraph [0003]-Paragraph [0004].

(Continued)

*Primary Examiner* — Christopher M Brandt
(74) *Attorney, Agent, or Firm* — Harrity & Harrity, LLP/QUALCOMM Incorporated

(57) ABSTRACT

Various aspects of the present disclosure generally relate to wireless communication. In some aspects, a first network node in a radio access network (RAN) may transmit mobility history data for a user equipment (UE) to a second network node in a core network associated with the RAN. The first network node may receive a UE mobility prediction model that is based at least in part on the mobility history data from the second network node. Numerous other aspects are described.

34 Claims, 32 Drawing Sheets

(56)  References Cited

U.S. PATENT DOCUMENTS

| | | | | |
|---|---|---|---|---|
| 2019/0239191 A1* | 8/2019 | Zee | ......................... | H04W 68/02 |
| 2022/0345963 A1* | 10/2022 | Casati | ................... | H04W 60/00 |
| 2024/0205101 A1* | 6/2024 | Soldati | .................... | H04L 41/16 |
| 2024/0214859 A1* | 6/2024 | Chen | ...................... | H04W 24/02 |
| 2024/0251258 A1* | 7/2024 | Monteiro | .............. | H04W 36/32 |
| 2024/0357551 A1* | 10/2024 | Shi | ...................... | H04W 68/025 |
| 2024/0381199 A1* | 11/2024 | Xu | .................... | H04W 36/0085 |

OTHER PUBLICATIONS

AT&T: "Use Cases and Requirements for Artificial Intelligence in RAN", 3GPP TSG-RAN WG3 #112-e, R3-212389, 3rd Generation Partnership Project, Mobile Competence Centre, 650, Route Des Lucioles, F-06921 Sophia-Antipolis Cedex, France, vol. RAN WG3, No. Online, May 17, 2021-May 27, 2021, May 7, 2021, XP052002435, 6 pages, Paragraph [0002]-Paragraph [0003].
International Search Report and Written Opinion—PCT/US2023/023143—ISA/EPO—Aug. 18, 2023.
Qualcomm Incorporated: "TP for Mobility Optimization", 3GPP TSG-RAN WG3 #115-e, R3-221846, 3rd Generation Partnership Project, Mobile Competence Centre, 650, Route Des Lucioles, F-06921 Sophia-Antipolis Cedex, France, vol. RAN WG3, No. Online, Feb. 21, 2022-Mar. 3, 2022, Feb. 11, 2022, XP052107701, 7 pages, Paragraph [5.3.2].

* cited by examiner

1100

1110 Transmit mobility history data for a user equipment (UE) to a second network node in a core network associated with a RAN 1120 Receive a UE mobility prediction model that is based at least in part on the mobility history data from the second network node 1210 Transmit mobility history data for a user equipment (UE) to a second network node in a core network associated with a RAN 1220 Receive updated long-term mobility history data that is based at least in part on the mobility history data from the second network node

1200

Transmit mobility history data for a user equipment (UE) to a second network node in a disaggregated RAN

1310

Receive a UE mobility prediction model that is based at least in part on the mobility history data from the second network node

1320

1300

Transmit mobility history data for a user equipment (UE) to a second network node in a disaggregated RAN

1410

Receive updated long-term mobility history data that is based at least in part on the mobility history data from the second network node

1420

1400

1510 Receive mobility history data associated with a user equipment (UE)

1520 Transmit the mobility history data to a second network node in a core network for use in training a UE mobility prediction model

1500

1610  Receive a user equipment (UE) mobility prediction model

1620  Transmit the UE mobility prediction model to a second network node in a core network for storage at the second network node

1600

1710 Receive mobility history data associated with a user equipment (UE) from a second network node in a core network 1720 Train a UE mobility prediction model based at least in part on the mobility history data

1700

1810 Receive mobility history data associated with a user equipment (UE) from a second network node in a core network 1820 Update long-term mobility history data associated with the UE based at least in part on the mobility history data 1830 Store the updated long-term mobility history data at the first network node

1800

1900

1910   Receive mobility history data associated with a user equipment (UE) from a second network node in a disaggregated RAN 1920   Train a UE mobility prediction model based at least in part on the mobility history data Receive mobility history data associated with a user equipment (UE) from a second network node in a disaggregated RAN Update long-term mobility history data associated with the UE based at least in part on the mobility history data Store the updated long-term mobility history data at the first network node

2010

2020

2030

2000

SIGNALING FOR A USER EQUIPMENT MOBILITY PREDICTION

INTRODUCTION

Aspects of the present disclosure generally relate to wireless communication and to techniques and apparatuses for wireless communication signaling.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network node that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network node in a radio access network (RAN). The method may include transmitting mobility history data for a user equipment (UE) to a second network node in a core network associated with the RAN. The method may include receiving a UE mobility prediction model that is based at least in part on the mobility history data from the second network node.

Some aspects described herein relate to a method of wireless communication performed by a first network node in a RAN. The method may include transmitting mobility history data for a UE to a second network node in a core network associated with the RAN. The method may include receiving updated long-term mobility history data that is based at least in part on the mobility history data from the second network node.

Some aspects described herein relate to a method of wireless communication performed by a first network node in a disaggregated RAN. The method may include transmitting mobility history data for a UE to a second network node in the disaggregated RAN. The method may include receiving a UE mobility prediction model that is based at least in part on the mobility history data from the second network node.

Some aspects described herein relate to a method of wireless communication performed by a first network node in a disaggregated RAN. The method may include transmitting mobility history data for a UE to a second network node in the disaggregated RAN. The method may include receiving updated long-term mobility history data that is based at least in part on the mobility history data from the second network node.

Some aspects described herein relate to a method of wireless communication performed by a first network node in a core network. The method may include receiving mobility history data associated with a UE. The method may include transmitting the mobility history data to a second network node in the core network for use in training a UE mobility prediction model.

Some aspects described herein relate to a method of wireless communication performed by a first network node in a core network. The method may include receiving a UE mobility prediction model. The method may include transmitting the UE mobility prediction model to a second network node in the core network for storage at the second network node.

Some aspects described herein relate to a method of wireless communication performed by a first network node in a core network. The method may include receiving mobility history data associated with a UE from a second network node in the core network. The method may include training a UE mobility prediction model based at least in part on the mobility history data.

Some aspects described herein relate to a method of wireless communication performed by a first network node in a core network. The method may include receiving mobility history data associated with a UE from a second network node in the core network. The method may include updating long-term mobility history data associated with the UE based at least in part on the mobility history data. The method may include storing the updated long-term mobility history data at the first network node.

Some aspects described herein relate to a method of wireless communication performed by a first network node in a disaggregated RAN. The method may include receiving mobility history data associated with a UE from a second network node in the disaggregated RAN. The method may include training a UE mobility prediction model based at least in part on the mobility history data.

Some aspects described herein relate to a method of wireless communication performed by a first network node in a disaggregated RAN. The method may include receiving mobility history data associated with a UE from a second network node in the disaggregated RAN. The method may include updating long-term mobility history data associated with the UE based at least in part on the mobility history data. The method may include storing the updated long-term mobility history data at the first network node.

Some aspects described herein relate to a first network node for wireless communication. The first network node may include a memory and one or more processors coupled to the memory. The one or more processors may be configured to transmit mobility history data for a UE to a second network node in a core network associated with a RAN, the first network node being configured to operate in the RAN. The one or more processors may be configured to receive a UE mobility prediction model that is based at least in part on the mobility history data from the second network node.

Some aspects described herein relate to a first network node for wireless communication. The first network node may include a memory and one or more processors coupled to the memory. The one or more processors may be configured to transmit mobility history data for a UE to a second network node in a core network associated with a RAN, the first network node being configured to operate in the RAN. The one or more processors may be configured to receive updated long-term mobility history data that is based at least in part on the mobility history data from the second network node.

Some aspects described herein relate to a first network node for wireless communication. The first network node may include a memory and one or more processors coupled to the memory. The one or more processors may be configured to transmit mobility history data for a UE to a second network node in a disaggregated RAN, the first network node being configured to operate in the RAN. The one or more processors may be configured to receive a UE mobility prediction model that is based at least in part on the mobility history data from the second network node.

Some aspects described herein relate to a first network node for wireless communication. The first network node may include a memory and one or more processors coupled to the memory. The one or more processors may be configured to receive mobility history data associated with a UE. The one or more processors may be configured to transmit the mobility history data to a second network node in a core network for use in training a UE mobility prediction model, the first network node being configured to operate in the core network.

Some aspects described herein relate to a first network node for wireless communication. The first network node may include a memory and one or more processors coupled to the memory. The one or more processors may be configured to receive mobility history data associated with a UE. The one or more processors may be configured to transmit the mobility history data to a second network node in a core network for use in training a UE mobility prediction model, the first network node being configured to operate in the core network.

Some aspects described herein relate to a first network node for wireless communication. The first network node may include a memory and one or more processors coupled to the memory. The one or more processors may be configured to receive mobility history data associated with a UE from a second network node in a core network, the first network node being configured to operate in the core network. The one or more processors may be configured to train a UE mobility prediction model based at least in part on the mobility history data.

Some aspects described herein relate to a first network node for wireless communication. The first network node may include a memory and one or more processors coupled to the memory. The one or more processors may be configured to receive mobility history data associated with a UE from a second network node in a core network, the first network node being configured to operate in the core network. The one or more processors may be configured to update long-term mobility history data associated with the UE based at least in part on the mobility history data. The one or more processors may be configured to store the updated long-term mobility history data at the first network node.

Some aspects described herein relate to a first network node for wireless communication. The first network node may include a memory and one or more processors coupled to the memory. The one or more processors may be configured to receive mobility history data associated with a UE from a second network node in a core network, the first network node being configured to operate in the core network. The one or more processors may be configured to update long-term mobility history data associated with the UE based at least in part on the mobility history data. The one or more processors may be configured to store the updated long-term mobility history data at the first network node.

Some aspects described herein relate to a first network node for wireless communication. The first network node may include a memory and one or more processors coupled to the memory. The one or more processors may be configured to receive mobility history data associated with a UE from a second network node in a disaggregated RAN, the first network node being configured to operate in the disaggregated RAN. The one or more processors may be configured to train a UE mobility prediction model based at least in part on the mobility history data.

Some aspects described herein relate to a first network node for wireless communication. The first network node may include a memory and one or more processors coupled to the memory. The one or more processors may be configured to receive mobility history data associated with a UE from a second network node in a disaggregated RAN, the first network node being configured to operate in the disaggregated RAN. The one or more processors may be configured to update long-term mobility history data associated with the UE based at least in part on the mobility history data. The one or more processors may be configured to store the updated long-term mobility history data at the first network node.

Some aspects described herein relate to a non-transitory computer-readable medium that stores a set of instructions for wireless communication by a first network node. The set of instructions, when executed by one or more processors of the first network node, may cause the first network node to transmit mobility history data for a UE to a second network node in a core network associated with a RAN, the first network node being configured to operate in the RAN. The set of instructions, when executed by one or more processors of the first network node, may cause the first network node to receive a UE mobility prediction model that is based at least in part on the mobility history data from the second network node.

Some aspects described herein relate to a non-transitory computer-readable medium that stores a set of instructions for wireless communication by a first network node. The set of instructions, when executed by one or more processors of the first network node, may cause the first network node to transmit mobility history data for a UE to a second network node in a core network associated with a RAN, the first network node being configured to operate in the RAN. The set of instructions, when executed by one or more processors of the first network node, may cause the first network node to receive updated long-term mobility history data that is based at least in part on the mobility history data from the second network node.

Some aspects described herein relate to a non-transitory computer-readable medium that stores a set of instructions for wireless communication by a first network node. The set of instructions, when executed by one or more processors of the first network node, may cause the first network node to transmit mobility history data for a UE to a second network node in a disaggregated RAN in which the first network node being configured to operate. The set of instructions, when executed by one or more processors of the first network node, may cause the first network node to receive a UE mobility prediction model that is based at least in part on the mobility history data from the second network node.

Some aspects described herein relate to a non-transitory computer-readable medium that stores a set of instructions for wireless communication by a first network node. The set of instructions, when executed by one or more processors of the first network node, may cause the first network node to transmit mobility history data for a UE to a second network node in a disaggregated RAN, the first network node being configured to operate in the disaggregated RAN. The set of instructions, when executed by one or more processors of the first network node, may cause the first network node to receive updated long-term mobility history data that is based at least in part on the mobility history data from the second network node.

Some aspects described herein relate to a non-transitory computer-readable medium that stores a set of instructions for wireless communication by a first network node. The set of instructions, when executed by one or more processors of the first network node, may cause the first network node to receive mobility history data associated with a UE. The set of instructions, when executed by one or more processors of the first network node, may cause the first network node to transmit the mobility history data to a second network node in a core network for use in training a UE mobility prediction model, the first network node being configured to operate in the core network.

Some aspects described herein relate to a non-transitory computer-readable medium that stores a set of instructions for wireless communication by a first network node. The set of instructions, when executed by one or more processors of the first network node, may cause the first network node to receive a UE mobility prediction model. The set of instructions, when executed by one or more processors of the first network node, may cause the first network node to transmit the UE mobility prediction model to a second network node in a core network for storage at the second network node, the first network node being configured to operate in the core network.

Some aspects described herein relate to a non-transitory computer-readable medium that stores a set of instructions for wireless communication by a first network node. The set of instructions, when executed by one or more processors of the first network node, may cause the first network node to receive mobility history data associated with a UE from a second network node in a core network, the first network node being configured to operate in the core network. The set of instructions, when executed by one or more processors of the first network node, may cause the first network node to train a UE mobility prediction model based at least in part on the mobility history data.

Some aspects described herein relate to a non-transitory computer-readable medium that stores a set of instructions for wireless communication by a first network node. The set of instructions, when executed by one or more processors of the first network node, may cause the first network node to receive mobility history data associated with a UE from a second network node in a core network, the first network node being configured to operate in the core network. The set of instructions, when executed by one or more processors of the first network node, may cause the first network node to update long-term mobility history data associated with the UE based at least in part on the mobility history data. The set of instructions, when executed by one or more processors of the first network node, may cause the first network node to store the updated long-term mobility history data at the first network node.

Some aspects described herein relate to a non-transitory computer-readable medium that stores a set of instructions for wireless communication by a first network node. The set of instructions, when executed by one or more processors of the first network node, may cause the first network node to receive mobility history data associated with a UE from a second network node in a disaggregated RAN, the first network node being configured to operate in the disaggregated RAN. The set of instructions, when executed by one or more processors of the first network node, may cause the first network node to train a UE mobility prediction model based at least in part on the mobility history data.

Some aspects described herein relate to a non-transitory computer-readable medium that stores a set of instructions for wireless communication by a first network node. The set of instructions, when executed by one or more processors of the first network node, may cause the first network node to receive mobility history data associated with a UE from a second network node in a disaggregated RAN, the first network node being configured to operate in the disaggregated RAN. The set of instructions, when executed by one or more processors of the first network node, may cause the first network node to update long-term mobility history data associated with the UE based at least in part on the mobility history data. The set of instructions, when executed by one or more processors of the first network node, may cause the first network node to store the updated long-term mobility history data at the first network node.

Some aspects described herein relate to a first apparatus for wireless communication. The first apparatus includes means for transmitting mobility history data for a UE to a second apparatus in a core network associated with a RAN, the first apparatus being configured to operate in the RAN. The first apparatus includes means for receiving a UE mobility prediction model that is based at least in part on the mobility history data from the second apparatus.

Some aspects described herein relate to a first apparatus for wireless communication. The first apparatus includes means for transmitting mobility history data for a UE to a second apparatus in a core network associated with a RAN, in the first apparatus being configured to operate in the RAN. The first apparatus includes means for receiving updated long-term mobility history data that is based at least in part on the mobility history data from the second apparatus.

Some aspects described herein relate to a first apparatus for wireless communication. The first apparatus includes means for transmitting mobility history data for a UE to a second apparatus in a disaggregated RAN, the first apparatus being configured to operate in the disaggregated RAN. The first apparatus includes means for receiving a UE mobility prediction model that is based at least in part on the mobility history data from the second network node.

Some aspects described herein relate to a first apparatus for wireless communication. The first apparatus includes means for transmitting mobility history data for a UE to a second apparatus in the disaggregated RAN. The first apparatus includes means for receiving updated long-term mobility history data that is based at least in part on the mobility history data from the second network node.

Some aspects described herein relate to a first apparatus for wireless communication. The first apparatus includes means for receiving mobility history data associated with a UE. The first apparatus includes means for transmitting the mobility history data to a second network node in the core network for use in training a UE mobility prediction model.

Some aspects described herein relate to a first apparatus for wireless communication. The first apparatus includes means for receiving a UE mobility prediction model. The first apparatus includes means for transmitting the UE mobility prediction model to a second apparatus in a core network for storage at the second network node, the first apparatus being configured to operate in the core network.

Some aspects described herein relate to a first apparatus for wireless communication. The first apparatus includes means for receiving mobility history data associated with a UE from a second apparatus in a core network, the first apparatus being configured to operate in the core network. The first apparatus includes means for training a UE mobility prediction model based at least in part on the mobility history data.

Some aspects described herein relate to a first apparatus for wireless communication. The first apparatus includes means for receiving mobility history data associated with a UE from a second apparatus in a core network, the first apparatus being configured to operate in the core network. The first apparatus includes means for updating long-term mobility history data associated with the UE based at least in part on the mobility history data. The first apparatus includes means for storing the updated long-term mobility history data at the first apparatus.

Some aspects described herein relate to a first apparatus for wireless communication. The first apparatus includes means for receiving mobility history data associated with a UE from a second apparatus in a disaggregated RAN, the first apparatus being configured to operate in the disaggregated RAN. The first apparatus includes means for training a UE mobility prediction model based at least in part on the mobility history data.

Some aspects described herein relate to a first apparatus for wireless communication. The first apparatus includes means for receiving mobility history data associated with a UE from a second apparatus in a disaggregated RAN, the first apparatus being configured to operate in the disaggregated RAN. The first apparatus includes means for updating long-term mobility history data associated with the UE based at least in part on the mobility history data. The first apparatus includes means for storing the updated long-term mobility history data at the first network node. The first apparatus includes means for transmitting the updated long-term mobility history data to the second apparatus during a handover procedure for the UE.

Aspects generally include a method, apparatus, system, computer program product, non-transitory computer-readable medium, user equipment, network node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
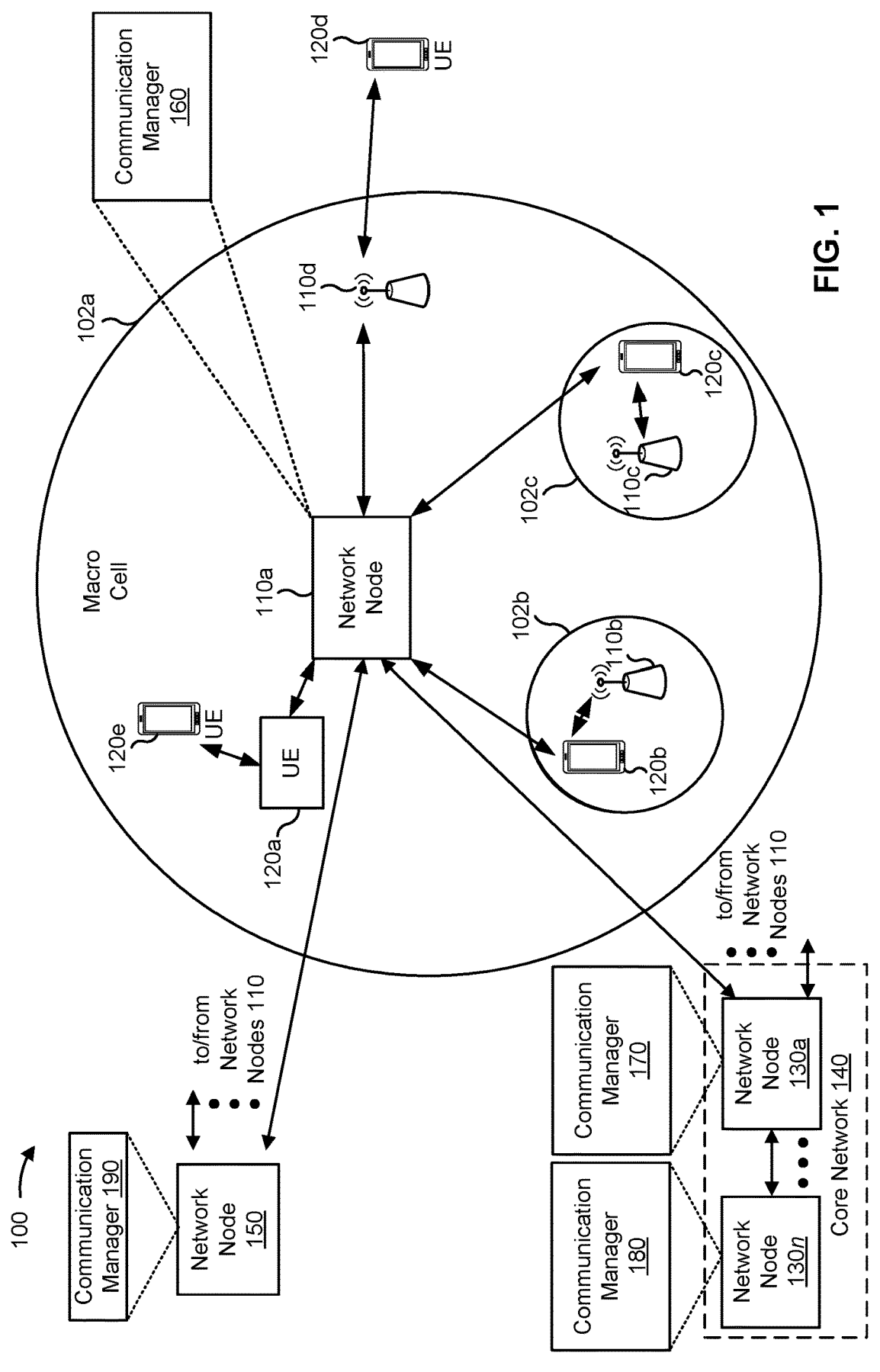
FIG. 1 is a diagram illustrating an example of a wireless network, in accordance with the present disclosure.

Various aspects of wireless communication between a user equipment (UE) and a wireless network may be affected by mobility of the UE. In some cases, mobility of a UE may affect the handover performance of a UE. For example, a serving network node may not know which direction(s) the UE will travel in, may not know which destination(s) they UE may travel to, and/or may be unaware of other mobility-related events associated with the UE. In these cases, mobility-related failures can occur for the UE, such as a radio link failure due to the UE being handed over to a target network node that is away from the direction that the UE eventually travels in, or due to a handover procedure for the UE being initiated too late. Moreover, the UE may be handed over too early due to mobility of the UE, thereby increasing a quantity of handover procedures for the UE, which increases the consumption of processing resources, memory resources, battery resources, and/or radio resources for the UE. In some cases, mobility of a UE may affect resource usage, network loading, and/or energy consumption, among other examples.

In some cases, mobility history data may be stored outside of a core network in an operations, maintenance, and management (OAM) system, in a minimization of drive test (MDT) system, and/or in a self-organizing network (SON) system to facilitate determining a mobility prediction for a UE. An OAM system may include one or more devices configured to maintain a wireless network, to schedule and perform maintenance for the wireless network, and/or to manage other offline aspects of the wireless network. An MDT system may include one or more components that are configured to receive and store drive test data. Storage of mobility history data in these systems may be manual and not continuous. These the mobility history data in these systems may not be the most up-to-date mobility history data, which can result in slow and inaccurate UE mobility predictions.

Some aspects described herein provide radio access network (RAN) and core network signaling for supporting a UE mobility prediction for a UE. A UE mobility prediction may include an estimation or prediction of a future location (e.g., a future target cell) of a UE and an associated probability for the UE being at the future location at a particular time. According to one or more aspects, a network node may use a UE mobility prediction to support various use cases while accounting for key random aspects (e.g., random aspects that can affect service continuity for the UE), such as UE mobility, incoming traffic, and/or channel and coverage, among other examples. For example, a network node may use a UE mobility prediction to facilitate smart handover for a UE, including candidate target cell identification, conditional handover (CHO) target selection, measurement configuration, and/or radio link failure (RLF) recovery, among other examples. As another example, a network node may use a UE mobility prediction to facilitate resource allocation for a UE, load balancing for a UE, and/or energy saving for a UE, among other examples.

As described herein, according to one or more examples, signaling between network nodes in a RAN of a wireless network and a core network associated with the wireless network may be used to share and exchange mobility history data that can be used to generate a UE mobility prediction and/or to build, train, and/or update a UE mobility prediction model in the core network for generating the UE mobility prediction. Mobility history data associated with a UE may include data associated with the UE's movement, location, and the associated times. According to one or more aspects, the mobility history data may be transferred between a network node in the RAN and a network node in the core network using RAN to core network signaling, and/or between network nodes in the core network using intra core network signaling or core network to model repository signaling to facilitate storage and aggregation of the mobility history data in the core network.

A model that is configured to be used for generating or determining a UE mobility prediction is referred to herein as a UE mobility prediction model. Mobility history data associated with a UE may include recent (or short-term) mobility history data and long-term mobility history data, among other examples. Recent mobility history data includes mobility history data that is collected for a UE over a short and recent time period such as over the past 12 hours or the past 24 hours, for example. Recent mobility history data may include mobility history data indicating the UE's locations during the recent time period, the times and durations when the UE was at those locations, starting locations and ending locations for movement of the UE during the recent time period, routes traversed by the UE during the recent time period, and/or other mobility history data. Long-term mobility history data includes mobility history data that is collected and aggregated for a UE over a long time duration such as several months to one year or more. Generally, long-term mobility history includes mobility history data that is collected for a time duration that is sufficient to identify and/or determine a UE's typical routes, destinations, movement habits, and/or other mobility events that are stable and repeatable over a long duration.

Storing the mobility history data in the core network as opposed to outside the core network (e.g., in an OAM system, in an MDT system, and/or in a SON system, for example) enables the UE mobility prediction models that are used to generate or determine UE mobility predictions to be continuously trained and refined in an automatic manner. Storing the mobility history data and maintaining the UE mobility prediction models in the core network, as described herein, ensures that the UE mobility prediction models are up-to-date and accurate, which enables the determination and generation of highly accurate UE mobility predictions. More accurate UE mobility predictions based on these trained and refined UE mobility prediction models (e.g., trained and refined using the signaling described herein) enable more accurate and efficient candidate target cell identification, more accurate and efficient CHO target selection, more accurate and efficient measurement configuration, and/or more accurate and efficient RLF recovery, among other examples.

Accordingly, the signaling for mobility history data transfer described herein may enable more efficient resource usage for a UE (e.g., fewer time domain and/or frequency domain resources may be wasted). Moreover, the signaling for mobility history data transfer described herein may enable more accurate load balancing for a UE by performing load balancing for the UE using a more accurate UE mobility prediction that is generated using a UE mobility prediction model that is trained using the mobility history data. Moreover, the signaling for mobility history data transfer described herein may enable reduced energy consumption for a UE for increased energy saving by configuring power saving features for the UE using a more accurate UE mobility prediction that is generated using a UE mobility prediction model that is trained using the mobility history data. Moreover, the signaling for mobility history data transfer described herein may enable decreases in coverage drops for a UE (e.g., during a handover) by performing handovers for the UE using a more accurate UE mobility prediction that is generated using a UE mobility prediction model that is trained using the mobility history data. Moreover, the signaling for mobility history data transfer described herein may enable reduced RLF recovery times for a UE by maintaining coverage for the UE using a more accurate UE mobility prediction that is generated using a UE mobility prediction model that is trained using the mobility history data.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120.

A network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used.

In some aspects, the term "network node" or "network entity" may refer to an aggregated base station, a disaggregated base station (e.g., described in connection with FIG. 3), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, a Service Management and Orchestration (SMO) node, or a combination thereof. In some aspects, the term "base station," "network node," or "network entity" may refer to one device configured to perform one or more functions, such as those described herein in connection with a network node 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro base station. A network node 110 for a pico cell may be referred to as a pico base station. A network node 110 for a femto cell may be referred to as a femto base station or an in-home base station. In the example shown in FIG. 1, the network node 110a may be a macro base station for a macro cell 102a, the network node 110b may be a pico base station for a pico cell 102b, and the network node 110c may be a femto base station for a femto cell 102c. A network node may support one or multiple (e.g., three) cells.

In some examples, a cell may not necessarily be stationary, and the geographic area of the cell may move according to the location of a network node 110 that is mobile (e.g., a mobile base station). In some examples, the network nodes 110 may be interconnected to one another and/or to one or more other network nodes 110 in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network node 110 or a UE 120) and send a transmission of the data to a downstream station (e.g., a UE 120 or a network node 110). A relay station may be a UE 120 that can relay transmissions for other UEs 120. In the example shown in FIG. 1, the network node 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay, or the like.

The wireless network 100 may be a heterogeneous network that includes network nodes 110 of different types, such as macro base stations, pico base stations, femto base stations, relay base stations, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A plurality of network nodes 130a-130n may be included in a core network 140 associated with the wireless network 100. A network node 130 may couple to or communicate with a set of network nodes 110 and may provide coordination and control for these network nodes 110. The network node 130 may communicate with the network nodes 110 via a backhaul communication link. The network nodes 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In a disaggregated RAN deployment, where at least a portion of the wireless network 100 includes disaggregated network nodes 110 (or disaggregated base stations), the wireless network 100 may include additional network nodes 150 for open-RAN functionality. The network nodes 150 may include, for example, a non-RT RIC, a near-RT RIC, an SMO node, and/or another type of open-RAN node.

In some aspects, a network node 110 may include a communication manager 160. As described in more detail elsewhere herein, the communication manager 160 may transmit mobility history data for a UE to a second network node in a core network associated with the RAN; and receive a UE mobility prediction model that is based at least in part on the mobility history data from the second network node.

Additionally, or alternatively, the communication manager 160 may perform one or more other operations described herein.

In some aspects, a network node 110 may include a communication manager 160. As described in more detail elsewhere herein, the communication manager 160 may transmit mobility history data for a UE to a second network node in a core network associated with the RAN; and receive updated long-term mobility history data that is based at least in part on the mobility history data from the second network node. Additionally, or alternatively, the communication manager 160 may perform one or more other operations described herein.

In some aspects, a network node 110 may include a communication manager 160. As described in more detail elsewhere herein, the communication manager 160 may transmit mobility history data for a UE to a second network node in the disaggregated RAN; and receive a UE mobility prediction model that is based at least in part on the mobility history data from the second network node. Additionally, or alternatively, the communication manager 160 may perform one or more other operations described herein.

In some aspects, a network node 110 may include a communication manager 160. As described in more detail elsewhere herein, the communication manager 160 may transmit mobility history data for a UE to a second network node in the disaggregated RAN; and receive updated long-term mobility history data that is based at least in part on the mobility history data from the second network node. Additionally, or alternatively, the communication manager 160 may perform one or more other operations described herein.

In some aspects, a network node 130 may include a communication manager 170. As described in more detail elsewhere herein, the communication manager 170 may receive mobility history data associated with a UE; and transmit the mobility history data to a second network node in the core network for use in training a UE mobility prediction model. Additionally, or alternatively, the communication manager 170 may perform one or more other operations described herein.

In some aspects, a network node 130 may include a communication manager 170. As described in more detail elsewhere herein, the communication manager 170 may receive a UE mobility prediction model; and transmit the UE mobility prediction model to a second network node in the core network for storage at the second network node. Additionally, or alternatively, the communication manager 170 may perform one or more other operations described herein.

In some aspects, a network node 130 may include a communication manager 180. As described in more detail elsewhere herein, the communication manager 180 may receive mobility history data associated with a UE from a second network node in the core network; and train a UE mobility prediction model based at least in part on the mobility history data. Additionally, or alternatively, the communication manager 180 may perform one or more other operations described herein.

In some aspects, a network node 130 may include a communication manager 180. As described in more detail elsewhere herein, the communication manager 180 may receive mobility history data associated with a UE from a second network node in the core network; update long-term mobility history data associated with the UE based at least in part on the mobility history data; and store the updated long-term mobility history data at the first network node.

Additionally, or alternatively, the communication manager 180 may perform one or more other operations described herein.

In some aspects, a network node 130 may include a communication manager 170. As described in more detail elsewhere herein, the communication manager 190 may receive mobility history data associated with a UE from a second network node in the disaggregated RAN; and train a UE mobility prediction model based at least in part on the mobility history data. Additionally, or alternatively, the communication manager 190 may perform one or more other operations described herein.

In some aspects, a network node 10 may include a communication manager 190. As described in more detail elsewhere herein, the communication manager 190 may receive mobility history data associated with a UE from a second network node in the disaggregated RAN; update long-term mobility history data associated with the UE based at least in part on the mobility history data; and store the updated long-term mobility history data at the first network node. Additionally, or alternatively, the communication manager 190 may perform one or more other operations described herein.

As indicated above, FIG. 1 is provided as an example. Other examples may differ from what is described with regard to FIG. 1.

Figure 2:
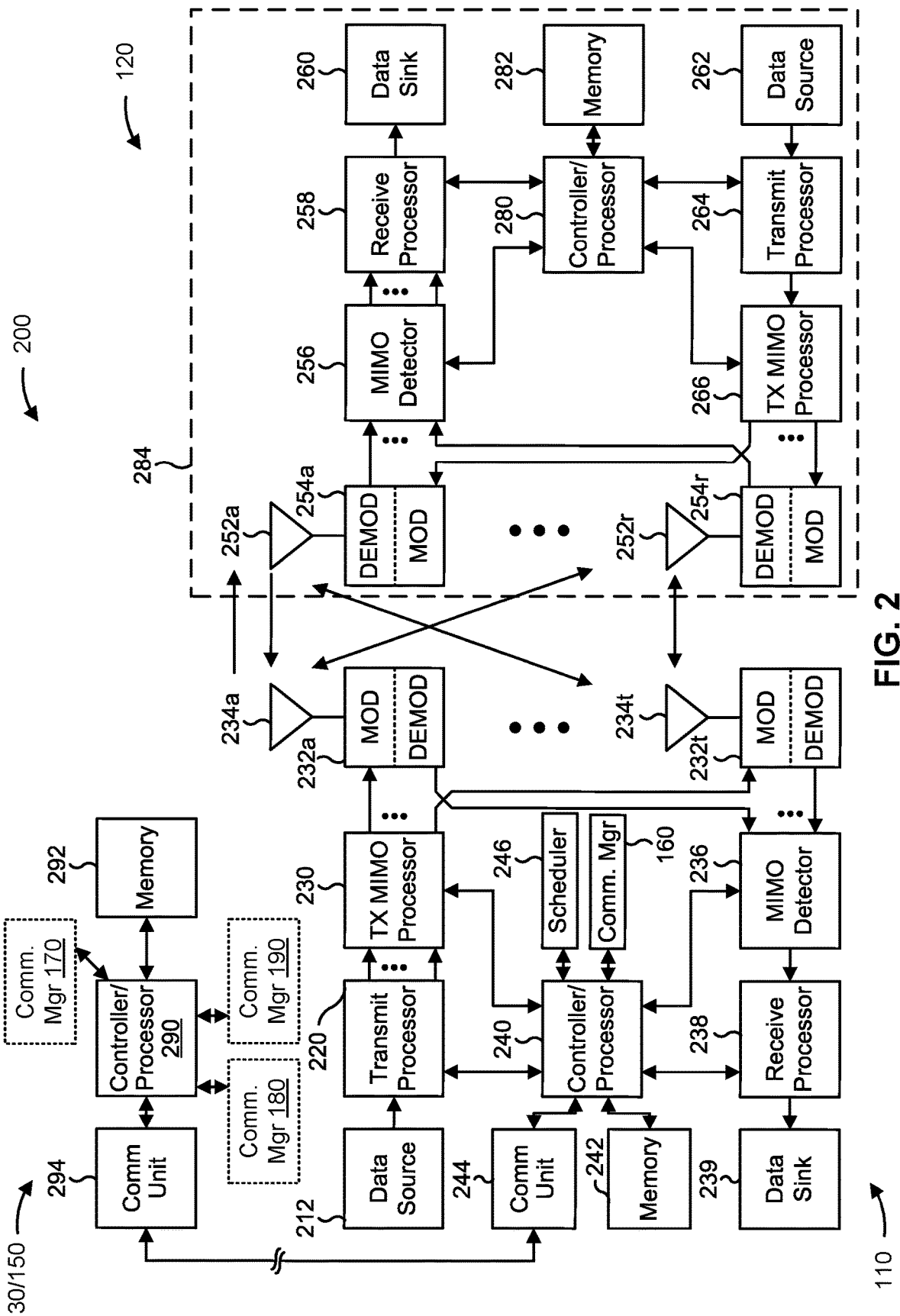
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network node 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

A network node 130 and/or a network node 150 may include a communication unit 294, a controller/processor 290, and a memory 292. A network node 130 and/or a network node 150 may include, for example, one or more devices in a core network. A network node 130 and/or a network node 150 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with a network 130 and/or a network node 150 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna (s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node 110, the controller/processor 280 of the UE 120, and/or any other component(s) of FIG. 2 may perform one or more techniques associated with signaling for a UE mobility prediction, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, process 1600 of FIG. 16, process 1400 of FIG. 17, process 1800 of FIG. 18, process 1900 of FIG. 19, process 2000 of FIG. 20, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, process 1300 of FIG. 13, process 1400 of FIG. 14, process 1500 of FIG. 15, process 1600 of FIG. 16, process 1400 of FIG. 17, process 1800 of FIG. 18, process 1900 of FIG. 19, process 2000 of FIG. 20, and/or other processes as described herein. In some examples, executing instructions may include running the instructions, converting the instructions, compiling the instructions, and/or interpreting the instructions, among other examples.

In some aspects, the network node 110 includes means for transmitting mobility history data for a UE to a second network node in a core network associated with the RAN; and/or means for receiving a UE mobility prediction model that is based at least in part on the mobility history data from the second network node. In some aspects, the means for the network node 110 to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246.

In some aspects, the network node 110 includes means for transmitting mobility history data for a UE to a second network node in a core network associated with the RAN; and/or means for receiving updated long-term mobility history data that is based at least in part on the mobility history data from the second network node. In some aspects, the means for the network node 110 to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246

In some aspects, a network node 110 includes means for transmitting mobility history data for a UE to a second network node in the disaggregated RAN; and/or means for receiving a UE mobility prediction model that is based at least in part on the mobility history data from the second network node. In some aspects, the means for the network node 110 to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246.

In some aspects, the network node 110 includes means for transmitting mobility history data for a UE to a second network node in the disaggregated RAN; and/or means for receiving updated long-term mobility history data that is based at least in part on the mobility history data from the second network node. In some aspects, the means for the network node 110 to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246.

In some aspects, the network node 130 includes means for receiving mobility history data associated with a UE; and/or means for transmitting the mobility history data to a second network node in the core network for use in training a UE mobility prediction model. In some aspects, the means for the network node 130 to perform operations described herein may include, for example, one or more of communication manager 160170, the controller/processor 290, the memory 292, and/or the communication unit 294.

In some aspects, the network node 130 includes means for receiving a UE mobility prediction model; and/or means for transmitting the UE mobility prediction model to a second network node in the core network for storage at the second network node. In some aspects, the means for the network node 130 to perform operations described herein may include, for example, one or more of communication manager 170, the controller/processor 290, the memory 292, and/or the communication unit 294.

In some aspects, the network node 130 includes means for receiving mobility history data associated with a UE from a second network node in the core network; and/or means for training a UE mobility prediction model based at least in part on the mobility history data. In some aspects, the means for the network node 130 to perform operations described herein may include, for example, one or more of communication manager 180, the controller/processor 290, the memory 292, and/or the communication unit 294.

In some aspects, the network node 130 includes means for receiving mobility history data associated with a UE from a second network node in the core network; means for updating long-term mobility history data associated with the UE based at least in part on the mobility history data; and/or means for storing the updated long-term mobility history data at the first network node. In some aspects, the means for the network node 130 to perform operations described herein may include, for example, one or more of communication manager 180, the controller/processor 290, the memory 292, and/or the communication unit 294.

In some aspects, the network node 150 includes means for receiving mobility history data associated with a UE from a second network node in the disaggregated RAN; and/or means for training a UE mobility prediction model based at least in part on the mobility history data. In some aspects, the means for the network node 150 to perform operations described herein may include, for example, one or more of communication manager 190, the controller/processor 290, the memory 292, and/or the communication unit 294.

In some aspects, the network node 150 includes means for receiving mobility history data associated with a UE from a second network node in the disaggregated RAN; means for updating long-term mobility history data associated with the UE based at least in part on the mobility history data; and/or means for storing the updated long-term mobility history data at the first network node. In some aspects, the means for the network node 150 to perform operations described herein may include, for example, one or more of communication manager 190, the controller/processor 290, the memory 292, and/or the communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
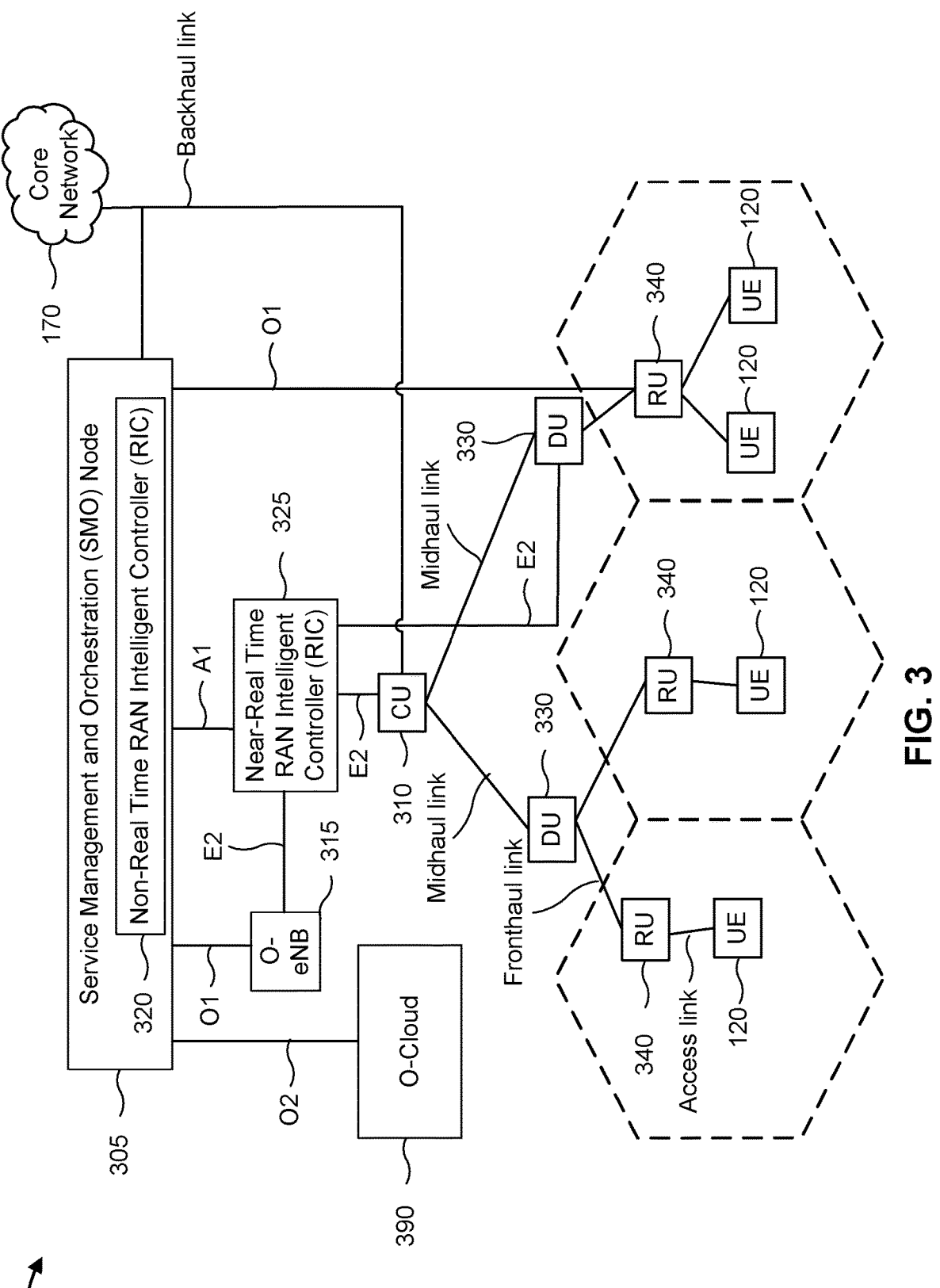
FIG. 3 is an example of a disaggregated base station architecture, in accordance with the present disclosure.

FIG. 3 is an example of a disaggregated base station architecture 300, in accordance with the present disclosure. The disaggregated base station architecture 300 shown in FIG. 3 may include one or more central units (CUs) 310 that can communicate directly with the core network 140 via a backhaul link, or indirectly with the core network 140 through one or more disaggregated base station units or network nodes 150 (such as a Near-RT RIC 325 via an E2 link, or a Non-RT RIC 320 associated with a SMO node 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the network nodes (e.g., the CUs 310, the DUs 330, the RUs 340, the Near-RT RICs 325, the Non-RT RICs 315, and the SMO node 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO node 305 may be configured to support RAN deployment and provisioning of non-virtualized and virtualized network elements. For non-virtualized network elements, the SMO node 305 may be configured to support the deployment of dedicated physical resources for RAN coverage requirements which may be managed via an operations and maintenance interface (such as an O1 interface). For virtualized network elements, the SMO node 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO node 305 can communicate with a hardware aspect of a 4G RAN, such as an open eNB (O-eNB) 315, via an O1 interface. Additionally, in some implementations, the SMO node 305 can communicate directly with one or more RUs 340 via an O1 interface. The SMO node 305 also may include a Non-RT RIC 320 configured to support functionality of the SMO node 305.

The Non-RT RIC 320 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some aspects, the SMO node 305, the Non-RT RIC 320, and/or the Near-RT RIC 325 may be included in the core network 140 in disaggregated base station architecture. The SMO node 305, the Non-RT RIC 320, and/or the Near-RT RIC 325 may be configured to include a logical function that enables non-real-time control and optimization of RAN elements and resources, Artificial Intelligence/Machine Learning (AI/ML) workflows including model training and updates, or policy-based guidance of applications/features. In some implementations, the SMO node 305, the Non-RT RIC 320, and/or the Non-RT RIC 320 may receive parameters or external enrichment information from one or more other network nodes included in the core network 140 and/or one or more other network nodes included in a RAN. The information may include mobility history data associated with one or more of the UEs 120, among other examples. The mobility history data may be used to generate AI/ML models that may be used by a network node 110 for generating or determining a UE mobility prediction. An AI/ML model that is configured to be used for generating or determining a UE mobility prediction is referred to herein as a UE mobility prediction model. An example of a UE mobility prediction model is described in connection with FIG. 5.

Mobility history data associated with a UE may include recent (or short-term) mobility history data and long-term mobility history data, among other examples. Recent mobility history data includes mobility history data that is collected for a UE over a short and recent time period such as over the past 12 hours or the past 24 hours, for example. Recent mobility history data may include mobility history data indicating the UE's locations during the recent time period, the times and durations when the UE was at those locations, starting locations and ending locations for movement of the UE during the recent time period, routes traversed by the UE during the recent time period, and/or other mobility history data.

Long-term mobility history data includes mobility history data that is collected and aggregated for a UE over a long time duration such as several months to one year or more. Generally, long-term mobility history includes mobility history data that is collected for a time duration that is sufficient to identify and/or determine a UE's typical routes, destinations, movement habits, and/or other mobility events that are stable and repeatable over a long duration.

Recent mobility history data may be stored by the SMO node 305, the Non-RT RIC 320, and/or the Near-RT RIC 325 and aggregated and/or accumulated as part of a UE's long-term mobility history data. Recent mobility history data and/or long-term mobility history data may be used by the SMO node 305, the Non-RT RIC 320, the Near-RT RIC 325, another network node 130 in the core network 140, a network node 110 such as a base station, a CU 310, a DU 330, an RU 340, and/or another network node to generate UE mobility predictions for a UE in the disaggregated base station architecture 300 and/or to generate, build, train, and/or update a UE mobility prediction model.

As indicated above, FIG. 3 is provided as an example. Other examples may differ from what is described with regard to FIG. 3.

Figure 4:
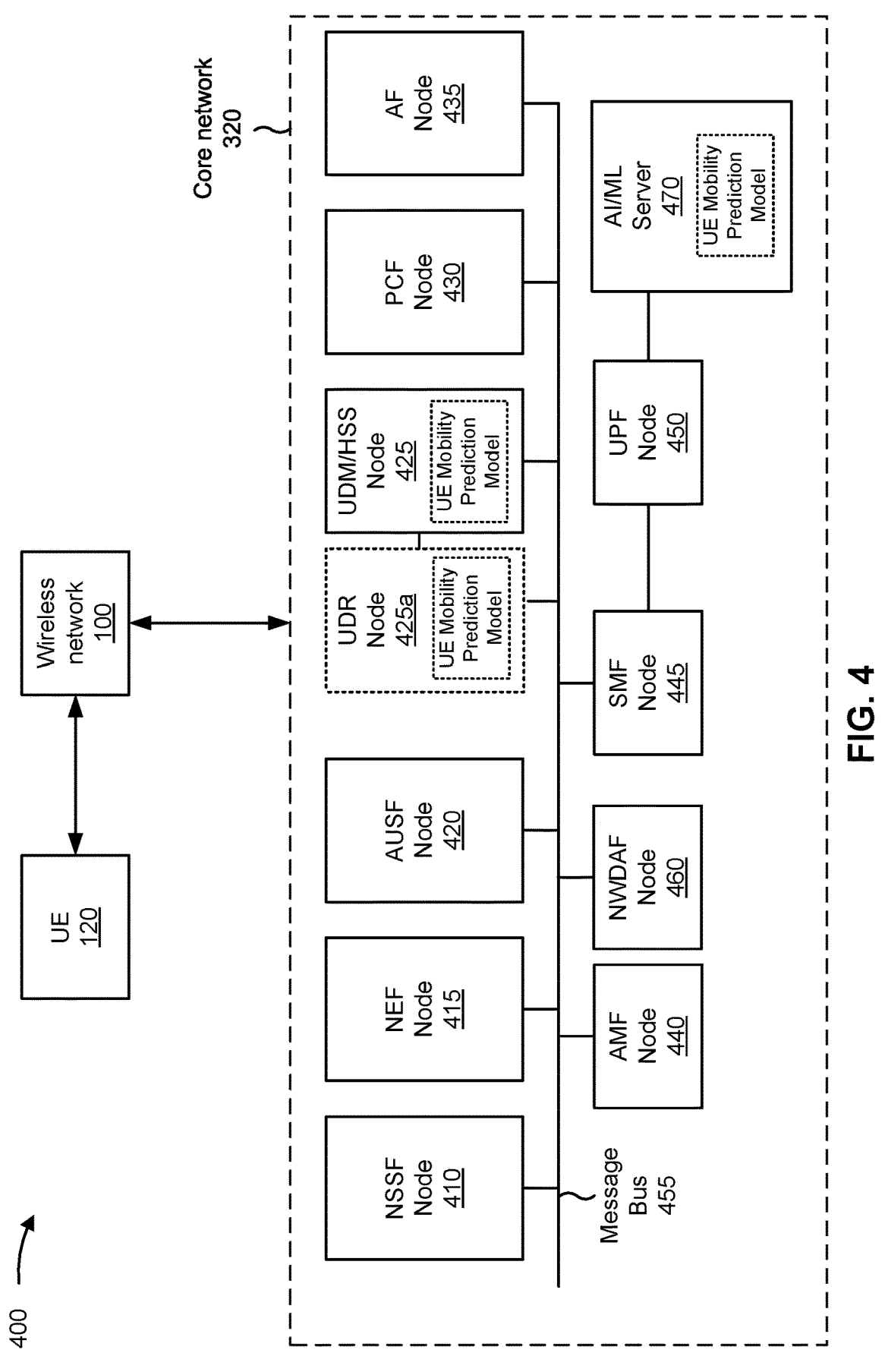
FIG. 4 is a diagram of an example of a core network configured to provide network slicing, in accordance with the present disclosure.

FIG. 4 is a diagram of an example 400 of a core network 140 configured to provide network slicing, in accordance with the present disclosure. The core network 140 may be communicatively coupled to the wireless network 100. In some aspects, the disaggregated base station architecture 300 is implemented in the wireless network 100. Devices and/or networks of example 400 may interconnect via wired connections, wireless connections, or a combination thereof.

The core network 140 may include an example functional architecture in which systems and/or methods described herein may be implemented. For example, the core network 140 may include an example architecture of a fifth generation (5G) next generation (NG) core network included in a 5G wireless telecommunications system, or in a subsequent core network architecture such as a 6G core network architecture included in a 5G wireless telecommunications system, a 6G wireless telecommunications system, and/or beyond 6G. Although the example architecture of the core network 140 shown in FIG. 4 may be an example of a service-based architecture, in some aspects, the core network 140 may be implemented as a reference-point architecture and/or a 4G core network, among other examples. A service-based architecture includes a core network architecture in which a modular framework is used such that common applications can be deployed using components of varying sources. In a service-based architecture, control plan functionality and common data repositories in the core network are delivered by way of a set of interconnected network functions, where each network function may have authorization to access each other's services on a common service based interface (SBI). A reference-point architecture may include a core network architecture in which network elements use point-to-point interfaces to communicate in the core network, as opposed to the use of a common interface such as in the service-based architecture.

As shown in FIG. 4, the core network 140 may include a number of functional elements. The functional elements may be implemented as one or more network nodes 130a-130n. The functional elements may include, for example, a network slice selection function (NSSF) node 410, a network exposure function (NEF) node 415, an authentication server function (AUSF) node 420, a unified data management (UDM)/home subscriber service (HSS) node 425, a policy control function (PCF) node 430, an application function (AF) node 435, an access and mobility management function (AMF) node 440, a session management function (SMF) node 445, a user plane function (UPF) node 450, a network data analytics function (NWDAF) node 460, and/or an AI/ML server 470, among other examples. These functional elements may be communicatively connected via a message bus 455. Each of the functional elements shown in FIG. 4 may be implemented on one or more devices associated with a wireless telecommunications system. In some implementations, one or more of the functional elements may be implemented on physical devices, such as an access point, a base station, and/or a gateway, among other examples. In some implementations, one or more of the functional elements may be implemented on a computing device of a cloud computing environment.

The NSSF node 410 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120. Network slicing may efficiently provide communications for different types of services with different service standards.

The NSSF node 410 may determine a set of network slice policies to be applied at the wireless network 100. For example, the NSSF node 410 may apply one or more UE route selection policy (URSP) rules. In some aspects, the NSSF node 410 may select a network slice based on a mapping of a data network name (DNN) field included in a route selection description (RSD) to the DNN field included in a traffic descriptor selected by the UE 120. By providing network slicing, the NSSF node 410 allows an operator to deploy multiple substantially independent end-to-end networks potentially with the same infrastructure. In some implementations, each slice may be customized for different services.

The NEF node 415 may include one or more devices that support exposure of capabilities and/or events in the wireless telecommunications system to help other entities in the wireless telecommunications system discover network services. The AUSF node 420 may include one or more devices that act as an authentication server and support the process of authenticating the UE 120 in the wireless telecommunications system.

The UDM/HSS node 425 may include one or more devices that store user data and profiles in the wireless telecommunications system. In some aspects, the UDM/HSS node 425 may be used for fixed access and/or mobile access, among other examples, in the core network 140. In some aspects, the UDM/HSS node 425 includes a 5G UDM node. In some aspects, the UDM/HSS node 425 includes a 4G/LTE HSS node. In some aspects, the UDM/HSS node 425 may be deployed with an internal database. In some aspects, the UDM/HSS node 425 may be deployed with an external database that is referred to as a unified data repository (UDR) node 425a.

In some aspects, the UDM/HSS node 425 is configured to store mobility history data associated with one or more UEs 120. In some aspects, the UDM/HSS node 425 is configured to receive the mobility history data from the AMF node 440 and/or another network node 130 in the core network 140. In some aspects, the UDM/HSS node 425 is configured to generate a UE mobility prediction model based on the mobility history data stored by the UDM/HSS node 425. In some aspects, the UDM/HSS node 425 is configured to transmit a UE mobility prediction to the AMF node 440 for transmission to a network node 110 in the wireless network 100. In some aspects, the UDM/HSS node 425 is configured to transmit mobility history data (e.g., recent mobility history data, long-term mobility history data) to the AMF node

440 for transmission to a network node 110 in the wireless network 100, such that the network node 110 may use the mobility history data to generate a UE mobility prediction model.

The PCF node 430 may include one or more devices that provide a policy framework that incorporates network slicing, roaming, packet processing, and/or mobility management, among other examples. In some aspects, the PCF node 430 may include one or more URSP rules used by the NSSF node 410 to select network slice instances for the UE 120. The AF node 435 may include one or more devices that support application influence on traffic routing, access to the NEF node 415, and/or policy control, among other examples. The AMF node 440 may include one or more devices that act as a termination point for non-access stratum (NAS) signaling and/or mobility management, among other examples. In some aspects, the AMF node 440 may request the NSSF node 410 to select network slice instances for the UE 120, e.g., at least partially in response to a request for data service from the UE 120.

In some aspects, the AMF node 440 is configured to receive mobility history data from a network node 110 in the wireless network 100. In some aspects, the AMF node 440 is configured to transmit mobility history data to the UDM/HSS node 425 and/or another network node 130 in the core network 140. In some aspects, the AMF node 440 is configured to transmit mobility history data to the SMO node 305, the Non-RT RIC 320, and/or the Near-RT RIC 325 included in a RAN of the wireless network 100 or in the core network 140. In some aspects, the AMF node 440 is configured to receive a UE mobility prediction, that is based on the mobility history data stored, from the UDM/HSS node 425. In some aspects, the AMF node 440 is configured to receive a UE mobility prediction, that is based on the mobility history data stored, from the SMO node 305, the Non-RT RIC 320, and/or the Near-RT RIC 325 included in a RAN of the wireless network 100 or in the core network 140. In some aspects, the AMF node 440 is configured to transmit the UE mobility prediction to a network node 110 in the wireless network 100.

In some aspects, the AMF node 440 is configured to receive mobility history data (e.g., recent mobility history data, long-term mobility history data) from the UDM/HSS node 425 and/or another network node 130 included in the core network 140. In some aspects, the AMF node 440 is configured to receive mobility history data (e.g., recent mobility history data, long-term mobility history data) from the SMO node 305, the Non-RT RIC 320, and/or the Near-RT RIC 325 included in a RAN of the wireless network 100 or in the core network 140. In some aspects, the AMF node 440 is configured to transmit mobility history data (e.g., recent mobility history data, long-term mobility history data) to a network node 110 in the wireless network 100 such that the network node 110 may use the mobility history data to generate a UE mobility prediction model.

The SMF node 445 may include one or more devices that support the establishment, modification, and release of communication sessions in the wireless telecommunications system. For example, the SMF node 445 may configure traffic steering policies at the UPF node 450 and/or enforce user equipment IP address allocation and policies, among other examples. In some aspects, the SMF node 445 may provision the network slice instances selected by the NSSF 410 for the UE 120.

The UPF node 450 may include one or more devices that serve as an anchor point for intraRAT and/or interRAT mobility. In some aspects, the UPF node 450 may apply rules to packets, such as rules pertaining to packet routing, traffic reporting, and/or handling user plane QoS, among other examples. The UPF node 450 may communicate with a network node in the wireless network 100 on a backhaul interface such as an N3 interface. For example, the UPF node 450 may communicate with a CU 310 in the wireless network 100.

The message bus 455 may be a logical and/or physical communication structure for communication among the functional elements. Accordingly, the message bus 455 may permit communication between two or more functional elements, whether logically (e.g., using one or more application programming interfaces (APIs), among other examples) and/or physically (e.g., using one or more wired and/or wireless connections).

The NWDAF node 460 may be a network node 130 that is configured to store network data associated with the wireless network 100 and/or the UEs 120 in the wireless network 100. Moreover, the NWDAF node 460 may be configured to generate various analytics based on the network data. In some aspects, the NWDAF node 460 is configured to store mobility history data associated with the UEs 120 in the wireless network 100. In some aspects, the NWDAF node 460 is configured to generate a UE mobility prediction model based on the mobility history data.

The AI/ML server 470 may be a network node 130 that is configured to generate, train, and/or update various AI/ML models for the wireless network 100 and/or for the UEs 120 in the wireless network 100. In some aspects, the AI/ML server 470 is configured to store mobility history data associated with the UEs 120 in the wireless network 100. In some aspects, the AI/ML server 470 is configured to generate a UE mobility prediction model based on the mobility history data.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example 400 may perform one or more functions described as being performed by another set of devices of example environment 400.

Figure 5:
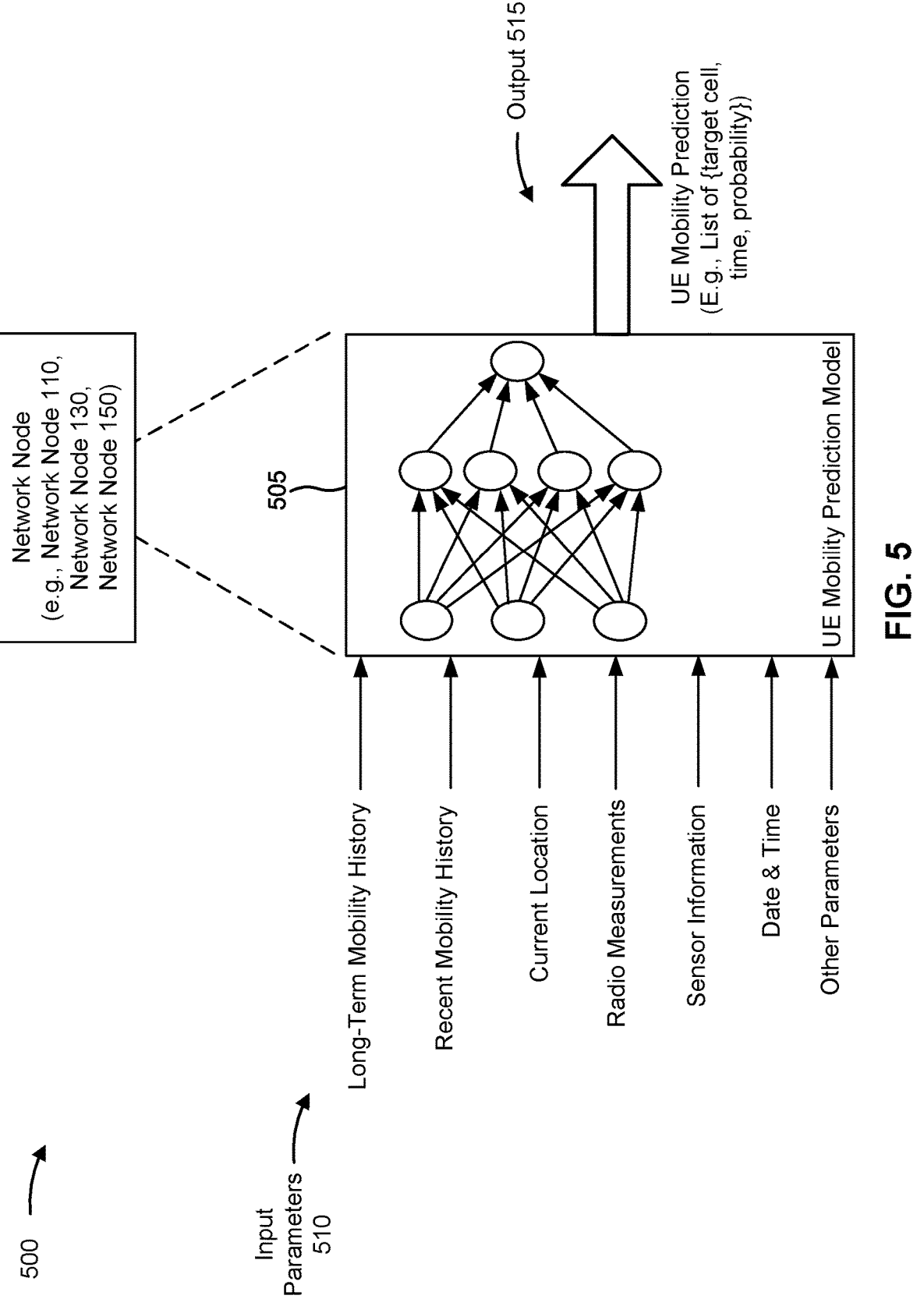
FIG. 5 is a diagram of an example of a UE mobility prediction model, in accordance with the present disclosure.

FIG. 5 is a diagram of an example 500 of a UE mobility prediction model 505, in accordance with the present disclosure. The UE mobility prediction model 505 may include an AI/ML model that is used by a network node (e.g., a network node 110, a network node 130, a network node 150, an SMO node 305, a non-RT RIC 320, a near-RT RIC 325, a UDM/HSS node 425, an AI/ML server 470, and/or another type of network node) to estimate or predict a future location of a UE 120 at a particular time.

In some aspects, the UE mobility prediction model 505 may include a UE-specific mobility prediction model, which is a UE mobility prediction model that is generated, trained, and used to generate UE mobility predictions for a specific UE 120. Data and parameters specific to the UE 120 may be used to generate and train the UE-specific mobility prediction model associated with the UE 120. The data and parameters may include, for example, the UE 120's recent mobility history, the UE 120's long-term mobility history, and/or other data and parameters.

In some aspects, the UE mobility prediction model 505 may include a common UE mobility prediction model, which is a UE mobility prediction model that is generated, trained, and used to generate UE mobility predictions for a plurality of UEs 120. A common UE mobility prediction model may be used to generate UE mobility predictions in a particular cell, in a particular geographic area, at or near a particular point of interest, and/or for another location. The data and parameters that are used to train a common UE mobility prediction model may include, for example, recent mobility history associated with a plurality of UEs 120, long-term mobility history associated with a plurality of UEs 120, and/or other data and parameters.

As further shown in FIG. 5, input parameters 510 may be provided to the UE mobility prediction model 505 as a set of constraints and/or values for determining an output 515 using the UE mobility prediction model 505. The input parameters 510 may include long-term mobility history associated with the UE 120 (and, in some cases, one or more other UEs 120), recent mobility history associated with the UE 120 (and, in some cases, one or more other UEs 120), a current location of the UE 120, one or more radio measurements generated by the UE 120 (e.g., RSRP measurements, RSSI measurements, RSRQ measurements, CQI measurements), sensor information provided by the UE 120 (e.g., accelerometer information, gyroscope information), date and time information associated with the UE 120, and/or other parameters.

The output 515 may include a UE mobility prediction for a UE 120. A UE mobility prediction may include a dataset that includes a predicted or estimated target cell for the UE 120, a predicted or estimated time at which the UE 120 will enter the target cell, and a probability for the predicted or estimated target cell and the predicted or estimated time being a correct prediction or estimation.

As indicated above, FIG. 5 is provided as an example. Other examples may differ from what is described with regard to FIG. 5.

Figure 6:
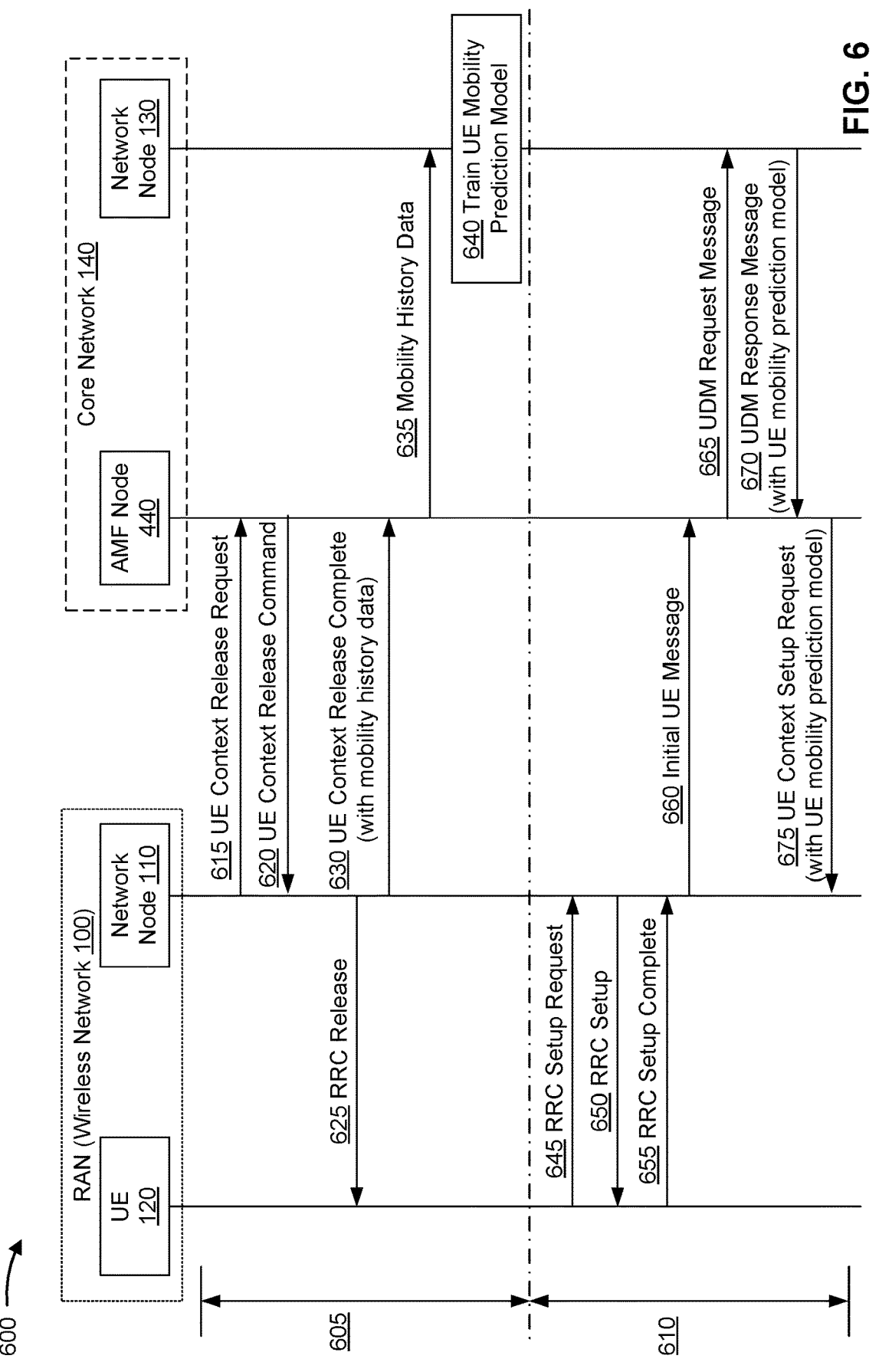
FIG. 6 is a diagram illustrating an example associated with signaling for a UE mobility prediction, in accordance with the present disclosure.

FIG. 6 is a diagram of an example 600 of signaling for a UE mobility prediction, in accordance with the present disclosure. As shown in FIG. 6, the example 600 may include communication among a UE 120 and a plurality of network nodes, including a network node 110, an AMF node 440, and a network node 130. The UE 120 and the network node 110 may be included in a RAN of the wireless network 100. The AMF node 440 and the network node 130 may be included in a core network 140 associated with the RAN. The network node 110 may include a base station, a CU 310, a DU 330, an RU 340, and/or another RAN node. The network node 130 may include a UDM/HSS node 425 (with or without an associated UDR node 425a), an NWDAF node 460, an AI/ML server 470, and/or another core network node.

The signaling described in the example 600 may be implemented to support a UE mobility prediction model training process 605. Moreover, signaling described in the example 600 may be implemented to support a UE mobility prediction model inference process 610. A UE mobility prediction model 505 may be trained as part of the UE mobility prediction model training process 605 based at least in part on mobility history data associated with the UE 120 and, in some cases, mobility history data associated with one or more other UEs. The trained UE mobility prediction model 505 may be provided to the network node 110 as part of the UE mobility prediction model inference process 610 so that the network node 110 may generate or determine a UE mobility prediction for the UE 120 using the trained UE mobility prediction model 505.

In the UE mobility prediction model training process 605, the network node 110 may transmit (and the AMF node 440 may receive) a UE context release request at 615. The network node 110 may transmit (and the AMF node 440 may receive) the UE context release request on a backhaul link between the RAN and the core network 140. The network node 110 may transmit the UE context release request as part of an RRC release operation associated with the UE 120. In some aspects, the RRC release operation may be performed to transition the UE 120 into an RRC idle mode, an RRC inactive mode, and/or another mode in which the RRC context of the UE 120 is released. In some aspects, the RRC release operation may be performed in connection with a path switch or a handover of the UE 120. The UE context release request may be a message that includes a request to release the RRC context of the UE 120.

At 620, the AMF node 440 may transmit (and the network node 110 may receive) a UE context release command. The AMF node 440 may transmit the UE context release command in response to the UE context release request. The UE context release command may be a message that indicates that the network node 110 is to release the RRC context of the UE 120.

At 625, the network node 110 may transmit (and the UE 120 may receive) an RRC release message. The RRC release message may indicate to the UE 120 that the UE 120 is permitted to transition to an RRC idle mode or an RRC inactive mode, or to switch a communication path of the UE 120 as part of a handover.

At 630, the network node 110 may transmit a UE context release complete message to the AMF node 440, and the AMF node 440 may receive the UE context release complete message from the network node 110. The UE context release complete message may include an indication that RRC release of the UE 120 was successfully completed.

As further shown in FIG. 6, the network node 110 may transmit mobility history data (associated with the UE 120) to the AMF node 440, and the AMF node 440 may receive the mobility history data from the network node 110. The mobility history data may include recent mobility history data associated with the UE 120. The UE history information upload may be from RAN 100 to the core network 140. The network node 110 may transmit (and the UE 120 may receive) the mobility history data in the UE context release complete message, in a path switch request, and/or in another message. The UE 120 may generate and provide the mobility history data to the network node 110, the network node 110 may generate the mobility history data for the UE 120, or a combination thereof.

At 635, the AMF node 440 may transmit the mobility history data to the network node 130, and the network node 130 may receive the mobility history data from the AMF node 440. The network node 130 may store the mobility history data and may generate long-term mobility history data for the UE 120 by accumulating mobility history data for the UE 120. Here, the UE history information upload may occur from the core network 140 (e.g., from the AMF node 440 of the core network 140) to a model repository. In some aspects, the model repository (e.g., the network node 130) is a UDR node 425a associated with a UDM/HSS node 425, and the UE history information upload includes AMF-UDM signaling. In some aspects, the model repository (e.g., the network node 130) is an NWDAF node 460, and the UE history information upload includes AMF-NWDAF signaling. In some aspects, the model repository (e.g., the network node 130) is an AI/ML server 470, and the UE history information upload includes AMF/NWDAF-AI/ML server signaling.

At 640, the network node 130 may train a UE mobility prediction model (e.g., a UE mobility prediction model 505). The network node 130 may train the UE mobility prediction model based at least in part on the mobility history data received from the AMF node 440. Training the UE mobility prediction model may include updating the decision-making aspects of the UE mobility prediction model based on the mobility history data such that the UE mobility prediction model may be used for more accurate and up-to-date UE mobility predictions. In some aspects, the UE mobility prediction model may include a UE-specific mobility prediction model associated with the UE 120. Here, the network node 130 may train the UE-specific mobility prediction model based at least in part on long-term mobility history data associated with the UE 120. As an example, the model is trained by a target UE's long period (e.g., several months) history data. The target UE's long term mobility history is implicitly included in the trained model.

As part of the UE mobility prediction model inference process 610, the UE 120 may transmit (and the network node 110 may receive) an RRC setup request message at 645. In some aspects, the UE 120 may transmit the RRC setup request message to the network node 110 to initiate an RRC connection setup procedure with the network node 110. In some aspects, the UE 120 may transmit the RRC setup request message to the network node 110 as part of a handover or a path switch to the network node 110.

At 650, the network node 110 may transmit (and the UE 120 may receive) an RRC setup message. The network node 110 may transmit the RRC setup message as part of an RRC connection setup or handover of the UE 120, and based on receiving the RRC setup request.

At 655, the UE 120 may transmit (and the network node 110 may receive) an RRC setup complete message. The UE 120 may transmit the RRC setup complete message as part of an RRC connection setup or handover of the UE 120, and based on receiving the RRC setup message.

At 660, the network node 110 may transmit (and the AMF node 440 may receive) an initial UE message. The initial UE message may be an initial message from the UE 120 to the AMF node 440 as part of the RRC connection setup or the handover of the UE 120.

At 665, the AMF node 440 may transmit (and the network node 130 may receive) a UDM request message. The UDM request message may include a request for subscription data associated with the UE 120. The AMF node 440 may transmit the UDM request message to the network node 130 based on receiving the initial UE message.

At 670, the network node 130 may transmit (and the AMF node 440 may receive) a UDM response message. The UDM response message may include the subscription data associated with the UE 120. The network node 130 may transmit the UDM response message to the AMF node 440 based on receiving the UDM request message from the AMF node 440.

Moreover, the network node 130 may transmit the UE mobility prediction model to the AMF node 440, and the AMF node 440 may receive the UE mobility prediction model from the network node 130. This may be performed as part of model transfer to the RAN (in particular, model repository to AMF). Here, the UE mobility prediction model transfer may occur from the model repository to the core network 140 (e.g., to the AMF node 440 of the core network 140). In some aspects, the model repository (e.g., the network node 130) is a UDR node 425*a* associated with a UDM/HSS node 425, and the UE mobility prediction model transfer includes AMF-UDM signaling. In some aspects, the model repository (e.g., the network node 130) is an NWDAF node 460, and the UE mobility prediction model transfer includes AMF-NWDAF signaling. In some aspects, the model repository (e.g., the network node 130) is an AI/ML server 470, and the UE mobility prediction model transfer includes AMF/NWDAF-AI/ML server signaling. The network node 130 may transmit (and the AMF node 440 may receive) the UE mobility prediction model in the UDM response message and/or in another message.

At 675, the AMF node 440 may transmit (and the network node 110 may receive) a UE context setup request message. The UE context setup request message may include the subscription data associated with the UE 120. The AMF node 440 may transmit the UE context setup request message to the network node 110 based on receiving the subscription data from the network node 130.

Moreover, the AMF node 440 may transmit the UE mobility prediction model to the AMF node 440, and the AMF node 440 may receive the UE mobility prediction model from the network node 130. This may be performed as part of model transfer to the RAN (in particular, AMF to RAN). In some aspects, the AMF node 440 transmits the UE mobility prediction model to the network node 110 in the UE context setup request (e.g., an initial UE context setup request), and the network node 110 receives the UE mobility prediction model from the AMF node 440 in the UE context setup request. In some aspects, the AMF node 440 transmits the UE mobility prediction model to the network node 110 in a UE context modification request message, and the network node 110 receives the UE mobility prediction model from the AMF node 440 in the UE context modification request message. In some aspects, the AMF node 440 transmits the UE mobility prediction model to the network node 110 in a path switch request acknowledgement message, and the network node 110 receives the UE mobility prediction model from the AMF node 440 in the path switch request acknowledgement message.

Additionally and/or alternatively, the network node 110 may transmit the UE mobility prediction model to another network node 110 in the RAN as part of a handover of the UE 120. Here, a source network node 110 transfers the UE mobility prediction model to a target network node 110. In an Xn handover, the UE mobility prediction model may be transferred in a handover request. In an NG handover, the UE mobility prediction model may be transferred in a source to target transparent container.

The UE mobility prediction model may be delivered to the network node 110 during an RRC connection setup, during a handover into the network node 110, and/or during another procedure. The network node 110 may use the UE mobility prediction model to generate or determine a UE mobility prediction for the UE 120. For example, network node 110 may use one or more techniques described above in connection with FIG. 5 to generate or determine a UE mobility prediction for the UE 120 based on the UE mobility prediction model.

As indicated above, FIG. 6 is provided as an example. Other examples may differ from what is described with regard to FIG. 6.

Figure 7:
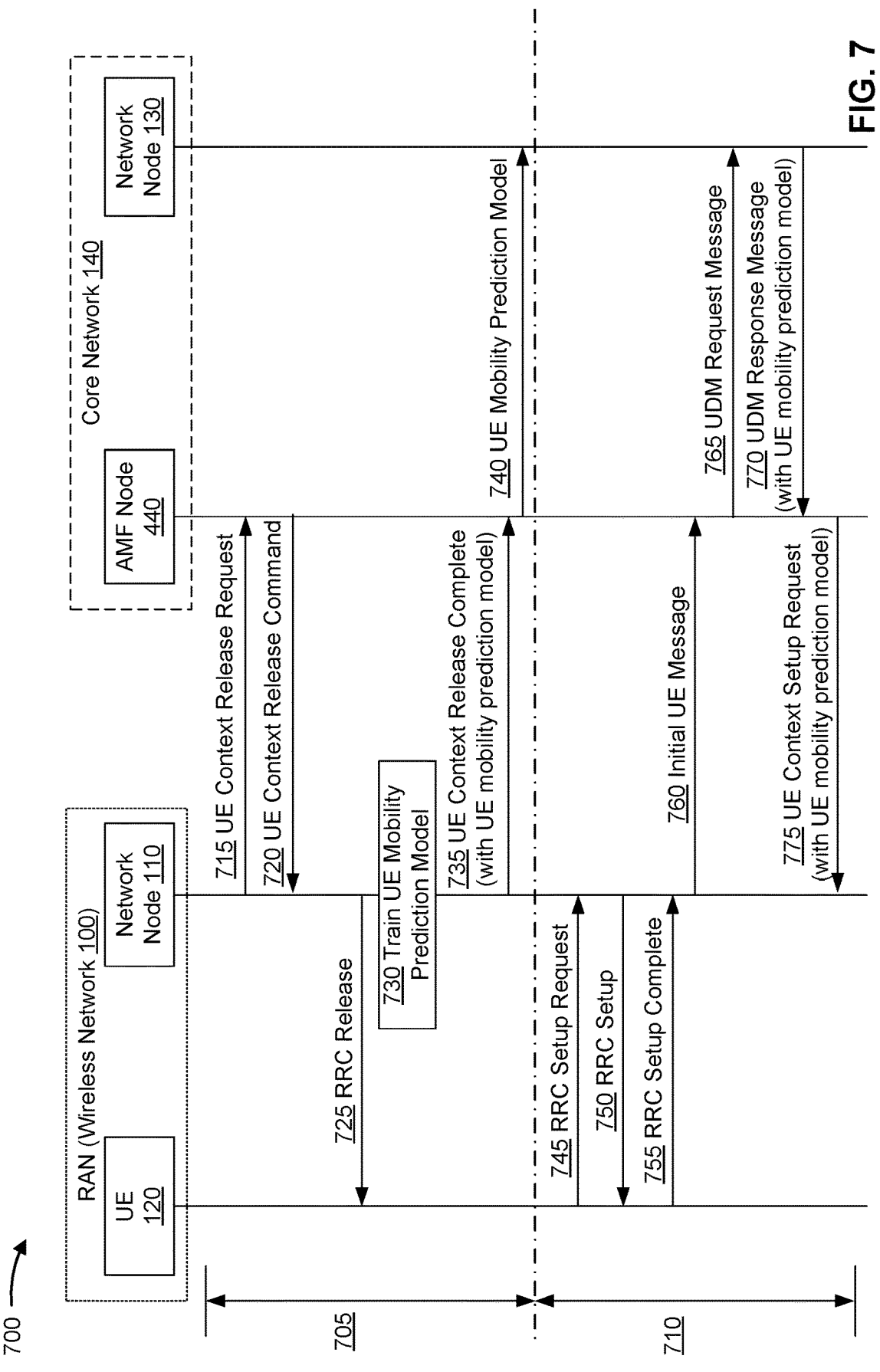
FIG. 7 is a diagram illustrating an example associated with signaling for a UE mobility prediction, in accordance with the present disclosure.

FIG. 7 is a diagram of an example 700 of signaling for a UE mobility prediction, in accordance with the present disclosure. The example 700 is similar to the example 600 of FIG. 6, except that the network node 110 in the RAN trains the UE mobility prediction model based on the mobility history data associated with the UE 120. Thus, the updated UE mobility prediction model is transmitted from the network node 110 to the AMF node 440, and from the AMF node 440 to the network node 130, as opposed to (and/or in addition to) the mobility history data.

As shown in FIG. 7, the example 700 may include communication among a UE 120 and a plurality of network nodes, including a network node 110, an AMF node 440, and a network node 130. The UE 120 and the network node 110 may be included in a RAN of the wireless network 100. The AMF node 440 and the network node 130 may be included in a core network 140 associated with the RAN. The network node 110 may include a base station, a CU 310, a DU 330, an RU 340, and/or another RAN node. The network node 130 may include a UDM/HSS node 425 (with or without an associated UDR node 425*a*), an NWDAF node 460, an AI/ML server 470, and/or another core network node.

The signaling described in the example 700 may be implemented to support a UE mobility prediction model training process 705. Moreover, signaling described in the example 700 may be implemented to support a UE mobility prediction model inference process 710. A UE mobility prediction model 505 may be trained as part of the UE mobility prediction model training process 705 based at least in part on mobility history data associated with the UE 120 and, in some cases, mobility history data associated with one or more other UEs. The trained UE mobility prediction model 505 may be provided to the network node 110 as part of the UE mobility prediction model inference process 710, so that the network node 110 may generate or determine a UE mobility prediction for the UE 120 using the trained UE mobility prediction model 505.

In the UE mobility prediction model training process 705, the network node 110 may transmit (and the AMF node 440 may receive) a UE context release request at 715. The network node 110 may transmit (and the AMF node 440 may receive) the UE context release request on a backhaul link between the RAN and the core network 140. The network node 110 may transmit the UE context release request as part of an RRC release operation associated with the UE 120. In some aspects, the RRC release operation may be performed to transition the UE 120 into an RRC idle mode, an RRC inactive mode, and/or another mode in which the RRC context of the UE 120 is released. In some aspects, the RRC release operation may be performed in connection with a path switch or a handover of the UE 120. The UE context release request may be a message that includes a request to release the RRC context of the UE 120.

At 720, the AMF node 440 may transmit (and the network node 110 may receive) a UE context release command. The AMF node 440 may transmit the UE context release command in response to the UE context release request. The UE context release command may be a message that indicates that the network node 110 is to release the RRC context of the UE 120.

At 725, the network node 110 may transmit (and the UE 120 may receive) an RRC release message. The RRC release message may indicate to the UE 120 that the UE 120 is permitted to transition to an RRC idle mode or an RRC inactive mode, or to switch a communication path of the UE 120 as part of a handover.

At 730, the network node 110 may train a UE mobility prediction model (e.g., a UE mobility prediction model 505). The network node 110 may train the UE mobility prediction model based at least in part on mobility history data. The mobility history data may be generated by the network node 110 and/or received from the UE 120. Training the UE mobility prediction model may include updating the decision-making aspects of the UE mobility prediction model based on the mobility history data such that the UE mobility prediction model may be used for more accurate and up-to-date UE mobility predictions. In some aspects, the UE mobility prediction model may include a UE-specific mobility prediction model associated with the UE 120. Here, the network node 110 may train the UE-specific mobility prediction model based at least in part on long-term mobility history data associated with the UE 120. As an example, the model is trained by a target UE's long period (e.g., several months) history data. The target UE's long-term mobility history is implicitly included in the trained model.

At 735, the network node 110 may transmit a UE context release complete message to the AMF node 440, and the AMF node 440 may receive the UE context release complete message from the network node 110. The UE context release complete message may include an indication that RRC release of the UE 120 was successfully completed.

As further shown in FIG. 7, the network node 110 may transmit the UE mobility prediction model (associated with the UE 120) to the AMF node 440, and the AMF node 440 may receive the UE mobility prediction model from the network node 110. The UE mobility prediction model upload may be from RAN 100 to the core network 140. The network node 110 may transmit (and the UE 120 may receive) the UE mobility prediction model in the UE context release complete message, in a path switch request, and/or in another message.

At 735, the AMF node 440 may transmit the UE mobility prediction model to the network node 130, and the network node 130 may receive the UE mobility prediction model from the AMF node 440. The network node 130 may store the UE mobility prediction model. Here, the UE mobility prediction model upload may occur from the core network 140 (e.g., from the AMF node 440 of the core network 140) to a model repository. In some aspects, the model repository (e.g., the network node 130) is a UDR node 425a associated with a UDM/HSS node 425, and the UE mobility prediction model upload includes AMF-UDM signaling. In some aspects, the model repository (e.g., the network node 130) is an NWDAF node 460, and the UE mobility prediction model includes AMF-NWDAF signaling. In some aspects, the model repository (e.g., the network node 130) is an AI/ML server 470, and the UE mobility prediction model includes AMF/NWDAF-AI/ML server signaling.

As part of the UE mobility prediction model inference process 710, the UE 120 may transmit (and the network node 110 may receive) an RRC setup request message at 745. In some aspects, the UE 120 may transmit the RRC setup request message to the network node 110 to initiate an RRC connection setup procedure with the network node 110. In some aspects, the UE 120 may transmit the RRC setup request message to the network node 110 as part of a handover or a path switch to the network node 110.

At 750, the network node 110 may transmit (and the UE 120 may receive) an RRC setup message. The network node 110 may transmit the RRC setup message as part of an RRC connection setup or handover of the UE 120, and based on receiving the RRC setup request.

At 755, the UE 120 may transmit (and the network node 110 may receive) an RRC setup complete message. The UE 120 may transmit the RRC setup complete message as part of an RRC connection setup or handover of the UE 120, and based on receiving the RRC setup message.

At 760, the network node 110 may transmit (and the AMF node 440 may receive) an initial UE message. The initial UE message may be an initial message from the UE 120 to the AMF node 440 as part of the RRC connection setup or the handover of the UE 120.

At 765, the AMF node 440 may transmit (and the network node 130 may receive) a UDM request message. The UDM request message may include a request for subscription data associated with the UE 120. The AMF node 440 may transmit the UDM request message to the network node 130 based on receiving the initial UE message.

At 770, the network node 130 may transmit (and the AMF node 440 may receive) a UDM response message. The UDM response message may include the subscription data associated with the UE 120. The network node 130 may transmit the UDM response message to the AMF node 440 based on receiving the UDM request message from the AMF node 440.

Moreover, the network node 130 may transmit the UE mobility prediction model to the AMF node 440, and the AMF node 440 may receive the UE mobility prediction model from the network node 130. This may be performed as part of model transfer to the RAN (in particular, model repository to AMF). Here, the UE mobility prediction model transfer may occur from the model repository to the core network 140 (e.g., to the AMF node 440 of the core network 140). In some aspects, the model repository (e.g., the network node 130) is a UDR node 425a associated with a UDM/HSS node 425, and the UE mobility prediction model transfer includes AMF-UDM signaling. In some aspects, the model repository (e.g., the network node 130) is an NWDAF node 460, and the UE mobility prediction model transfer includes AMF-NWDAF signaling. In some aspects, the model repository (e.g., the network node 130) is an AI/ML server 470, and the UE mobility prediction model transfer includes AMF/NWDAF-AI/ML server signaling. The network node 130 may transmit (and the AMF node 440 may receive) the UE mobility prediction model in the UDM response message and/or in another message.

At 775, the AMF node 440 may transmit (and the network node 110 may receive) a UE context setup request message. The UE context setup request message may include the subscription data associated with the UE 120. The AMF node 440 may transmit the UE context setup request message to the network node 110 based on receiving the subscription data from the network node 130.

Moreover, the AMF node 440 may transmit the UE mobility prediction model to the AMF node 440, and the AMF node 440 may receive the UE mobility prediction model from the network node 130. This may be performed as part of model transfer to the RAN (in particular, AMF to RAN). In some aspects, the AMF node 440 transmits the UE mobility prediction model to the network node 110 in the UE context setup request (e.g., an initial UE context setup request), and the network node 110 receives the UE mobility prediction model from the AMF node 440 in the UE context setup request. In some aspects, the AMF node 440 transmits the UE mobility prediction model to the network node 110 in a UE context modification request message, and the network node 110 receives the UE mobility prediction model from the AMF node 440 in the UE context modification request message. In some aspects, the AMF node 440 transmits the UE mobility prediction model to the network node 110 in a path switch request acknowledgement message, and the network node 110 receives the UE mobility prediction model from the AMF node 440 in the path switch request acknowledgement message.

Additionally and/or alternatively, the network node 110 may transmit the UE mobility prediction model to another network node 110 in the RAN as part of a handover of the UE 120. Here, a source network node 110 transfers the UE mobility prediction model to a target network node 110. In an Xn handover, the UE mobility prediction model may be transferred in a handover request. In an NG handover, the UE mobility prediction model may be transferred in a source to target transparent container.

The UE mobility prediction model may be delivered to the network node 110 during an RRC connection setup, during a handover into the network node 110, and/or during another procedure. The network node 110 may use the UE mobility prediction model to generate or determine a UE mobility prediction for the UE 120. For example, network node 110 may use one or more techniques described above in connection with FIG. 5 to generate or determine a UE mobility prediction for the UE 120 based on the UE mobility prediction model.

As indicated above, FIG. 7 is provided as an example. Other examples may differ from what is described with regard to FIG. 7.

Figure 8:
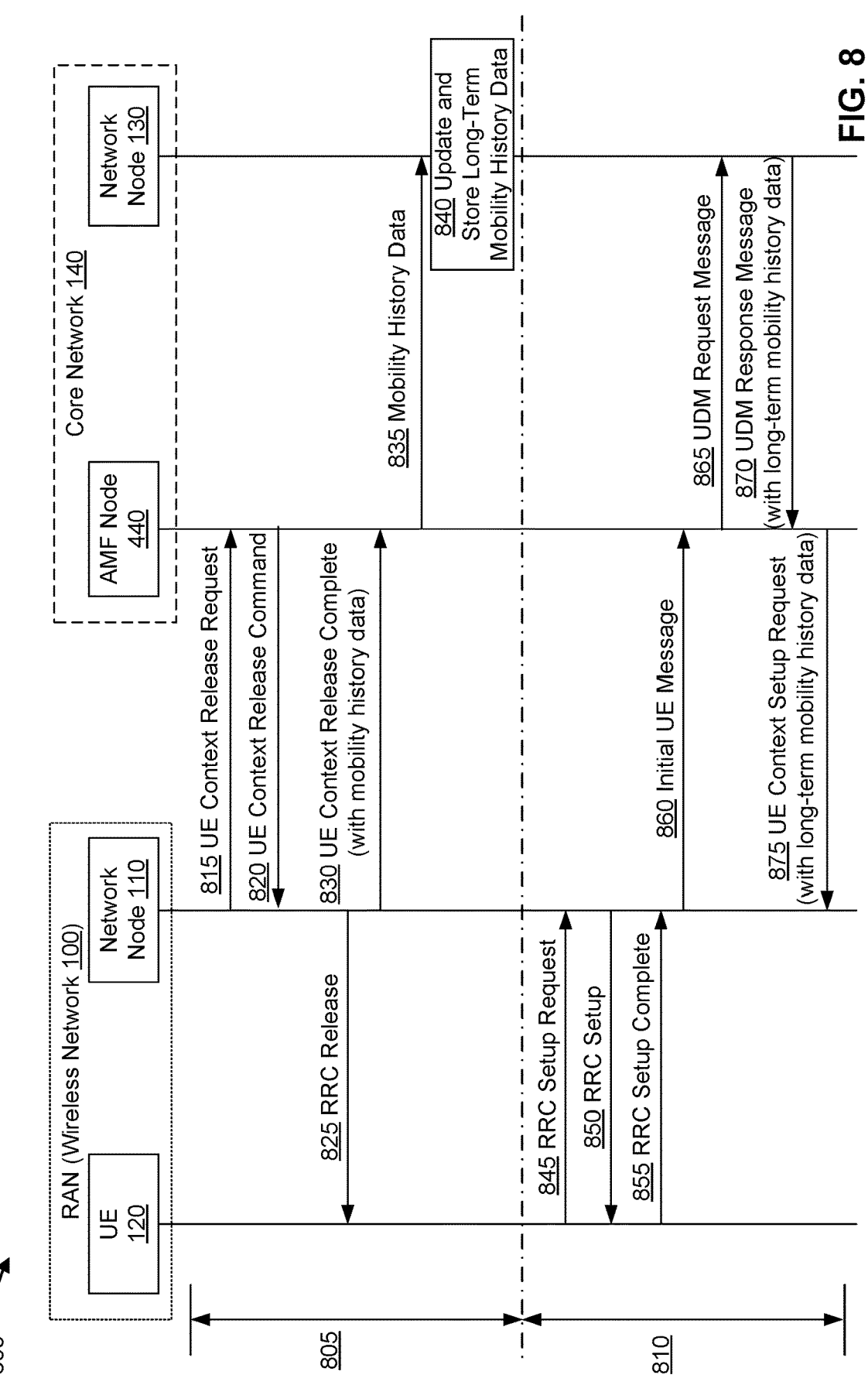
FIG. 8 is a diagram illustrating an example associated with signaling for a UE mobility prediction, in accordance with the present disclosure.

FIG. 8 is a diagram of an example 800 of signaling for a UE mobility prediction, in accordance with the present disclosure. As shown in FIG. 8, the example 800 may include communication among a UE 120 and a plurality of network nodes, including a network node 110, an AMF node 440, and a network node 130. The UE 120 and the network node 110 may be included in a RAN of the wireless network 100. The AMF node 440 and the network node 130 may be included in a core network 140 associated with the RAN. The network node 110 may include a base station, a CU 310, a DU 330, an RU 340, and/or another RAN node. The network node 130 may include a UDM/HSS node 425 (with or without an associated UDR node 425a), an NWDAF node 460, an AI/ML server 470, and/or another core network node.

The signaling described in the example 800 may be implemented to support a long-term mobility history updating process 805 associated with the UE 120. Moreover, signaling described in the example 800 may be implemented to support a UE mobility prediction model inference process 810. The long-term mobility history may be provided to the network node 110 as part of the UE mobility prediction model inference process 810. A UE mobility prediction model 505 may be trained and used as part of the UE mobility prediction model inference process 810 based at least in part on the long-term mobility history data associated with the UE 120. In some cases, mobility history data associated with one or more other UEs may also be used to train the UE mobility prediction model 505.

In the long-term mobility history updating process 805, the network node 110 may transmit (and the AMF node 440 may receive) a UE context release request at 815. The network node 110 may transmit (and the AMF node 440 may receive) the UE context release request on a backhaul link between the RAN and the core network 140. The network node 110 may transmit the UE context release request as part of an RRC release operation associated with the UE 120. In some aspects, the RRC release operation may be performed to transition the UE 120 into an RRC idle mode, an RRC inactive mode, and/or another mode in which the RRC context of the UE 120 is released. In some aspects, the RRC release operation may be performed in connection with a path switch or a handover of the UE 120. The UE context release request may be a message that includes a request to release the RRC context of the UE 120.

At 820, the AMF node 440 may transmit (and the network node 110 may receive) a UE context release command. The AMF node 440 may transmit the UE context release command in response to the UE context release request. The UE context release command may be a message that indicates that the network node 110 is to release the RRC context of the UE 120.

At 825, the network node 110 may transmit (and the UE 120 may receive) an RRC release message. The RRC release message may indicate to the UE 120 that the UE 120 is permitted to transition to an RRC idle mode or an RRC inactive mode, or to switch a communication path of the UE 120 as part of a handover.

At 830, the network node 110 may transmit a UE context release complete message to the AMF node 440, and the AMF node 440 may receive the UE context release complete message from the network node 110. The UE context release complete message may include an indication that RRC release of the UE 120 was successfully completed.

As further shown in FIG. 8, the network node 110 may transmit mobility history data (associated with the UE 120) to the AMF node 440, and the AMF node 440 may receive the mobility history data from the network node 110. The mobility history data may include recent mobility history data associated with the UE 120. The UE history information upload may be from RAN 100 to the core network 140. The network node 110 may transmit (and the UE 120 may receive) the mobility history data in the UE context release complete message, in a path switch request, and/or in another message. The UE 120 may generate and provide the mobility history data to the network node 110, the network node 110 may generate the mobility history data for the UE 120, or a combination thereof.

At 835, the AMF node 440 may transmit the mobility history data to the network node 130, and the network node 130 may receive the mobility history data from the AMF node 440. The network node 130 may store the mobility history data and may generate long-term mobility history data for the UE 120 by accumulating mobility history data for the UE 120. Here, the UE history information upload may occur from the core network 140 (e.g., from the AMF node 440 of the core network 140) to a model repository. In some aspects, the model repository (e.g., the network node 130) is a UDR node 425a associated with a UDM/HSS node 425, and the UE history information upload includes AMF-UDM signaling. In some aspects, the model repository (e.g., the network node 130) is an NWDAF node 460, and the UE history information upload includes AMF-NWDAF signaling. In some aspects, the model repository (e.g., the network node 130) is an AI/ML server 470, and the UE history information upload includes AMF/NWDAF-AI/ML server signaling.

At 840, the network node 130 may update and store long-term mobility history data associated with the UE 120. The network node 130 may update and store the long-term mobility history data associated with the UE 120 by updating any of the UE 120's typical routes, destinations, movement habits, and/or other mobility events that are stable and repeatable over a long duration based at least in part on the mobility history data received from the AMF node 440. The long-term mobility history data associated with the UE 120 may include statistics of the UE 120's mobility history and/or other mobility history data.

As part of the UE mobility prediction model inference process 810, the UE 120 may transmit (and the network node 110 may receive) an RRC setup request message at 845. In some aspects, the UE 120 may transmit the RRC setup request message to the network node 110 to initiate an RRC connection setup procedure with the network node 110. In some aspects, the UE 120 may transmit the RRC setup request message to the network node 110 as part of a handover or a path switch to the network node 110.

At 850, the network node 110 may transmit (and the UE 120 may receive) an RRC setup message. The network node 110 may transmit the RRC setup message as part of an RRC connection setup or handover of the UE 120, and based on receiving the RRC setup request.

At 855, the UE 120 may transmit (and the network node 110 may receive) an RRC setup complete message. The UE 120 may transmit the RRC setup complete message as part of an RRC connection setup or handover of the UE 120, and based on receiving the RRC setup message.

At 860, the network node 110 may transmit (and the AMF node 440 may receive) an initial UE message. The initial UE message may be an initial message from the UE 120 to the AMF node 440 as part of the RRC connection setup or the handover of the UE 120.

At 865, the AMF node 440 may transmit (and the network node 130 may receive) a UDM request message. The UDM request message may include a request for subscription data associated with the UE 120. The AMF node 440 may transmit the UDM request message to the network node 130 based on receiving the initial UE message.

At 870, the network node 130 may transmit (and the AMF node 440 may receive) a UDM response message. The UDM response message may include the subscription data associated with the UE 120. The network node 130 may transmit the UDM response message to the AMF node 440 based on receiving the UDM request message from the AMF node 440.

Moreover, the network node 130 may transmit the long-term mobility history data associated with the UE 120 to the AMF node 440, and the AMF node 440 may receive the long-term mobility history data associated with the UE 120 from the network node 130. In some aspects, the model repository (e.g., the network node 130) is a UDR node 425*a* associated with a UDM/HSS node 425, and the long-term mobility history data transfer includes AMF-UDM signaling. In some aspects, the model repository (e.g., the network node 130) is an NWDAF node 460, and the long-term mobility history data transfer includes AMF-NWDAF signaling. In some aspects, the model repository (e.g., the network node 130) is an AI/ML server 470, and the long-term mobility history data transfer includes AMF/NWDAF-AI/ML server signaling. The network node 130 may transmit (and the AMF node 440 may receive) the long-term mobility history data associated with the UE 120 in the UDM response message and/or in another message.

At 875, the AMF node 440 may transmit (and the network node 110 may receive) a UE context setup request message. The UE context setup request message may include the subscription data associated with the UE 120. The AMF node 440 may transmit the UE context setup request message to the network node 110 based on receiving the subscription data from the network node 130.

Moreover, the AMF node 440 may transmit the long-term mobility history data associated with the UE 120 to the AMF node 440, and the AMF node 440 may receive the long-term mobility history data associated with the UE 120 from the network node 130. This may be performed as part of model transfer to the RAN (in particular, AMF to RAN). In some aspects, the AMF node 440 transmits the long-term mobility history data associated with the UE 120 to the network node 110 in the UE context setup request (e.g., an initial UE context setup request), and the network node 110 receives the long-term mobility history data associated with the UE

120 from the AMF node 440 in the UE context setup request. In some aspects, the AMF node 440 transmits the long-term mobility history data associated with the UE 120 to the network node 110 in a UE context modification request message, and the network node 110 receives the long-term mobility history data associated with the UE 120 from the AMF node 440 in the UE context modification request message. In some aspects, the AMF node 440 transmits the long-term mobility history data associated with the UE 120 to the network node 110 in a path switch request acknowledgement message, and the network node 110 receives the long-term mobility history data associated with the UE 120 from the AMF node 440 in the path switch request acknowledgement message.

Additionally and/or alternatively, the network node 110 may transmit the long-term mobility history data associated with the UE 120 to another network node 110 in the RAN as part of a handover of the UE 120. Here, a source network node 110 transfers the long-term mobility history data associated with the UE 120 to a target network node 110. In an Xn handover, the long-term mobility history data associated with the UE 120 may be transferred in a handover request. In an NG handover, the long-term mobility history data associated with the UE 120 may be transferred in a source to target transparent container.

The long-term mobility history data associated with the UE 120 may be delivered to the network node 110 during an RRC connection setup, during a handover into the network node 110, and/or during another procedure. The network node 110 may use the long-term mobility history data associated with the UE 120 to train a UE mobility prediction model and use the UE mobility prediction model to generate or determine a UE mobility prediction for the UE 120. The UE mobility prediction model may include a UE-specific mobility prediction model associated with the UE 120 or a common UE mobility prediction model that may be used for a plurality of UEs 120.

"Common" UE mobility prediction model may refer to a UE mobility prediction model that is trained by a lot of UEs' history data (e.g., mobility history data associated with hundreds or thousands of UEs 120). A common UE mobility prediction model may be used for UEs 120 in a specific cell or for predicting the typical next hop(s) of mobility in a specific area. Long-term mobility history data may be used as an optional input parameter of the common UE mobility prediction model.

As indicated above, FIG. 8 is provided as an example. Other examples may differ from what is described with regard to FIG. 8.

Figure 9:
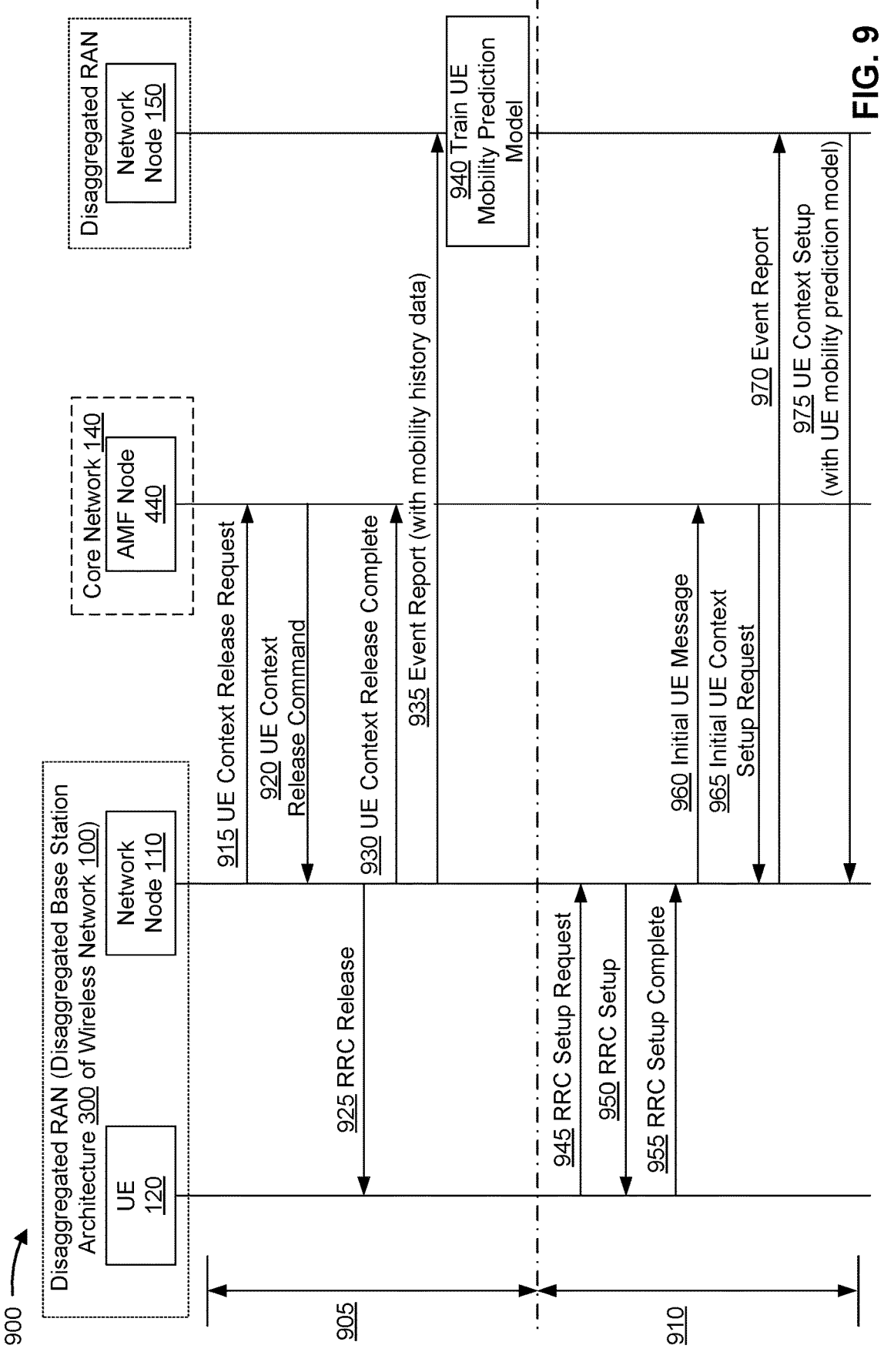
FIG. 9 is a diagram illustrating an example associated with signaling for a UE mobility prediction, in accordance with the present disclosure.

FIG. 9 is a diagram of an example 900 of signaling for a UE mobility prediction, in accordance with the present disclosure. As shown in FIG. 9, the example 900 may include communication among a UE 120 and a plurality of network nodes, including a network node 110, an AMF node 440, and a network node 150. The UE 120 and the network node 110 may be included in a disaggregated RAN of the wireless network 100. The disaggregated RAN may include a disaggregated base station architecture 300 of the wireless network 100. The AMF node 440 may be included in a core network 140 associated with the disaggregated RAN. The network node 150 may also be included in the disaggregated RAN and may include an SMO node 305, a non-RT RIC 320, a near-RT RIC 325, and/or another type of RIC.

The signaling described in the example 900 may be implemented to support a UE mobility prediction model training process 905. Moreover, signaling described in the example 900 may be implemented to support a UE mobility prediction model inference process 910. A UE mobility prediction model 505 may be trained as part of the UE mobility prediction model training process 905 based at least in part on mobility history data associated with the UE 120 and, in some cases, mobility history data associated with one or more other UEs. The trained UE mobility prediction model 505 may be provided to the network node 110 as part of the UE mobility prediction model inference process 910, so that the network node 110 may generate or determine a UE mobility prediction for the UE 120 using the trained UE mobility prediction model 505. In this way, a UE mobility prediction model 505 may be more quickly updated and more easily maintained in connection with a disaggregated RAN deployment.

In the UE mobility prediction model training process 905, the network node 110 may transmit (and the AMF node 440 may receive) a UE context release request at 915. The network node 110 may transmit (and the AMF node 440 may receive) the UE context release request on a backhaul link between the RAN and the core network 140. The network node 110 may transmit the UE context release request as part of an RRC release operation associated with the UE 120. In some aspects, the RRC release operation may be performed to transition the UE 120 into an RRC idle mode, an RRC inactive mode, and/or another mode in which the RRC context of the UE 120 is released. In some aspects, the RRC release operation may be performed in connection with a path switch or a handover of the UE 120. The UE context release request may be a message that includes a request to release the RRC context of the UE 120.

At 920, the AMF node 440 may transmit (and the network node 110 may receive) a UE context release command. The AMF node 440 may transmit the UE context release command in response to the UE context release request. The UE context release command may be a message that indicates that the network node 110 is to release the RRC context of the UE 120.

At 925, the network node 110 may transmit (and the UE 120 may receive) an RRC release message. The RRC release message may indicate to the UE 120 that the UE 120 is permitted to transition to an RRC idle mode or an RRC inactive mode, or to switch a communication path of the UE 120 as part of a handover.

At 930, the network node 110 may transmit a UE context release complete message to the AMF node 440, and the AMF node 440 may receive the UE context release complete message from the network node 110. The UE context release complete message may include an indication that RRC release of the UE 120 was successfully completed.

At 935, the network node 110 may transmit (and the network node 150 may receive) an event report message. The event report message may include an indication of the RRC release.

As further shown in FIG. 9, the network node 110 may transmit mobility history data to the network node 150, and the network node 150 may receive the mobility history data from the network node 110. The mobility history data may include recent mobility history data associated with the UE 120. The UE 120 may generate and provide the mobility history data to the network node 110, the network node 110 may generate the mobility history data for the UE 120, or a combination thereof.

The network node 150 may store the mobility history data and may generate long-term mobility history data for the UE 120 by accumulating mobility history data for the UE 120. Here, the UE history information upload may occur within the disaggregated RAN. For example, the network node 110 may transmit the mobility history data to the network node 150 on an O1 interface, and the network node 150 may receive the mobility history data from the network node 110 on an O1 interface in implementations where the network node 150 is an SMO node 305 or a non-RT RIC 320. As another example, the network node 110 may transmit the mobility history data to the network node 150 on an E2 interface, and the network node 150 may receive the mobility history data from the network node 110 on an E2 interface in implementations where the network node 150 is a near-RT RIC 325. In some aspects, the mobility history data may be transferred between a near-RT RIC 325 and an SMO node 305 (or a non-RT RIC 320) on an A1 interface.

At 940, the network node 150 may train a UE mobility prediction model (e.g., a UE mobility prediction model 505). The network node 150 may train the UE mobility prediction model based at least in part on the mobility history data received from the network node 110. Training the UE mobility prediction model may include updating the decision-making aspects of the UE mobility prediction model based on the mobility history data such that the UE mobility prediction model may be used for more accurate and up-to-date UE mobility predictions. In some aspects, the UE mobility prediction model may include a UE-specific mobility prediction model associated with the UE 120. Here, the network node 150 may train the UE-specific mobility prediction model based at least in part on long-term mobility history data associated with the UE 120. As an example, the model is trained by a target UE's long period (e.g., several months) history data. The target UE's long term mobility history is implicitly included in the trained model.

As part of the UE mobility prediction model inference process 910, the UE 120 may transmit (and the network node 110 may receive) an RRC setup request message at 945. In some aspects, the UE 120 may transmit the RRC setup request message to the network node 110 to initiate an RRC connection setup procedure with the network node 110. In some aspects, the UE 120 may transmit the RRC setup request message to the network node 110 as part of a handover or a path switch to the network node 110.

At 950, the network node 110 may transmit (and the UE 120 may receive) an RRC setup message. The network node 110 may transmit the RRC setup message as part of an RRC connection setup or handover of the UE 120, and based on receiving the RRC setup request.

At 955, the UE 120 may transmit (and the network node 110 may receive) an RRC setup complete message. The UE 120 may transmit the RRC setup complete message as part of an RRC connection setup or handover of the UE 120, and based on receiving the RRC setup message.

At 960, the network node 110 may transmit (and the AMF node 440 may receive) an initial UE message. The initial UE message may be an initial message from the UE 120 to the AMF node 440 as part of the RRC connection setup or the handover of the UE 120.

At 965, the AMF node 440 may transmit (and the network node 110 may receive) a UE context setup request message. The UE context setup request message may include subscription data associated with the UE 120. The AMF node 440 may transmit the UE context setup request message to the network node 110 based on receiving the initial UE message from the network node 110.

At 970, the network node 110 may transmit (and the network node 150 may receive) an event report message. The event report message may include an indication of the initial UE context setup associated with the UE 120. The network node 110 may transmit the event report message to the network node 150 based on receiving the initial UE context setup request message from the AMF node 440.

At 975, the network node 150 may transmit (and the network node 110 may receive) a UE context setup message. The network node 150 may transmit the UE context setup message to the network node 110 based on receiving the event report message form the network node 110.

Moreover, the network node 150 may transmit the UE mobility prediction model to the network node 110, and the network node 110 may receive the UE mobility prediction model from the network node 150. This may be performed as part of model transfer within the disaggregated RAN. For example, the network node 150 may transmit the UE mobility prediction model to the network node 110 on an O1 interface, and the network node 110 may receive the UE mobility prediction model from the network node 150 on an O1 interface in implementations where the network node 150 is an SMO node 305 or a non-RT RIC 320. As another example, the network node 150 may transmit the UE mobility prediction model to the network node 110 on an E2 interface, and the network node 110 may receive the UE mobility prediction model from the network node 150 on an E2 interface in implementations where the network node 150 is a near-RT RIC 325. In some aspects, the UE mobility prediction model may be transferred between a near-RT RIC 325 and an SMO node 305 (or a non-RT RIC 320) on an A1 interface.

Additionally and/or alternatively, the network node 110 may transmit the UE mobility prediction model to another network node 110 in the RAN as part of a handover of the UE 120. Here, a source network node 110 transfers the UE mobility prediction model to a target network node 110. In an Xn handover, the UE mobility prediction model may be transferred in a handover request. In an NG handover, the UE mobility prediction model may be transferred in a source to target transparent container.

The UE mobility prediction model may be delivered to the network node 110 during an RRC connection setup, during a handover into the network node 110, and/or during another procedure. The network node 110 may use the UE mobility prediction model to generate or determine a UE mobility prediction for the UE 120. For example, network node 110 may use one or more techniques described above in connection with FIG. 5 to generate or determine a UE mobility prediction for the UE 120 based on the UE mobility prediction model.

As indicated above, FIG. 9 is provided as an example. Other examples may differ from what is described with regard to FIG. 9.

Figure 10:
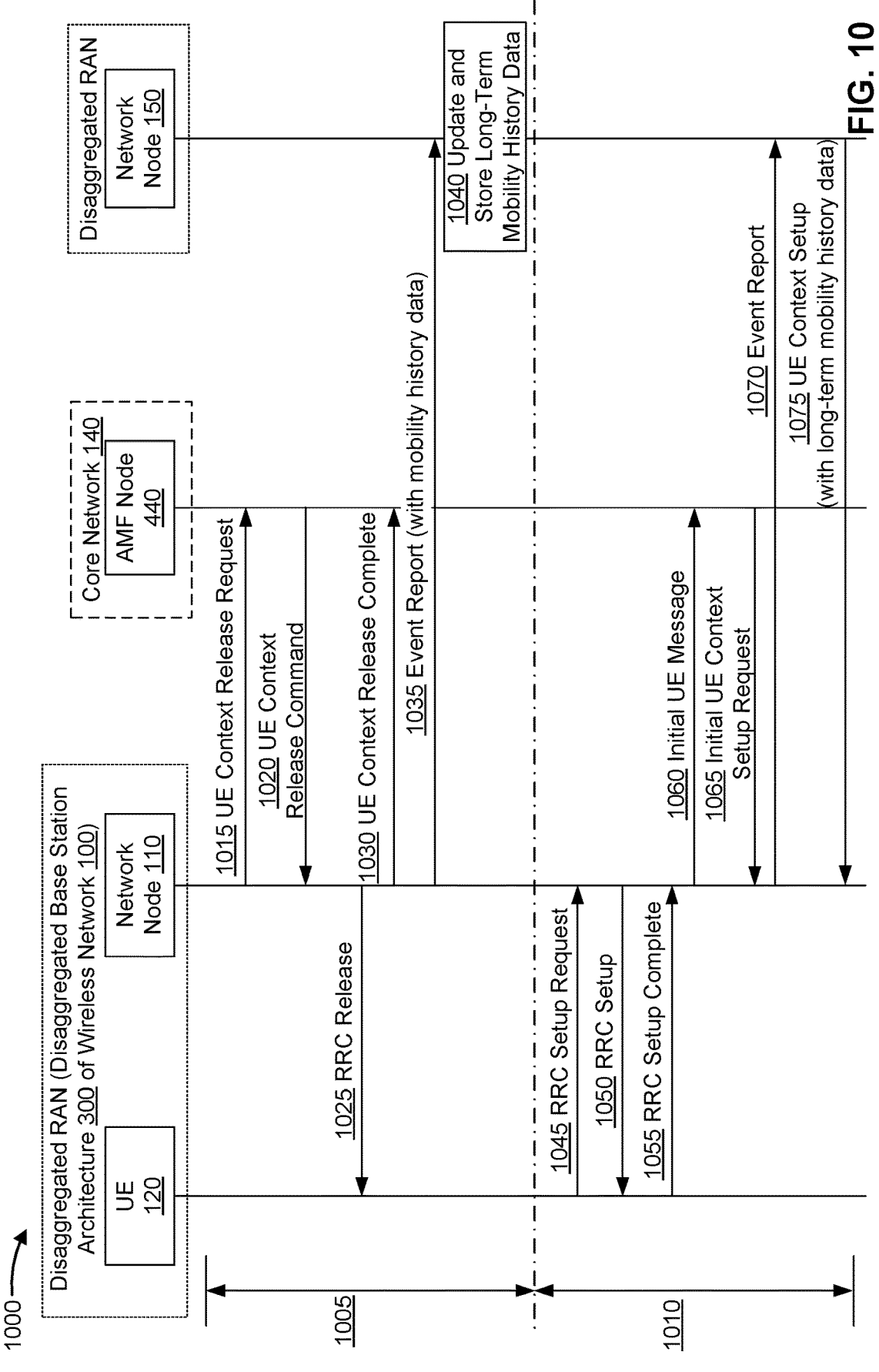
FIG. 10 is a diagram illustrating an example associated with signaling for a UE mobility prediction, in accordance with the present disclosure.

FIG. 10 is a diagram of an example 1000 of signaling for a UE mobility prediction, in accordance with the present disclosure. The example 1000 is similar to the example 900 of FIG. 9, except that the network node 150 updates the long-term mobility history data associated with the UE 120 as opposed to training the UE mobility prediction model. Instead, the network node 150 provides the updated long-term mobility history to the network node 110, which may train the UE mobility prediction model based on the updated long-term mobility history.

As shown in FIG. 10, the example 1000 may include communication among a UE 120 and a plurality of network nodes, including a network node 110, an AMF node 440, and a network node 150. The UE 120 and the network node 110 may be included in a disaggregated RAN of the wireless network 100. The disaggregated RAN may include a disaggregated base station architecture 300 of the wireless network 100. The AMF node 440 may be included in a core network 140 associated with the disaggregated RAN. The network node 150 may also be included in the disaggregated RAN and may include an SMO node 305, a non-RT RIC 320, a near-RT RIC 325, and/or another type of RIC.

The signaling described in the example 1000 may be implemented to support a long-term mobility history updating process 1005. Moreover, signaling described in the example 1000 may be implemented to support a UE mobility prediction model inference process 1010. The long-term mobility history may be provided to the network node 110 as part of the UE mobility prediction model inference process 1010. A UE mobility prediction model 505 may be trained and used as part of the UE mobility prediction model inference process 1010 based at least in part on the long-term mobility history data associated with the UE 120. In some cases, mobility history data associated with one or more other UEs may also be used to train the UE mobility prediction model 505. In this way, a UE mobility prediction model 505 may be more quickly updated and more easily maintained in connection with a disaggregated RAN deployment.

In the long-term mobility history updating training process 1005, the network node 110 may transmit (and the AMF node 440 may receive) a UE context release request at 1015. The network node 110 may transmit (and the AMF node 440 may receive) the UE context release request on a backhaul link between the RAN and the core network 140. The network node 110 may transmit the UE context release request as part of an RRC release operation associated with the UE 120. In some aspects, the RRC release operation may be performed to transition the UE 120 into an RRC idle mode, an RRC inactive mode, and/or another mode in which the RRC context of the UE 120 is released. In some aspects, the RRC release operation may be performed in connection with a path switch or a handover of the UE 120. The UE context release request may be a message that includes a request to release the RRC context of the UE 120.

At 1020, the AMF node 440 may transmit (and the network node 110 may receive) a UE context release command. The AMF node 440 may transmit the UE context release command in response to the UE context release request. The UE context release command may be a message that indicates that the network node 110 is to release the RRC context of the UE 120.

At 1025, the network node 110 may transmit (and the UE 120 may receive) an RRC release message. The RRC release message may indicate to the UE 120 that the UE 120 is permitted to transition to an RRC idle mode or an RRC inactive mode, or to switch a communication path of the UE 120 as part of a handover.

At 1030, the network node 110 may transmit a UE context release complete message to the AMF node 440, and the AMF node 440 may receive the UE context release complete message from the network node 110. The UE context release complete message may include an indication that RRC release of the UE 120 was successfully completed.

At 1035, the network node 110 may transmit (and the network node 150 may receive) an event report message. The event report message may include an indication of the RRC release.

As further shown in FIG. 10, the network node 110 may transmit mobility history data to the network node 150, and the network node 150 may receive the mobility history data from the network node 110. The mobility history data may include recent mobility history data associated with the UE 120. The UE 120 may generate and provide the mobility history data to the network node 110, the network node 110 may generate the mobility history data for the UE 120, or a combination thereof.

The network node 150 may store the mobility history data and may generate long-term mobility history data for the UE 120 by accumulating mobility history data for the UE 120. Here, the UE history information upload may occur within the disaggregated RAN. For example, the network node 110 may transmit the mobility history data to the network node 150 on an O1 interface, and the network node 150 may receive the mobility history data from the network node 110 on an O1 interface in implementations where the network node 150 is an SMO node 305 or a non-RT RIC 320. As another example, the network node 110 may transmit the mobility history data to the network node 150 on an E2 interface, and the network node 150 may receive the mobility history data from the network node 110 on an E2 interface in implementations where the network node 150 is a near-RT RIC 325. In some aspects, the mobility history data may be transferred between a near-RT RIC 325 and an SMO node 305 (or a non-RT RIC 320) on an A1 interface.

At 1040, the network node 150 may update and store long-term mobility history data associated with the UE 120. The network node 150 may update and store the long-term mobility history data associated with the UE 120 by updating any of the UE 120's typical routes, destinations, movement habits, and/or other mobility events that are stable and repeatable over a long duration based at least in part on the mobility history data received from the network node 110. The long-term mobility history data associated with the UE 120 may include statistics of the UE 120's mobility history and/or other mobility history data.

As part of the UE mobility prediction model inference process 1010, the UE 120 may transmit (and the network node 110 may receive) an RRC setup request message at 1045. In some aspects, the UE 120 may transmit the RRC setup request message to the network node 110 to initiate an RRC connection setup procedure with the network node 110. In some aspects, the UE 120 may transmit the RRC setup request message to the network node 110 as part of a handover or a path switch to the network node 110.

At 1050, the network node 110 may transmit (and the UE 120 may receive) an RRC setup message. The network node 110 may transmit the RRC setup message as part of an RRC connection setup or handover of the UE 120, and based on receiving the RRC setup request.

At 1055, the UE 120 may transmit (and the network node 110 may receive) an RRC setup complete message. The UE 120 may transmit the RRC setup complete message as part of an RRC connection setup or handover of the UE 120, and based on receiving the RRC setup message.

At 1060, the network node 110 may transmit (and the AMF node 440 may receive) an initial UE message. The initial UE message may be an initial message from the UE 120 to the AMF node 440 as part of the RRC connection setup or the handover of the UE 120.

At 1065, the AMF node 440 may transmit (and the network node 110 may receive) a UE context setup request message. The UE context setup request message may include subscription data associated with the UE 120. The AMF node 440 may transmit the UE context setup request message to the network node 110 based on receiving the initial UE message from the network node 110.

At 1070, the network node 110 may transmit (and the network node 150 may receive) an event report message. The event report message may include an indication of the initial UE context setup associated with the UE 120. The network node 110 may transmit the event report message to the network node 150 based on receiving the initial UE context setup request message from the AMF node 440.

At 1075, the network node 150 may transmit (and the network node 110 may receive) a UE context setup message. The network node 150 may transmit the UE context setup message to the network node 110 based on receiving the event report message form the network node 110.

Moreover, the network node 150 may transmit the long-term mobility history data associated with the UE 120 to the network node 110, and the network node 110 may receive the long-term mobility history data associated with the UE 120 from the network node 150. This may be performed as part of mobility history transfer within the disaggregated RAN. For example, the network node 150 may transmit the long-term mobility history data associated with the UE 120 to the network node 110 on an O1 interface, and the network node 110 may receive the long-term mobility history data associated with the UE 120 from the network node 150 on an O1 interface in implementations where the network node 150 is an SMO node 305 or a non-RT RIC 320. As another example, the network node 150 may transmit the long-term mobility history data associated with the UE 120 to the network node 110 on an E2 interface, and the network node 110 may receive the long-term mobility history data associated with the UE 120 from the network node 150 on an E2 interface in implementations where the network node 150 is a near-RT RIC 325. In some aspects, the long-term mobility history data associated with the UE 120 may be transferred between a near-RT RIC 325 and an SMO node 305 (or a non-RT RIC 320) on an A1 interface.

Additionally and/or alternatively, the network node 110 may transmit the UE mobility prediction model to another network node 110 in the RAN as part of a handover of the UE 120. Here, a source network node 110 transfers the UE mobility prediction model to a target network node 110. In an Xn handover, the UE mobility prediction model may be transferred in a handover request. In an NG handover, the UE mobility prediction model may be transferred in a source to target transparent container.

The long-term mobility history data associated with the UE 120 may be delivered to the network node 110 during an RRC connection setup, during a handover into the network node 110, and/or during another procedure. The network node 110 may use the long-term mobility history data associated with the UE 120 to train a UE mobility prediction model and use the UE mobility prediction model to generate or determine a UE mobility prediction for the UE 120. The UE mobility prediction model may include a UE-specific mobility prediction model associated with the UE 120 or a common UE mobility prediction model that may be used for a plurality of UEs 120.

A common UE mobility prediction model may refer to a UE mobility prediction model that is trained by a lot of UEs history data (e.g., mobility history data associated with hundreds or thousands of UEs 120). A common UE mobility prediction model may be used for UEs 120 in a specific cell or for predicting the typical next hop(s) of mobility in a specific area. Long-term mobility history data may be used as an optional input parameter of the common UE mobility prediction model.

As indicated above, FIG. 10 is provided as an example. Other examples may differ from what is described with regard to FIG. 10.

Figure 11:
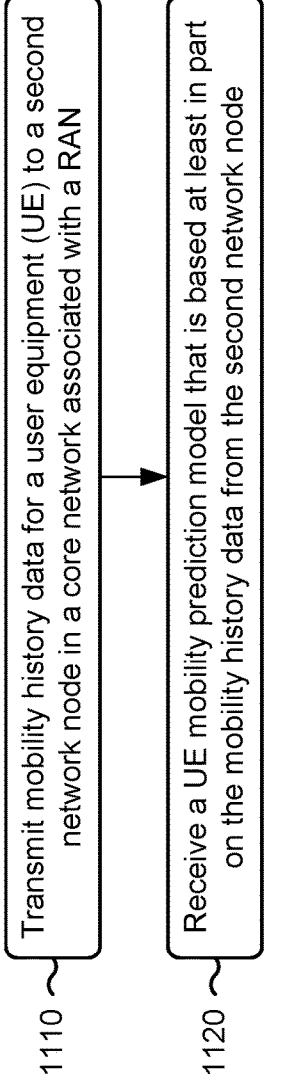
FIG. 11 is a diagram illustrating an example process associated with signaling for a UE mobility prediction, in accordance with the present disclosure.

FIG. 11 is a diagram illustrating an example process 1100 performed, for example, by a first network node, in accordance with the present disclosure. Example process 1100 is an example where the first network node (e.g., a network node 110) performs operations associated with signaling for a UE mobility prediction. The first network node may be included in a RAN.

As shown in FIG. 11, in some aspects, process 1100 may include transmitting mobility history data for a UE to a second network node in a core network associated with the RAN (block 1110). For example, the first network node (e.g., using communication manager 160 and/or transmission component 2104, depicted in FIG. 21) may transmit mobility history data for a UE to a second network node in a core network associated with the RAN, as described above.

As further shown in FIG. 11, in some aspects, process 1100 may include receiving a UE mobility prediction model that is based at least in part on the mobility history data from the second network node (block 1120). For example, the first network node (e.g., using communication manager 160 and/or reception component 2102, depicted in FIG. 21) may receive a UE mobility prediction model that is based at least in part on the mobility history data from the second network node, as described above.

Process 1100 may include additional aspects, such as any single aspect or any combination of aspects described below and/or in connection with one or more other processes described elsewhere herein.

In a first aspect, the second network node is an AMF node.

In a second aspect, alone or in combination with the first aspect, transmitting the mobility history data to the second network node comprises transmitting the mobility history data to the second network node in a UE context release complete message.

In a third aspect, alone or in combination with one or more of the first and second aspects, transmitting the mobility history data to the second network node comprises transmitting the mobility history data to the second network node in a path switch request message.

In a fourth aspect, alone or in combination with one or more of the first through third aspects, receiving the UE mobility prediction model from the second network node comprises receiving the UE mobility prediction model from the second network node during an RRC connection setup procedure for the UE.

In a fifth aspect, alone or in combination with one or more of the first through fourth aspects, receiving the UE mobility prediction model from the second network node comprises receiving the UE mobility prediction model from the second network node during a handover procedure for the UE.

In a sixth aspect, alone or in combination with one or more of the first through fifth aspects, receiving the UE mobility prediction model from the second network node comprises receiving the UE mobility prediction model from the second network node in an initial UE context setup request message.

In a seventh aspect, alone or in combination with one or more of the first through sixth aspects, receiving the UE mobility prediction model from the second network node comprises receiving the UE mobility prediction model from the second network node in a UE context modification request message.

In an eighth aspect, alone or in combination with one or more of the first through seventh aspects, receiving the UE mobility prediction model from the second network node comprises receiving the UE mobility prediction model from the second network node in a path switch request acknowledgement message.

In a ninth aspect, alone or in combination with one or more of the first through eighth aspects, the UE mobility prediction model is trained based at least in part on recent mobility history data associated with a UE, and long-term mobility history data collected for the UE.

In a tenth aspect, alone or in combination with one or more of the first through ninth aspects, the UE mobility prediction model comprises a UE-specific UE mobility prediction model for the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
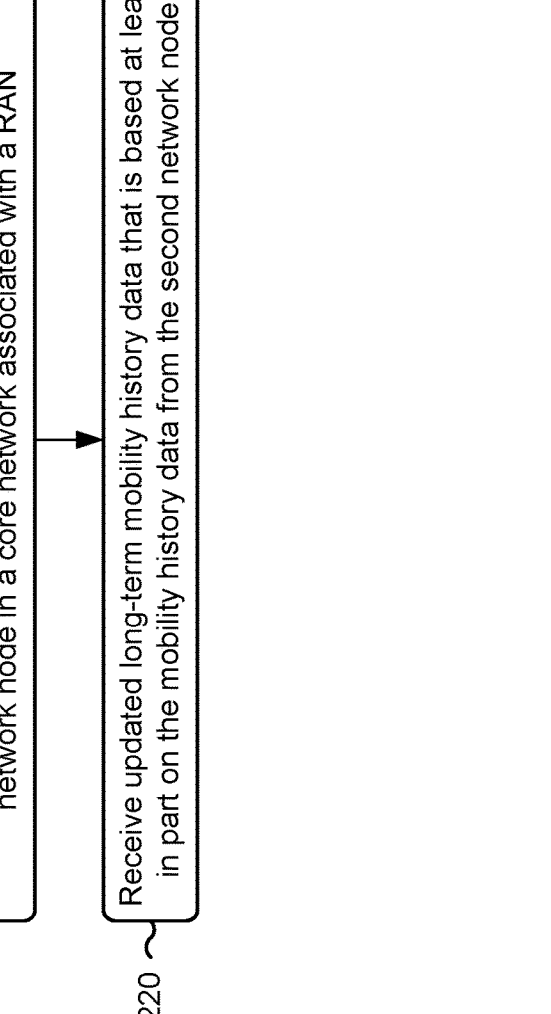
FIG. 12 is a diagram illustrating an example process associated with signaling for a UE mobility prediction, in accordance with the present disclosure.

FIG. 12 is a diagram illustrating an example process 1200 performed, for example, by a first network node, in accordance with the present disclosure. Example process 1200 is an example where the first network node (e.g., a network node 110) performs operations associated with signaling for UE mobility prediction. The first network node may be included in a RAN.

As shown in FIG. 12, in some aspects, process 1200 may include transmitting mobility history data for a UE to a second network node in a core network associated with the RAN (block 1210). For example, the first network node (e.g., using communication manager 160 and/or transmission component 2104, depicted in FIG. 21) may transmit mobility history data for a UE to a second network node in a core network associated with the RAN, as described above.

As further shown in FIG. 12, in some aspects, process 1200 may include receiving updated long-term mobility history data that is based at least in part on the mobility history data from the second network node (block 1220). For example, the first network node (e.g., using communication manager 160 and/or reception component 2102, depicted in FIG. 21) may receive updated long-term mobility history data that is based at least in part on the mobility history data from the second network node, as described above.

Process 1200 may include additional aspects, such as any single aspect or any combination of aspects described below and/or in connection with one or more other processes described elsewhere herein.

In a first aspect, the second network node is an AMF node.

In a second aspect, alone or in combination with the first aspect, transmitting the mobility history data to the second network node comprises transmitting the mobility history data to the second network node in a UE context release complete message.

In a third aspect, alone or in combination with one or more of the first and second aspects, transmitting the mobility history data to the second network node comprises transmitting the mobility history data to the second network node in a path switch request message.

In a fourth aspect, alone or in combination with one or more of the first through third aspects, receiving the updated long-term mobility history data from the second network node comprises receiving the updated long-term mobility history data from the second network node during an RRC connection setup procedure for the UE.

In a fifth aspect, alone or in combination with one or more of the first through fourth aspects, receiving the updated long-term mobility history data from the second network node comprises receiving the updated long-term mobility history data from the second network node during a handover procedure for the UE.

In a sixth aspect, alone or in combination with one or more of the first through fifth aspects, receiving the updated long-term mobility history data from the second network node comprises receiving the updated long-term mobility history data from the second network node in an initial UE context setup request message.

In a seventh aspect, alone or in combination with one or more of the first through sixth aspects, receiving the updated long-term mobility history data from the second network node comprises receiving the updated long-term mobility history data from the second network node in a UE context modification request message.

In an eighth aspect, alone or in combination with one or more of the first through seventh aspects, receiving the updated long-term mobility history data from the second network node comprises receiving the updated long-term mobility history data from the second network node in a path switch request acknowledgement message.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
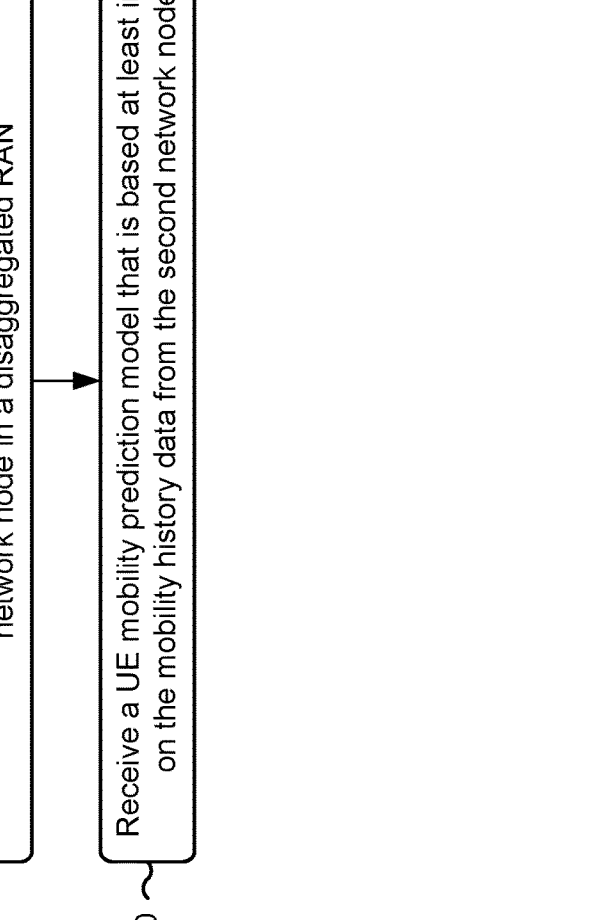
FIG. 13 is a diagram illustrating an example process associated with signaling for a UE mobility prediction, in accordance with the present disclosure.

FIG. 13 is a diagram illustrating an example process 1300 performed, for example, by a first network node, in accordance with the present disclosure. Example process 1300 is an example where the first network node (e.g., a network node 110) performs operations associated with signaling for a UE mobility prediction. The first network node may be included in a disaggregated RAN.

As shown in FIG. 13, in some aspects, process 1300 may include transmitting mobility history data for a UE to a second network node in the disaggregated RAN (block 1310). For example, the first network node (e.g., using communication manager 160 and/or transmission component 2104, depicted in FIG. 21) may transmit mobility history data for a UE to a second network node in the disaggregated RAN, as described above.

As further shown in FIG. 13, in some aspects, process 1300 may include receiving a UE mobility prediction model that is based at least in part on the mobility history data from the second network node (block 1320). For example, the first network node (e.g., using communication manager 160 and/or reception component 2102, depicted in FIG. 21) may receive a UE mobility prediction model that is based at least in part on the mobility history data from the second network node, as described above.

Process 1300 may include additional aspects, such as any single aspect or any combination of aspects described below and/or in connection with one or more other processes described elsewhere herein.

In a first aspect, the first network node is a base station.

In a second aspect, alone or in combination with the first aspect, the first network node is a central unit.

In a third aspect, alone or in combination with one or more of the first and second aspects, the first network node is a distributed unit.

In a fourth aspect, alone or in combination with one or more of the first through third aspects, the first network node is a radio unit.

In a fifth aspect, alone or in combination with one or more of the first through fourth aspects, the second network node is an SMO node.

In a sixth aspect, alone or in combination with one or more of the first through fifth aspects, the second network node is an RIC node.

In a seventh aspect, alone or in combination with one or more of the first through sixth aspects, transmitting the mobility history data to the second network node comprises transmitting the mobility history data to the second network node in an event report.

In an eighth aspect, alone or in combination with one or more of the first through seventh aspects, receiving the UE mobility prediction model from the second network node comprises receiving the UE mobility prediction model from the second network node during an RRC connection setup procedure for the UE.

In a ninth aspect, alone or in combination with one or more of the first through eighth aspects, receiving the UE mobility prediction model from the second network node comprises receiving the UE mobility prediction model from the second network node during a handover procedure for the UE.

In a tenth aspect, alone or in combination with one or more of the first through ninth aspects, receiving the UE mobility prediction model from the second network node comprises receiving the UE mobility prediction model from the second network node in a UE context setup message.

In an eleventh aspect, alone or in combination with one or more of the first through tenth aspects, the UE mobility prediction model is trained based at least in part on recent mobility history data associated with a UE, and long-term mobility history data collected for the UE.

In a twelfth aspect, alone or in combination with one or more of the first through eleventh aspects, the UE mobility prediction model comprises a UE-specific UE mobility prediction model for the UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
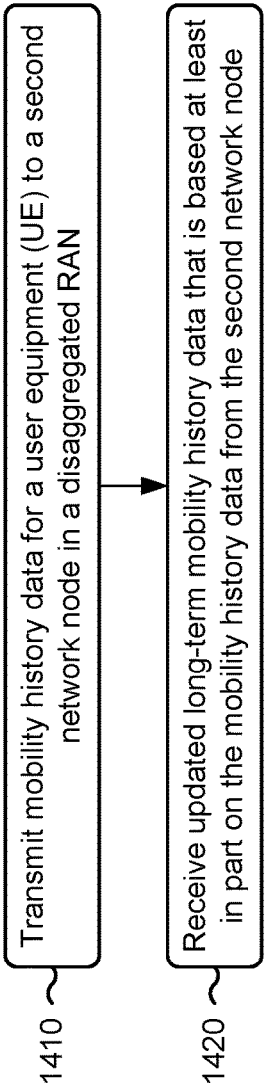
FIG. 14 is a diagram illustrating an example process associated with signaling for a UE mobility prediction, in accordance with the present disclosure.

FIG. 14 is a diagram illustrating an example process 1400 performed, for example, by a first network node, in accordance with the present disclosure. Example process 1400 is an example where the first network node (e.g., a network node 110) performs operations associated with signaling for a UE mobility prediction. The first network node may be included in a disaggregated RAN.

As shown in FIG. 14, in some aspects, process 1400 may include transmitting mobility history data for a UE to a second network node in the disaggregated RAN (block 1410). For example, the first network node (e.g., using communication manager 160 and/or transmission component 2104, depicted in FIG. 21) may transmit mobility history data for a UE to a second network node in the disaggregated RAN, as described above.

As further shown in FIG. 14, in some aspects, process 1400 may include receiving updated long-term mobility history data that is based at least in part on the mobility history data from the second network node (block 1420). For example, the first network node (e.g., using communication manager 160 and/or reception component 2102, depicted in FIG. 21) may receive updated long-term mobility history data that is based at least in part on the mobility history data from the second network node, as described above.

Process 1400 may include additional aspects, such as any single aspect or any combination of aspects described below and/or in connection with one or more other processes described elsewhere herein.

In a first aspect, the first network node is a base station.

In a second aspect, alone or in combination with the first aspect, the first network node is a central unit.

In a third aspect, alone or in combination with one or more of the first and second aspects, the first network node is a distributed unit.

In a fourth aspect, alone or in combination with one or more of the first through third aspects, the first network node is a radio unit.

In a fifth aspect, alone or in combination with one or more of the first through fourth aspects, the second network node is an SMO node.

In a sixth aspect, alone or in combination with one or more of the first through fifth aspects, the second network node is an RIC node.

In a seventh aspect, alone or in combination with one or more of the first through sixth aspects, transmitting the mobility history data to the second network node comprises transmitting the mobility history data to the second network node in an event report.

In an eighth aspect, alone or in combination with one or more of the first through seventh aspects, receiving the updated long-term mobility history data from the second network node comprises receiving the updated long-term mobility history data from the second network node during an RRC connection setup procedure for the UE.

In a ninth aspect, alone or in combination with one or more of the first through eighth aspects, receiving the updated long-term mobility history data from the second network node comprises receiving the updated long-term mobility history data from the second network node during a handover procedure for the UE.

In a tenth aspect, alone or in combination with one or more of the first through ninth aspects, receiving the updated long-term mobility history data from the second network node comprises receiving the updated long-term mobility history data from the second network node in a UE context setup message.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
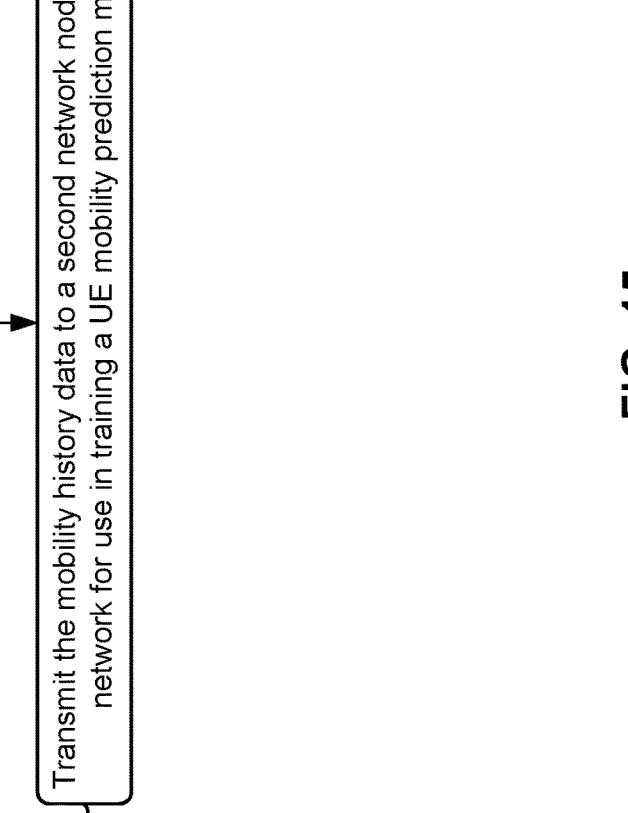
FIG. 15 is a diagram illustrating an example process associated with signaling for a UE mobility prediction, in accordance with the present disclosure.

FIG. 15 is a diagram illustrating an example process 1500 performed, for example, by a first network node, in accordance with the present disclosure. Example process 1500 is an example where the first network node (e.g., a network node 130) performs operations associated with signaling for a UE mobility prediction. The network node may be included in a core network.

As shown in FIG. 15, in some aspects, process 1500 may include receiving mobility history data associated with a UE (block 1510). For example, the first network node (e.g., using communication manager 170 and/or reception component 2402, depicted in FIG. 24) may receive mobility history data associated with a UE, as described above.

As further shown in FIG. 15, in some aspects, process 1500 may include transmitting the mobility history data to a second network node in the core network for use in training a UE mobility prediction model (block 1520). For example, the first network node (e.g., using communication manager 170 and/or transmission component 2404, depicted in FIG. 24) may transmit the mobility history data to a second network node in the core network for use in training a UE mobility prediction model, as described above.

Process 1500 may include additional aspects, such as any single aspect or any combination of aspects described below and/or in connection with one or more other processes described elsewhere herein.

In a first aspect, receiving the mobility history data comprises receiving the mobility history data from a third network node that is included in a RAN associated with the core network.

In a second aspect, alone or in combination with the first aspect, receiving the mobility history data from the third network node comprises receiving the mobility history data from the third network node in a UE context release complete message.

In a third aspect, alone or in combination with one or more of the first and second aspects, receiving the mobility history data from the third network node comprises receiving the mobility history data from the third network node in a path switch request message.

In a fourth aspect, alone or in combination with one or more of the first through third aspects, the first network node is an AMF node, and the third network node is a base station.

In a fifth aspect, alone or in combination with one or more of the first through fourth aspects, the second network node is at least one of a UDM node, a UDR node, or an HSS node.

In a sixth aspect, alone or in combination with one or more of the first through fifth aspects, the second network node is a network data analytics function (NWDAF) node.

In a seventh aspect, alone or in combination with one or more of the first through sixth aspects, the second network node is a machine learning model server node.

In an eighth aspect, alone or in combination with one or more of the first through seventh aspects, transmitting the mobility history data to the second network node comprises transmitting the mobility history data to the second network node for use in training a UE mobility prediction model.

In a ninth aspect, alone or in combination with one or more of the first through eighth aspects, process 1500 includes receiving the UE mobility prediction model from the second network node, and transmitting the UE mobility prediction model to a third network node that is included in a RAN associated with the core network.

In a tenth aspect, alone or in combination with one or more of the first through ninth aspects, transmitting the UE mobility prediction model to the third network node comprises transmitting the UE mobility prediction model to the third network node during an RRC connection setup procedure for the UE.

In an eleventh aspect, alone or in combination with one or more of the first through tenth aspects, transmitting the UE mobility prediction model to the third network node comprises transmitting the UE mobility prediction model to the third network node during a handover procedure for the UE.

In a twelfth aspect, alone or in combination with one or more of the first through eleventh aspects, transmitting the UE mobility prediction model to the third network node comprises transmitting the UE mobility prediction model to the third network node in an initial UE context setup request message.

In a thirteenth aspect, alone or in combination with one or more of the first through twelfth aspects, transmitting the UE mobility prediction model to the third network node comprises transmitting the UE mobility prediction model to the third network node in a UE context modification request message.

In a fourteenth aspect, alone or in combination with one or more of the first through thirteenth aspects, transmitting the UE mobility prediction model to the third network node comprises transmitting the UE mobility prediction model to the third network node in a path switch request acknowledgement message.

In a fifteenth aspect, alone or in combination with one or more of the first through fourteenth aspects, the UE mobility prediction model is trained based at least in part on the mobility history data, and long-term mobility history data collected for the UE.

In a sixteenth aspect, alone or in combination with one or more of the first through fifteenth aspects, transmitting the mobility history data to the second network node comprises transmitting the mobility history data to the second network node for storage at the second network node.

In a seventeenth aspect, alone or in combination with one or more of the first through sixteenth aspects, process 1500 includes receiving long-term mobility history data from the second network node, wherein the long-term mobility history data is based at least in part on the mobility history data, and transmitting the long-term mobility history data to a third network node that is included in a RAN associated with the core network.

In an eighteenth aspect, alone or in combination with one or more of the first through seventeenth aspects, transmitting the long-term mobility history data to the third network node comprises transmitting the long-term mobility history data to the third network node during an RRC connection setup procedure for the UE.

In a nineteenth aspect, alone or in combination with one or more of the first through eighteenth aspects, transmitting the long-term mobility history data to the third network node comprises transmitting the long-term mobility history data to the third network node during a handover procedure for the UE.

In a twentieth aspect, alone or in combination with one or more of the first through nineteenth aspects, transmitting the long-term mobility history data to the third network node comprises transmitting the long-term mobility history data to the third network node in an initial UE context setup request message.

In a twenty-first aspect, alone or in combination with one or more of the first through twentieth aspects, transmitting the long-term mobility history data to the third network node comprises transmitting the long-term mobility history data to the third network node in a UE context modification request message.

In a twenty-second aspect, alone or in combination with one or more of the first through twenty-first aspects, transmitting the long-term mobility history data to the third network node comprises transmitting the long-term mobility history data to the third network node in a path switch request acknowledgement message.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
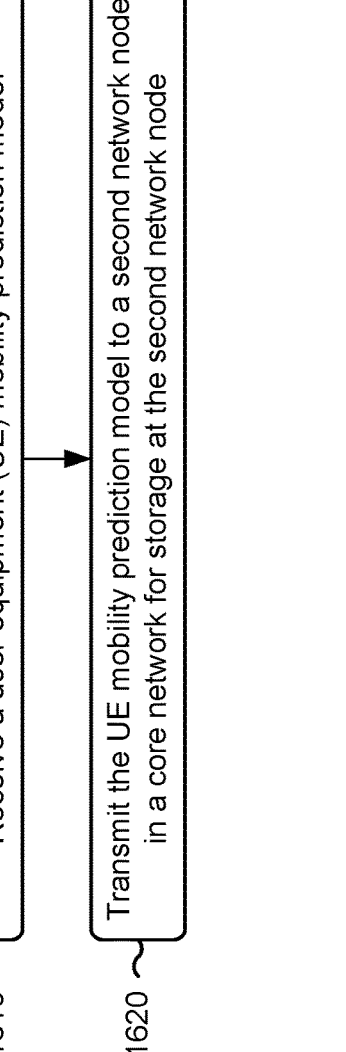
FIG. 16 is a diagram illustrating an example process associated with signaling for a UE mobility prediction, in accordance with the present disclosure.

FIG. 16 is a diagram illustrating an example process 1600 performed, for example, by a first network node, in accordance with the present disclosure. Example process 1600 is an example where the first network node (e.g., a network node 130) performs operations associated with signaling for a UE mobility prediction. The first network node may be included in a core network.

As shown in FIG. 16, in some aspects, process 1600 may include receiving a UE mobility prediction model (block 1610). For example, the first network node (e.g., using communication manager 170 and/or reception component 2402, depicted in FIG. 24) may receive a UE mobility prediction model, as described above.

As further shown in FIG. 16, in some aspects, process 1600 may include transmitting the UE mobility prediction model to a second network node in the core network for storage at the second network node (block 1620). For example, the first network node (e.g., using communication manager 170 and/or transmission component 2404, depicted in FIG. 24) may transmit the UE mobility prediction model to a second network node in the core network for storage at the second network node, as described above.

Process 1600 may include additional aspects, such as any single aspect or any combination of aspects described below and/or in connection with one or more other processes described elsewhere herein.

In a first aspect, receiving the UE mobility prediction model comprises receiving the UE mobility prediction model from a third network node that is included in a RAN associated with the core network.

In a second aspect, alone or in combination with the first aspect, receiving the UE mobility prediction model from the third network node comprises receiving the UE mobility prediction model from the third network node in a UE context release complete message.

In a third aspect, alone or in combination with one or more of the first and second aspects, receiving the UE mobility prediction model from the third network node comprises receiving the UE mobility prediction model from the third network node in a path switch request message.

In a fourth aspect, alone or in combination with one or more of the first through third aspects, the first network node is an AMF node, and the third network node is a base station.

In a fifth aspect, alone or in combination with one or more of the first through fourth aspects, the second network node is a UDM node.

In a sixth aspect, alone or in combination with one or more of the first through fifth aspects, the second network node is a UDR node.

In a seventh aspect, alone or in combination with one or more of the first through sixth aspects, the second network node is an HSS node.

In an eighth aspect, alone or in combination with one or more of the first through seventh aspects, the second network node is an NWDAF node.

In a ninth aspect, alone or in combination with one or more of the first through eighth aspects, the second network node is a machine learning model server node.

In a tenth aspect, alone or in combination with one or more of the first through ninth aspects, process 1600 includes receiving the UE mobility prediction model from the second network node, and transmitting the UE mobility prediction model to a third network node that is included in a RAN associated with the core network.

In an eleventh aspect, alone or in combination with one or more of the first through tenth aspects, transmitting the UE mobility prediction model to the third network node comprises transmitting the UE mobility prediction model to the third network node during an RRC connection setup procedure for the UE.

In a twelfth aspect, alone or in combination with one or more of the first through eleventh aspects, transmitting the UE mobility prediction model to the third network node comprises transmitting the UE mobility prediction model to the third network node during a handover procedure for the UE.

In a thirteenth aspect, alone or in combination with one or more of the first through twelfth aspects, transmitting the UE mobility prediction model to the third network node comprises transmitting the UE mobility prediction model to the third network node in an initial UE context setup request message.

In a fourteenth aspect, alone or in combination with one or more of the first through thirteenth aspects, transmitting the UE mobility prediction model to the third network node comprises transmitting the UE mobility prediction model to the third network node in a UE context modification request message.

In a fifteenth aspect, alone or in combination with one or more of the first through fourteenth aspects, transmitting the UE mobility prediction model to the third network node comprises transmitting the UE mobility prediction model to the third network node in a path switch request acknowledgement message.

In a sixteenth aspect, alone or in combination with one or more of the first through fifteenth aspects, the UE mobility prediction model is trained based at least in part on recent mobility history data associated with a UE, and long-term mobility history data collected for the UE.

In a seventeenth aspect, alone or in combination with one or more of the first through sixteenth aspects, the UE mobility prediction model comprises a UE-specific UE mobility prediction model for the UE.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
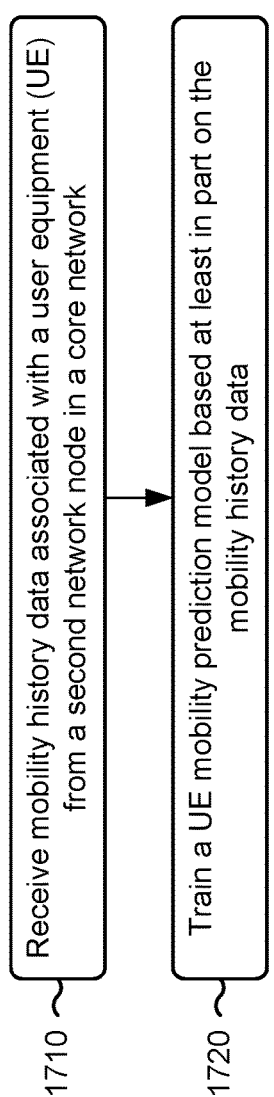
FIG. 17 is a diagram illustrating an example process associated with signaling for a UE mobility prediction, in accordance with the present disclosure.

FIG. 17 is a diagram illustrating an example process 1700 performed, for example, by a first network node, in accordance with the present disclosure. Example process 1700 is an example where the first network node (e.g., a network node 130) performs operations associated with signaling for a UE mobility prediction. The first network node may be included in a core network.

As shown in FIG. 17, in some aspects, process 1700 may include receiving mobility history data associated with a UE from a second network node in the core network (block 1710). For example, the first network node (e.g., using communication manager 180 and/or reception component 2702, depicted in FIG. 27) may receive mobility history data associated with a UE from a second network node in the core network, as described above.

As further shown in FIG. 17, in some aspects, process 1700 may include training a UE mobility prediction model based at least in part on the mobility history data (block 1720). For example, the first network node (e.g., using communication manager 180 and/or training component 2708, depicted in FIG. 27) may train a UE mobility prediction model based at least in part on the mobility history data, as described above.

Process 1700 may include additional aspects, such as any single aspect or any combination of aspects described below and/or in connection with one or more other processes described elsewhere herein.

In a first aspect, the second network node is an AMF node.

In a second aspect, alone or in combination with the first aspect, the first network node is a UDM node.

In a third aspect, alone or in combination with one or more of the first and second aspects, the first network node is a UDR node.

In a fourth aspect, alone or in combination with one or more of the first through third aspects, the first network node is a HSS node.

In a fifth aspect, alone or in combination with one or more of the first through fourth aspects, the first network node is an NWDAF node.

In a sixth aspect, alone or in combination with one or more of the first through fifth aspects, the first network node is a machine learning model server node.

In a seventh aspect, alone or in combination with one or more of the first through sixth aspects, training the UE mobility prediction model comprises training a UE-specific UE mobility prediction model for the UE.

In an eighth aspect, alone or in combination with one or more of the first through seventh aspects, process 1700 includes transmitting the UE mobility prediction model to the second network node.

In a ninth aspect, alone or in combination with one or more of the first through eighth aspects, transmitting the UE mobility prediction model to the second network node comprises transmitting the UE mobility prediction model to the second network node during an RRC connection setup procedure for the UE.

In a tenth aspect, alone or in combination with one or more of the first through ninth aspects, transmitting the UE mobility prediction model to the second network node comprises transmitting the UE mobility prediction model to the second network node during a handover procedure for the UE.

In an eleventh aspect, alone or in combination with one or more of the first through tenth aspects, transmitting the UE mobility prediction model to the second network node comprises transmitting the UE mobility prediction model to the second network node in a UDM response message.

In a twelfth aspect, alone or in combination with one or more of the first through eleventh aspects, training the UE mobility prediction model comprises training the UE mobility prediction model based at least in part on long-term mobility history data collected for the UE.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
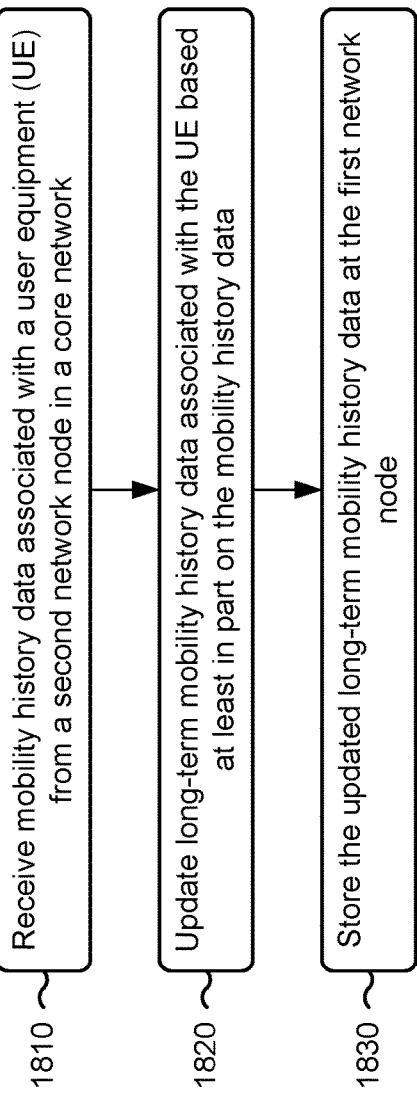
FIG. 18 is a diagram illustrating an example process associated with signaling for a UE mobility prediction, in accordance with the present disclosure.

FIG. 18 is a diagram illustrating an example process 1800 performed, for example, by a first network node, in accordance with the present disclosure. Example process 1800 is an example where the first network node (e.g., a network node 130) performs operations associated with signaling for a UE mobility prediction. The first network node may be included in a core network.

As shown in FIG. 18, in some aspects, process 1800 may include receiving mobility history data associated with a UE from a second network node in the core network (block 1810). For example, the first network node (e.g., using communication manager 180 and/or reception component 2702, depicted in FIG. 27) may receive mobility history data associated with a UE from a second network node in the core network, as described above.

As further shown in FIG. 18, in some aspects, process 1800 may include updating long-term mobility history data associated with the UE based at least in part on the mobility history data (block 1820). For example, the first network node (e.g., using communication manager 180 and/or updating component 2710, depicted in FIG. 27) may update long-term mobility history data associated with the UE based at least in part on the mobility history data, as described above.

As further shown in FIG. 18, in some aspects, process 1800 may include storing the updated long-term mobility history data at the first network node (block 1830). For example, the first network node (e.g., using communication manager 180 and/or storage component 2712, depicted in FIG. 27) may store the updated long-term mobility history data at the first network node, as described above.

Process 1800 may include additional aspects, such as any single aspect or any combination of aspects described below and/or in connection with one or more other processes described elsewhere herein.

In a first aspect, the second network node is an AMF node.

In a second aspect, alone or in combination with the first aspect, the first network node is a UDM node.

In a third aspect, alone or in combination with one or more of the first and second aspects, the first network node is a UDR node.

In a fourth aspect, alone or in combination with one or more of the first through third aspects, the first network node is an HSS node.

In a fifth aspect, alone or in combination with one or more of the first through fourth aspects, the first network node is an NWDAF node.

In a sixth aspect, alone or in combination with one or more of the first through fifth aspects, the first network node is a machine learning model server node.

In a seventh aspect, alone or in combination with one or more of the first through sixth aspects, process 1800 includes transmitting the updated long-term mobility history data to the second network node.

In an eighth aspect, alone or in combination with one or more of the first through seventh aspects, transmitting the updated long-term mobility history data to the second network node comprises transmitting the updated long-term mobility history data to the second network node during an RRC connection setup procedure for the UE.

In a ninth aspect, alone or in combination with one or more of the first through eighth aspects, transmitting the updated long-term mobility history data to the second network node comprises transmitting the updated long-term mobility history data to the second network node during a handover procedure for the UE.

In a tenth aspect, alone or in combination with one or more of the first through ninth aspects, transmitting the updated long-term mobility history data to the second network node comprises transmitting the updated long-term mobility history data to the second network node in a UDM response message.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
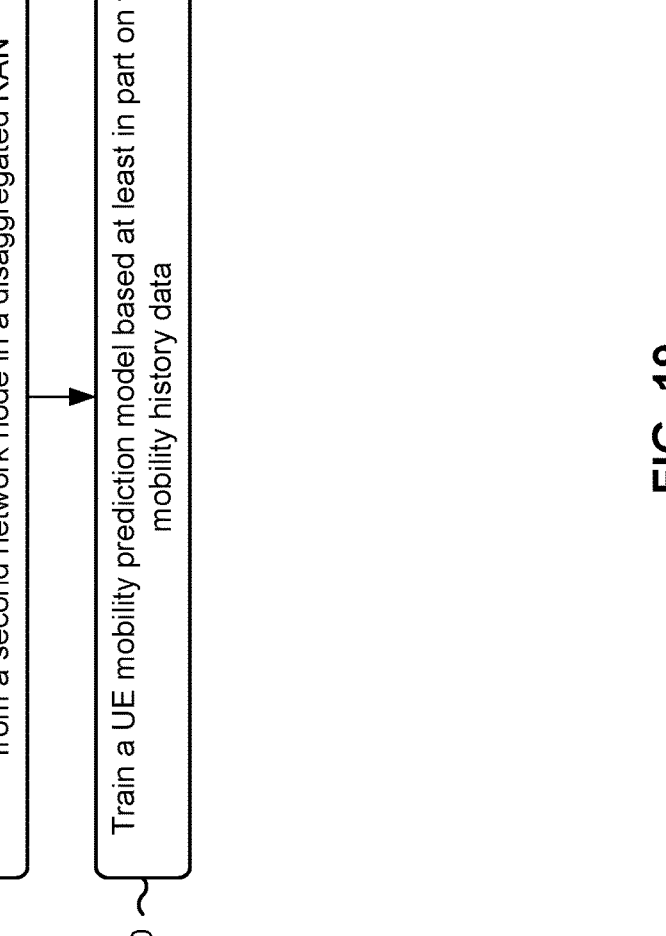
FIG. 19 is a diagram illustrating an example process associated with signaling for a UE mobility prediction, in accordance with the present disclosure.

FIG. 19 is a diagram illustrating an example process 1900 performed, for example, by a first network node, in accordance with the present disclosure. Example process 1900 is an example where the first network node (e.g., a network node 150) performs operations associated with signaling for a UE mobility prediction. The first network node may be included in a disaggregated RAN.

As shown in FIG. 19, in some aspects, process 1900 may include receiving mobility history data associated with a UE from a second network node in the disaggregated RAN (block 1910). For example, the first network node (e.g., using communication manager 190 and/or reception component 3002, depicted in FIG. 30) may receive mobility history data associated with a UE from a second network node in the disaggregated RAN, as described above.

As further shown in FIG. 19, in some aspects, process 1900 may include training a UE mobility prediction model based at least in part on the mobility history data (block 1920). For example, the first network node (e.g., using communication manager 190 and/or training component 3008, depicted in FIG. 30) may train a UE mobility prediction model based at least in part on the mobility history data, as described above.

Process 1900 may include additional aspects, such as any single aspect or any combination of aspects described below and/or in connection with one or more other processes described elsewhere herein.

In a first aspect, the second network node is a base station.

In a second aspect, alone or in combination with the first aspect, the second network node is a central unit.

In a third aspect, alone or in combination with one or more of the first and second aspects, the second network node is a distributed unit.

In a fourth aspect, alone or in combination with one or more of the first through third aspects, the second network node is a radio unit.

In a fifth aspect, alone or in combination with one or more of the first through fourth aspects, the first network node is an SMO node.

In a sixth aspect, alone or in combination with one or more of the first through fifth aspects, the first network node is an RIC node.

In a seventh aspect, alone or in combination with one or more of the first through sixth aspects, training the UE mobility prediction model comprises training a UE-specific UE mobility prediction model for the UE.

In an eighth aspect, alone or in combination with one or more of the first through seventh aspects, process 1900 includes transmitting the UE mobility prediction model to the second network node.

In a ninth aspect, alone or in combination with one or more of the first through eighth aspects, receiving the mobility history data from the second network node comprises receiving the mobility history data in an event report from the second network node.

In a tenth aspect, alone or in combination with one or more of the first through ninth aspects, transmitting the UE mobility prediction model to the second network node comprises transmitting the UE mobility prediction model to the second network node during a RRC connection setup procedure for the UE.

In an eleventh aspect, alone or in combination with one or more of the first through tenth aspects, transmitting the UE mobility prediction model to the second network node comprises transmitting the UE mobility prediction model to the second network node during a handover procedure for the UE.

In a twelfth aspect, alone or in combination with one or more of the first through eleventh aspects, transmitting the UE mobility prediction model to the second network node comprises transmitting the UE mobility prediction model to the second network node in a UE context setup message.

In a thirteenth aspect, alone or in combination with one or more of the first through twelfth aspects, training the UE mobility prediction model comprises training the UE mobility prediction model based at least in part on long-term mobility history data collected for the UE.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
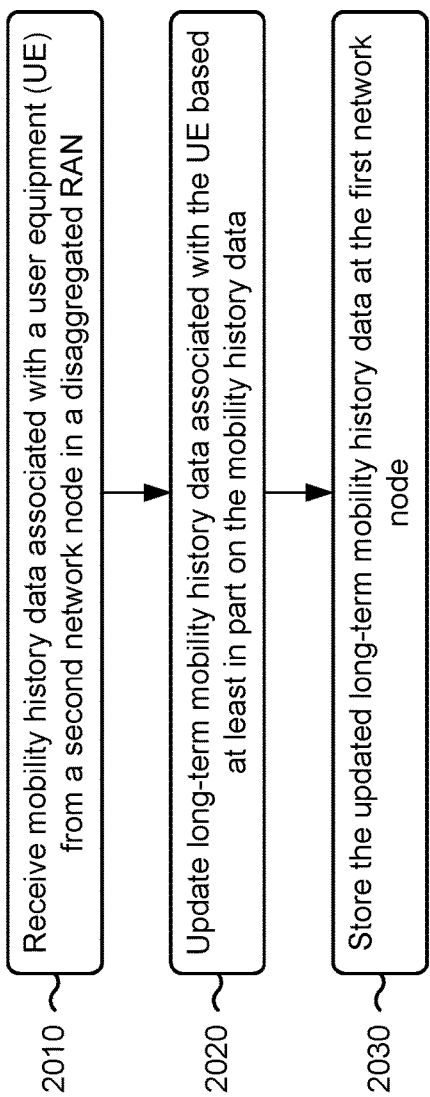
FIG. 20 is a diagram illustrating an example process associated with signaling for a UE mobility prediction, in accordance with the present disclosure.
Figure 20:
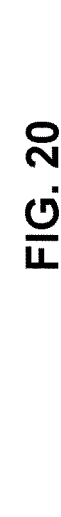

FIG. 20 is a diagram illustrating an example process 2000 performed, for example, by a first network node, in accordance with the present disclosure. Example process 2000 is an example where the first network node (e.g., a network node 150) performs operations associated with signaling for a UE mobility prediction. The first network node 150 may be included in a disaggregated RAN.

As shown in FIG. 20, in some aspects, process 2000 may include receiving mobility history data associated with a UE from a second network node in the disaggregated RAN (block 2010). For example, the first network node (e.g., using communication manager 190 and/or reception component 3002, depicted in FIG. 30) may receive mobility history data associated with a UE from a second network node in the disaggregated RAN, as described above.

As further shown in FIG. 20, in some aspects, process 2000 may include updating long-term mobility history data associated with the UE based at least in part on the mobility history data (block 2020). For example, the first network node (e.g., using communication manager 190 and/or updating component 3010, depicted in FIG. 30) may update long-term mobility history data associated with the UE based at least in part on the mobility history data, as described above.

As further shown in FIG. 20, in some aspects, process 2000 may include storing the updated long-term mobility history data at the first network node (block 2030). For example, the first network node (e.g., using communication manager 190 and/or storage component 3012, depicted in FIG. 30) may store the updated long-term mobility history data at the first network node, as described above.

Process 2000 may include additional aspects, such as any single aspect or any combination of aspects described below and/or in connection with one or more other processes described elsewhere herein.

In a first aspect, the second network node is a base station.

In a second aspect, alone or in combination with the first aspect, the second network node is a central unit.

In a third aspect, alone or in combination with one or more of the first and second aspects, the second network node is a distributed unit.

In a fourth aspect, alone or in combination with one or more of the first through third aspects, the second network node is a radio unit.

In a fifth aspect, alone or in combination with one or more of the first through fourth aspects, the first network node is an SMO node.

In a sixth aspect, alone or in combination with one or more of the first through fifth aspects, the first network node is an RIC node.

In a seventh aspect, alone or in combination with one or more of the first through sixth aspects, process 2000 includes transmitting the updated long-term mobility history data to the second network node.

In an eighth aspect, alone or in combination with one or more of the first through seventh aspects, transmitting the updated long-term mobility history data to the second network node comprises transmitting the updated long-term mobility history data to the second network node during an RRC connection setup procedure for the UE.

In a ninth aspect, alone or in combination with one or more of the first through eighth aspects, transmitting the updated long-term mobility history data to the second network node comprises transmitting the updated long-term mobility history data to the second network node during a handover procedure for the UE.

In a tenth aspect, alone or in combination with one or more of the first through ninth aspects, transmitting the updated long-term mobility history data to the second network node comprises transmitting the updated long-term mobility history data to the second network node in a UE context setup message.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
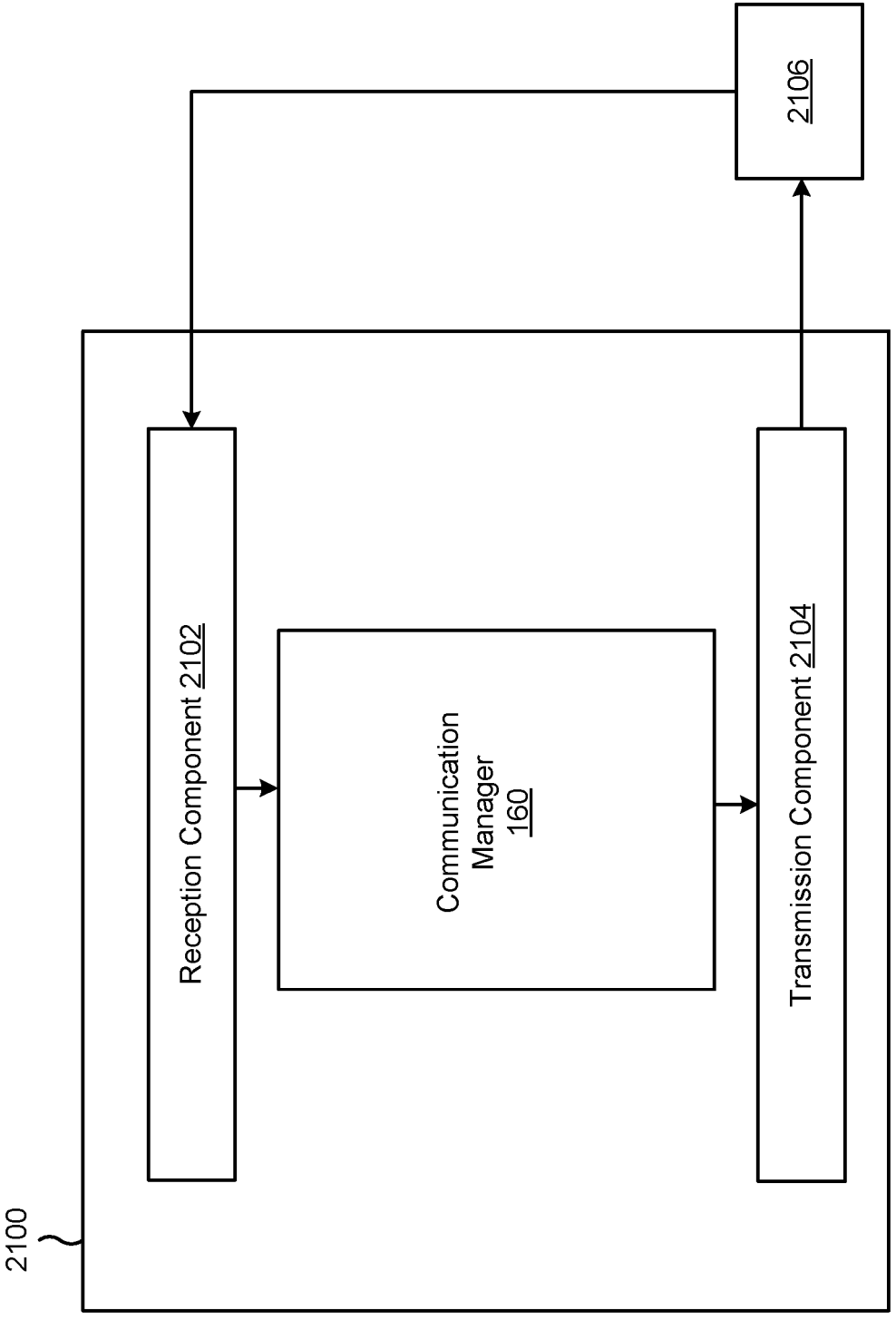
FIG. 21 is a diagram of an example apparatus for wireless communication, in accordance with the present disclosure.

FIG. 21 is a diagram of an example apparatus 2100 for wireless communication. The apparatus 2100 may be a network node (e.g., a network node 110), or a network node may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 160.

In some aspects, the apparatus 2100 may be configured to perform one or more operations described herein in connection with FIGS. 5-10. Additionally, or alternatively, the apparatus 2100 may be configured to perform one or more processes described herein, such as process 1100 of FIG. 11, process 1200 of FIG. 12, process 1300 of FIG. 13, process 1400 of FIG. 14 or a combination thereof. In some aspects, the apparatus 2100 and/or one or more components shown in FIG. 21 may include one or more components of a network node described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of a network node described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of a network node described in connection with FIG. 2. In some aspects, the transmission component 2104 may be co-located with the reception component 2102 in a transceiver.

The transmission component 2104 may transmit mobility history data for UE to an apparatus 2106 in a core network associated with the RAN. The reception component 2102 may receive a UE mobility prediction model that is based at least in part on the mobility history data from the apparatus 2106.

The transmission component 2104 may transmit mobility history data for a UE to an apparatus 2106 in a core network associated with the RAN. The reception component 2102 may receive updated long-term mobility history data that is based at least in part on the mobility history data from the apparatus 2106.

The transmission component 2104 may transmit mobility history data for a UE to an apparatus 2106 in the disaggregated RAN. The reception component 2102 may receive a UE mobility prediction model that is based at least in part on the mobility history data from the apparatus 2106.

The transmission component 2104 may transmit mobility history data for a UE to an apparatus 2106 in the disaggregated RAN. The reception component 2102 may receive updated long-term mobility history data that is based at least in part on the mobility history data from the apparatus 2106.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
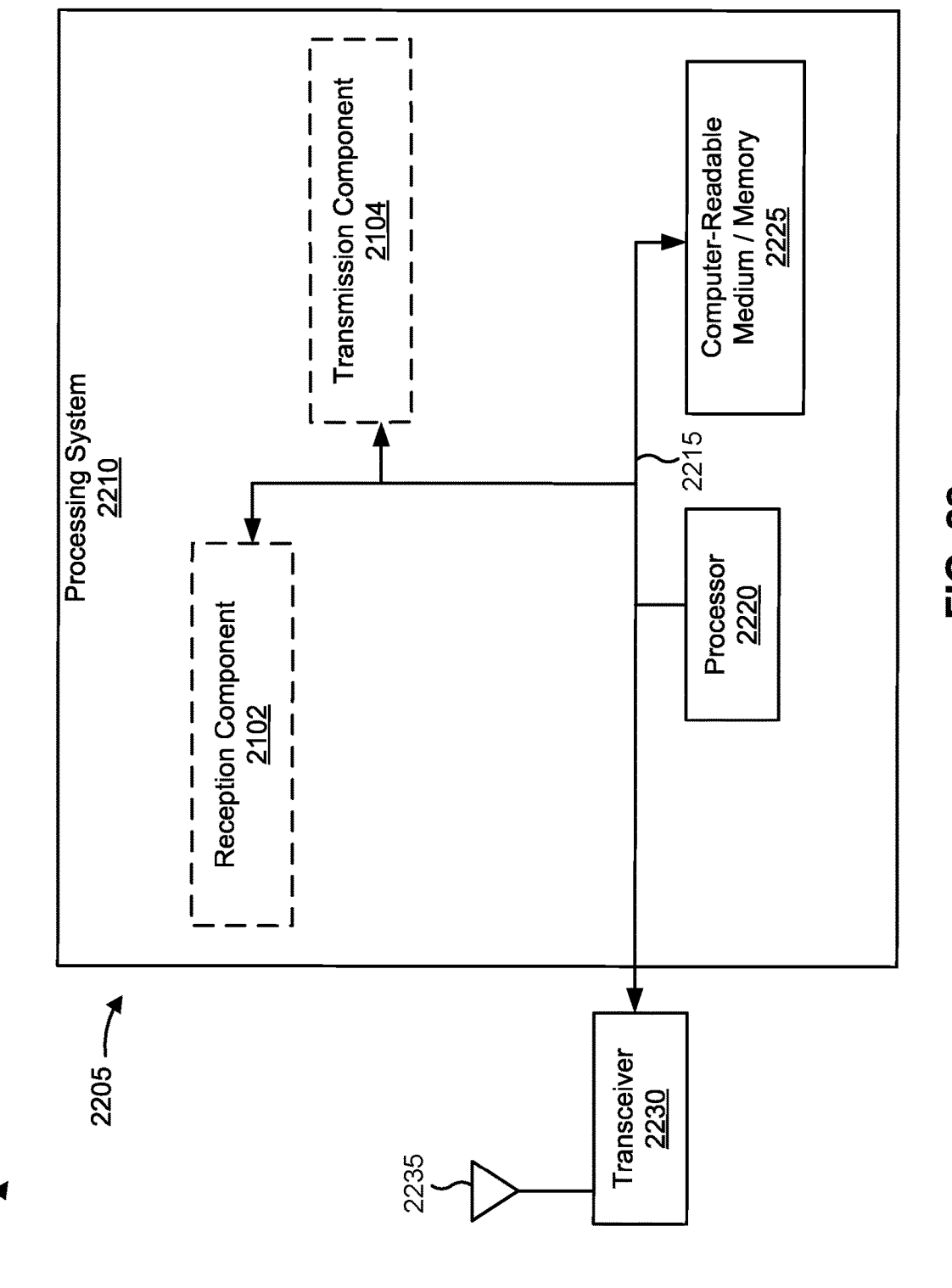
FIG. 22 is a diagram illustrating an example of a hardware implementation for an apparatus employing a processing system, in accordance with the present disclosure.

FIG. 22 is a diagram illustrating an example 2200 of a hardware implementation for an apparatus 2205 employing a processing system 2210. The apparatus 2205 may be a network node.

The processing system 2210 may be implemented with a bus architecture, represented generally by the bus 2215. The bus 2215 may include any number of interconnecting buses and bridges depending on the specific application of the processing system 2210 and the overall design constraints. The bus 2215 links together various circuits including one or more processors and/or hardware components, represented by the processor 2220, the illustrated components, and the computer-readable medium/memory 2225. The bus 2215 may also link various other circuits, such as timing sources, peripherals, voltage regulators, and/or power management circuits.

The processing system 2210 may be coupled to a transceiver 2230. The transceiver 2230 is coupled to one or more antennas 2235. The transceiver 2230 provides a means for communicating with various other apparatuses over a transmission medium. The transceiver 2230 receives a signal from the one or more antennas 2235, extracts information from the received signal, and provides the extracted information to the processing system 2210, specifically the reception component 2102. In addition, the transceiver 2230 receives information from the processing system 2210, specifically the transmission component 2104, and generates a signal to be applied to the one or more antennas 2235 based at least in part on the received information.

The processing system 2210 includes a processor 2220 coupled to a computer-readable medium/memory 2225. The processor 2220 is responsible for general processing, including the execution of software stored on the computer-readable medium/memory 2225. The software, when executed by the processor 2220, causes the processing system 2210 to perform the various functions described herein for any particular apparatus. The computer-readable medium/memory 2225 may also be used for storing data that is manipulated by the processor 2220 when executing software. The processing system further includes at least one of the illustrated components. The components may be software modules running in the processor 2220, resident/stored in the computer readable medium/memory 2225, one or more hardware modules coupled to the processor 2220, or some combination thereof.

As described elsewhere herein, the processing system 2210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

In some aspects, the apparatus 2205 for wireless communication includes means for transmitting mobility history data for UE to an apparatus 2106 in a core network associated with the RAN; and means for receiving a UE mobility prediction model that is based at least in part on the mobility history data from the apparatus 2106.

In some aspects, the apparatus 2205 for wireless communication includes means for transmitting mobility history data for a UE to an apparatus 2106 in a core network associated with the RAN; and means receiving updated long-term mobility history data that is based at least in part on the mobility history data from the apparatus 2106.

In some aspects, the apparatus 2205 for wireless communication includes means for transmitting mobility history data for a UE to an apparatus 2106 in the disaggregated RAN; and means for receiving a UE mobility prediction model that is based at least in part on the mobility history data from the apparatus 2106.

In some aspects, the apparatus 2205 for wireless communication includes means for transmitting mobility history data for a UE to an apparatus 2106 in the disaggregated RAN; and means for receiving updated long-term mobility history data that is based at least in part on the mobility history data from the apparatus 2106.

The aforementioned means may be one or more of the aforementioned components of the apparatus 2100 and/or the processing system 2210 of the apparatus 2205 configured to perform the functions recited by the aforementioned means.

FIG. 22 is provided as an example. Other examples may differ from what is described in connection with FIG. 22.

Figure 23:
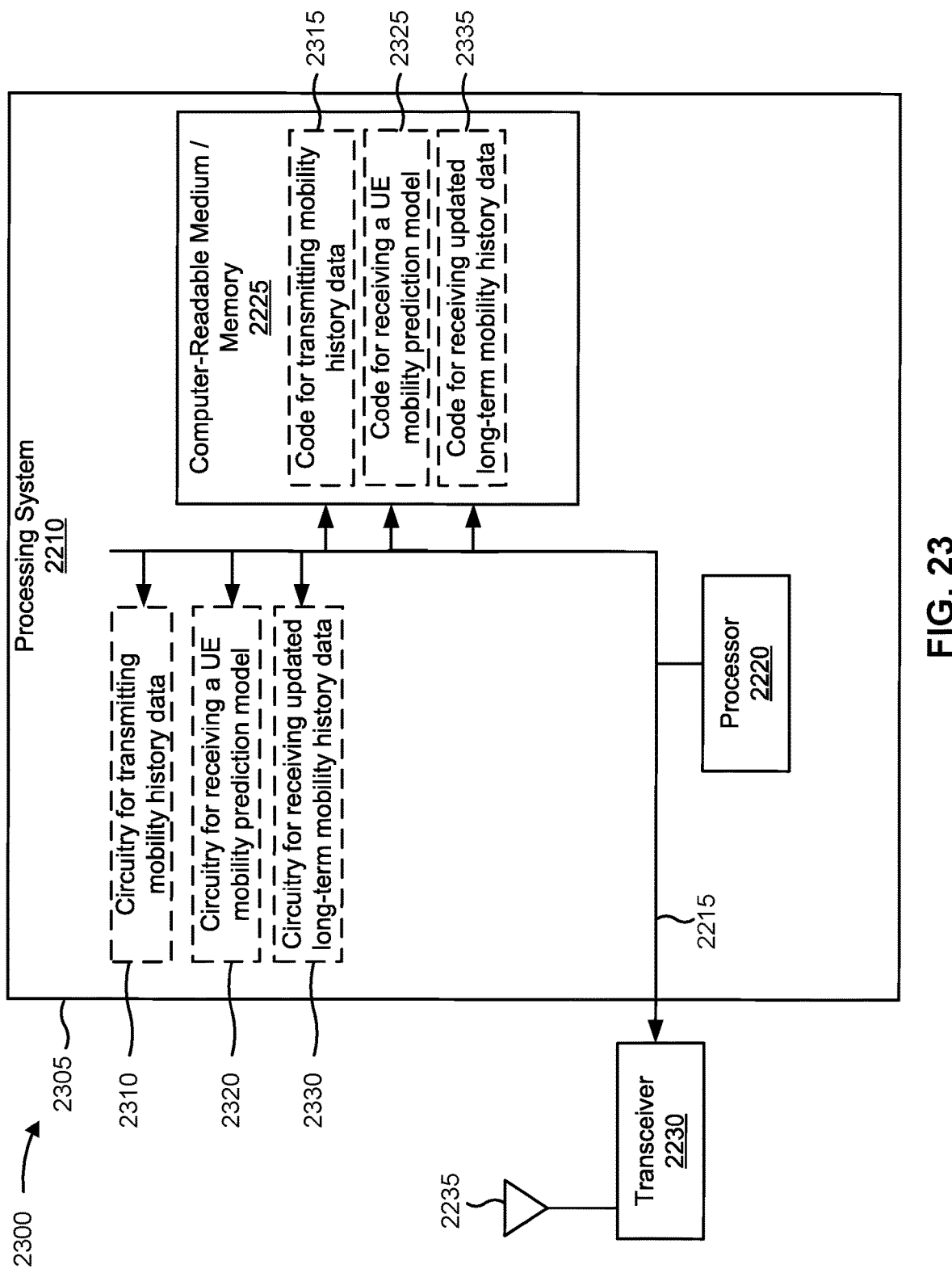
FIG. 23 is a diagram illustrating an example implementation of code and circuitry for an apparatus, in accordance with the present disclosure.

FIG. 23 is a diagram illustrating an example 2300 of an implementation of code and circuitry for an apparatus 2305, in accordance with the present disclosure. The apparatus 2305 may be a network node, or a network node may include the apparatus 2305.

As shown in FIG. 23, the apparatus 2305 may include circuitry for transmitting mobility history data for a UE to a second network node in a core network associated with the RAN (circuitry 2310). For example, the circuitry 2310 may enable the apparatus 2305 to transmit mobility history data for a UE to a second network node in a core network associated with the RAN.

As shown in FIG. 23, the apparatus 2305 may include, stored in computer-readable medium 2225, code for transmitting mobility history data for a UE to a second network node in a core network associated with the RAN (code 2315). For example, the code 2315, when executed by processor 2220, may cause processor 2220 to cause transceiver 2230 to transmit mobility history data for a UE to a second network node in a core network associated with the RAN.

As shown in FIG. 23, the apparatus 2305 may include circuitry for receiving a UE mobility prediction model that is based at least in part on the mobility history data from the second network node (circuitry 2320). For example, the circuitry 2320 may enable the apparatus 2305 to receive a UE mobility prediction model that is based at least in part on the mobility history data from the second network node.

As shown in FIG. 23, the apparatus 2305 may include, stored in computer-readable medium 2225, code for receiving a UE mobility prediction model that is based at least in part on the mobility history data from the second network node (code 2325). For example, the code 2325, when executed by processor 2220, may cause processor 2220 to cause transceiver 2230 to receive a UE mobility prediction model that is based at least in part on the mobility history data from the second network node.

As shown in FIG. 23, the apparatus 2305 may include circuitry for transmitting mobility history data for a UE to a second network node in a core network associated with the RAN (circuitry 2310). For example, the circuitry 2310 may enable the apparatus 2305 to transmit mobility history data for a UE to a second network node in a core network associated with the RAN.

As shown in FIG. 23, the apparatus 2305 may include, stored in computer-readable medium 2225, code for transmitting mobility history data for a UE to a second network node in a core network associated with the RAN (code 2315). For example, the code 2315, when executed by processor 2220, may cause processor 2220 to cause transceiver 2230 to transmit mobility history data for a UE to a second network node in a core network associated with the RAN.

As shown in FIG. 23, the apparatus 2305 may include circuitry for receiving updated long-term mobility history data that is based at least in part on the mobility history data from the second network node (circuitry 2330). For example, the circuitry 2330 may enable the apparatus 2305 to receive updated long-term mobility history data that is based at least in part on the mobility history data from the second network node.

As shown in FIG. 23, the apparatus 2305 may include, stored in computer-readable medium 2225, code for receiving updated long-term mobility history data that is based at least in part on the mobility history data from the second network node (code 2335). For example, the code 2335, when executed by processor 2220, may cause processor 2220 to cause transceiver 2230 to receive updated long-term mobility history data that is based at least in part on the mobility history data from the second network node.

As shown in FIG. 23, the apparatus 2305 may include circuitry for transmitting mobility history data for a UE to a second network node in the disaggregated RAN (circuitry 2310). For example, the circuitry 2310 may enable the apparatus 2305 to transmit mobility history data for a UE to a second network node in the disaggregated RAN.

As shown in FIG. 23, the apparatus 2305 may include, stored in computer-readable medium 2225, code for transmitting mobility history data for a UE to a second network node in the disaggregated RAN (code 2315). For example, the code 2315, when executed by processor 2220, may cause processor 2220 to cause transceiver 2230 to transmit mobility history data for a UE to a second network node in the disaggregated RAN.

As shown in FIG. 23, the apparatus 2305 may include circuitry for receiving a UE mobility prediction model that is based at least in part on the mobility history data from the second network node (circuitry 2320). For example, the circuitry 2320 may enable the apparatus 2305 to receive a UE mobility prediction model that is based at least in part on the mobility history data from the second network node.

As shown in FIG. 23, the apparatus 2305 may include, stored in computer-readable medium 2225, code for receiving a UE mobility prediction model that is based at least in part on the mobility history data from the second network node (code 2325). For example, the code 2325, when executed by processor 2220, may cause processor 2220 to cause transceiver 2230 to receive a UE mobility prediction model that is based at least in part on the mobility history data from the second network node.

As shown in FIG. 23, the apparatus 2305 may include circuitry for transmitting mobility history data for a UE to a second network node in the disaggregated RAN (circuitry 2310). For example, the circuitry 2310 may enable the apparatus 2305 to transmit mobility history data for a UE to a second network node in the disaggregated RAN.

As shown in FIG. 23, the apparatus 2305 may include, stored in computer-readable medium 2225, code for transmitting mobility history data for a UE to a second network node in the disaggregated RAN (code 2315). For example, the code 2315, when executed by processor 2220, may cause processor 2220 to cause transceiver 2230 to transmit mobility history data for a UE to a second network node in the disaggregated RAN.

As shown in FIG. 23, the apparatus 2305 may include circuitry for receiving updated long-term mobility history data that is based at least in part on the mobility history data from the second network node (circuitry 2320). For example, the circuitry 2320 may enable the apparatus 2305 to receive updated long-term mobility history data that is based at least in part on the mobility history data from the second network node.

As shown in FIG. 23, the apparatus 2305 may include, stored in computer-readable medium 2225, code for receiving updated long-term mobility history data that is based at least in part on the mobility history data from the second network node (code 2325). For example, the code 2325, when executed by processor 2220, may cause processor

2220 to cause transceiver 2230 to receive updated long-term mobility history data that is based at least in part on the mobility history data from the second network node.

FIG. 23 is provided as an example. Other examples may differ from what is described in connection with FIG. 23.

Figure 24:
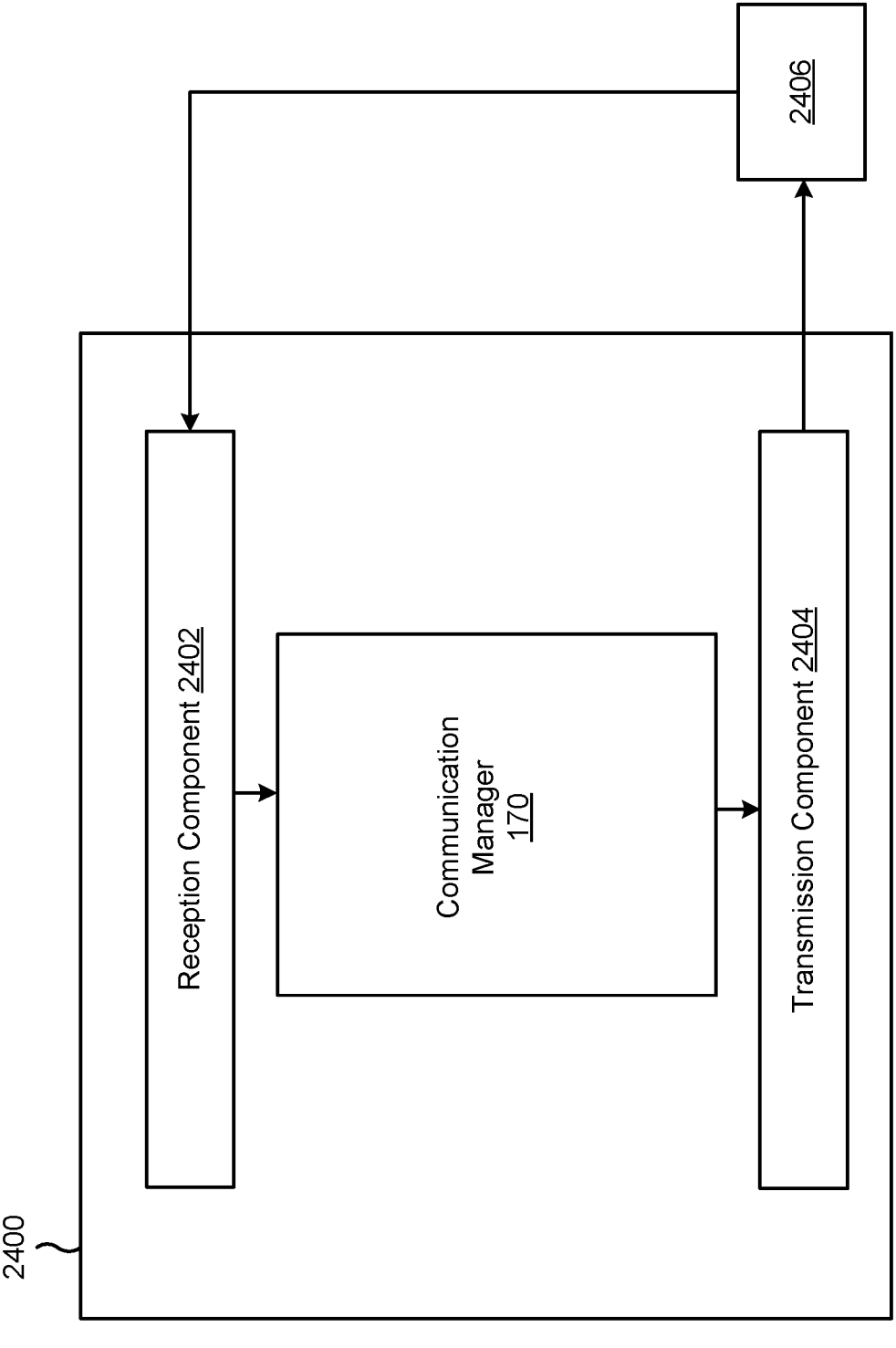
FIG. 24 is a diagram of an example apparatus for wireless communication, in accordance with the present disclosure.

FIG. 24 is a diagram of an example apparatus 2400 for wireless communication. The apparatus 2400 may be a network node (e.g., a network node 130), or a network node may include the apparatus 2400. In some aspects, the apparatus 2400 includes a reception component 2402 and a transmission component 2404, which may be in communication with one another (for example, via one or more buses and/or one or more other components). As shown, the apparatus 2400 may communicate with another apparatus 2406 (such as a UE, a base station, or another wireless communication device) using the reception component 2402 and the transmission component 2404. As further shown, the apparatus 2400 may include the communication manager 170.

In some aspects, the apparatus 2400 may be configured to perform one or more operations described herein in connection with FIGS. 5-10. Additionally, or alternatively, the apparatus 2400 may be configured to perform one or more processes described herein, such as process 1500 of FIG. 15, process 1600 of FIG. 16, or a combination thereof. In some aspects, the apparatus 2400 and/or one or more components shown in FIG. 24 may include one or more components of the network node described in connection with FIG. 2. Additionally, or alternatively, one or more components shown in FIG. 24 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2402 may receive communications, such as reference signals, control information, data communications, or a combination thereof, from the apparatus 2406. The reception component 2402 may provide received communications to one or more other components of the apparatus 2400. In some aspects, the reception component 2402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2400. In some aspects, the reception component 2402 may include one or more antennas, a modem, a demodulator, a MIMO detector, a receive processor, a controller/processor, a memory, or a combination thereof, of the network node described in connection with FIG. 2.

The transmission component 2404 may transmit communications, such as reference signals, control information, data communications, or a combination thereof, to the apparatus 2406. In some aspects, one or more other components of the apparatus 2400 may generate communications and may provide the generated communications to the transmission component 2404 for transmission to the apparatus 2406. In some aspects, the transmission component 2404 may perform signal processing on the generated communications (such as filtering, amplification, modulation, digital-to-analog conversion, multiplexing, interleaving, mapping, or encoding, among other examples), and may transmit the processed signals to the apparatus 2406. In some aspects, the transmission component 2404 may include one or more antennas, a modem, a modulator, a transmit MIMO processor, a transmit processor, a controller/processor, a memory, or a combination thereof, of the network node described in connection with FIG. 2. In some aspects, the transmission component 2404 may be co-located with the reception component 2402 in a transceiver.

The reception component 2402 may receive mobility history data associated with a UE. The transmission component 2404 may transmit the mobility history data to an apparatus 2406 in the core network for use in training a UE mobility prediction model.

The reception component 2402 may receive the UE mobility prediction model from the apparatus 2406.

The transmission component 2404 may transmit the UE mobility prediction model to another apparatus 2406 that is included in a RAN associated with the core network.

The reception component 2402 may receive long-term mobility history data from the apparatus 2406, wherein the long-term mobility history data is based at least in part on the mobility history data.

The transmission component 2404 may transmit the long-term mobility history data to another apparatus 2406 that is included in a RAN associated with the core network.

The reception component 2402 may receive a UE mobility prediction model. The transmission component 2404 may transmit the UE mobility prediction model to an apparatus 2406 in the core network for storage at the apparatus 2406.

The reception component 2402 may receive the UE mobility prediction model from the apparatus 2406.

The transmission component 2404 may transmit the UE mobility prediction model to another apparatus 2406 that is included in a RAN associated with the core network.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components. Additionally, or alternatively, a set of (one or more) components shown in FIG. 24 may perform one or more functions described as being performed by another set of components shown in FIG. 24.

Figure 25:
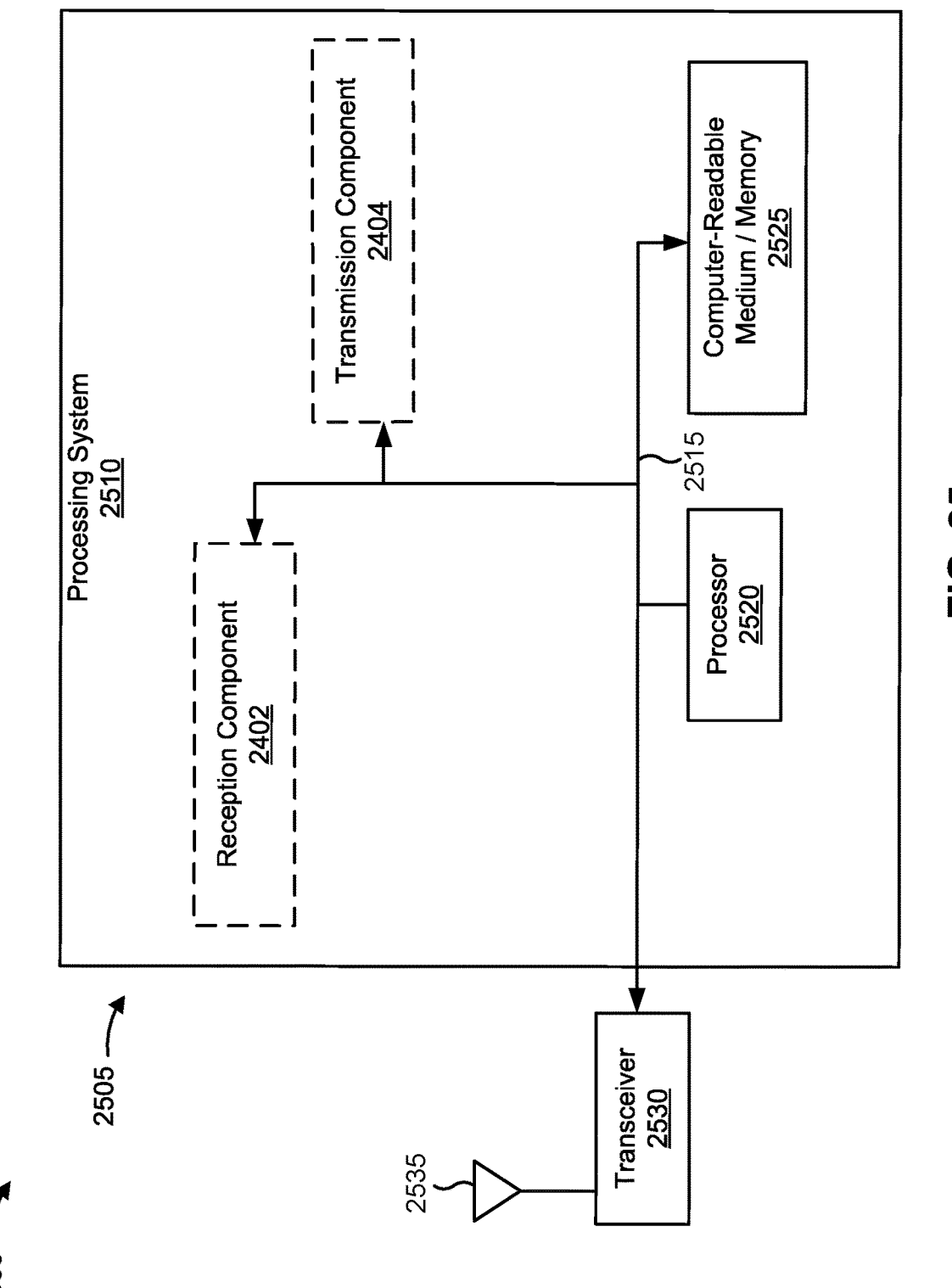
FIG. 25 is a diagram illustrating an example of a hardware implementation for an apparatus employing a processing system, in accordance with the present disclosure.

FIG. 25 is a diagram illustrating an example 2500 of a hardware implementation for an apparatus 2505 employing a processing system 2510. The apparatus 2505 may be a network node.

The processing system 2510 may be implemented with a bus architecture, represented generally by the bus 2515. The bus 2515 may include any number of interconnecting buses and bridges depending on the specific application of the processing system 2510 and the overall design constraints. The bus 2515 links together various circuits including one or more processors and/or hardware components, represented by the processor 2520, the illustrated components, and the computer-readable medium/memory 2525. The bus 2515 may also link various other circuits, such as timing sources, peripherals, voltage regulators, and/or power management circuits.

The processing system 2510 may be coupled to a transceiver 2530. The transceiver 2530 is coupled to one or more antennas 2535. The transceiver 2530 provides a means for communicating with various other apparatuses over a transmission medium. The transceiver 2530 receives a signal from the one or more antennas 2535, extracts information from the received signal, and provides the extracted information to the processing system 2510, specifically the reception component 2402. In addition, the transceiver 2530 receives information from the processing system 2510, specifically the transmission component 2404, and generates a signal to be applied to the one or more antennas 2535 based at least in part on the received information.

The processing system 2510 includes a processor 2520 coupled to a computer-readable medium/memory 2525. The processor 2520 is responsible for general processing, including the execution of software stored on the computer-readable medium/memory 2525. The software, when executed by the processor 2520, causes the processing system 2510 to perform the various functions described herein for any particular apparatus. The computer-readable medium/memory 2525 may also be used for storing data that is manipulated by the processor 2520 when executing software. The processing system further includes at least one of the illustrated components. The components may be software modules running in the processor 2520, resident/stored in the computer readable medium/memory 2525, one or more hardware modules coupled to the processor 2520, or some combination thereof.

In some aspects, the processing system 2510 may be a component of the network node 130 and may include the memory 292, the controller/processor 290, and/or the communication unit 294.

In some aspects, the apparatus 2505 for wireless communication includes means for receiving mobility history data associated with a UE; and means for transmitting the mobility history data to an apparatus 2406 in the core network for use in training a UE mobility prediction model.

In some aspects, the apparatus 2505 for wireless communication includes means for receiving the UE mobility prediction model from the apparatus 2406.

In some aspects, the apparatus 2505 for wireless communication includes means for transmitting the UE mobility prediction model to another apparatus 2406 that is included in a RAN associated with the core network.

In some aspects, the apparatus 2505 for wireless communication includes means for receiving long-term mobility history data from the apparatus 2406, wherein the long-term mobility history data is based at least in part on the mobility history data.

In some aspects, the apparatus 2505 for wireless communication includes means for transmitting the long-term mobility history data to another apparatus 2406 that is included in a RAN associated with the core network.

In some aspects, the apparatus 2505 for wireless communication includes means for receiving a UE mobility prediction model. The transmission component 2404 may transmit the UE mobility prediction model to an apparatus 2406 in the core network for storage at the apparatus 2406.

In some aspects, the apparatus 2505 for wireless communication includes means for receiving the UE mobility prediction model from the apparatus 2406.

In some aspects, the apparatus 2505 for wireless communication includes means for transmitting the UE mobility prediction model to another apparatus 2406 that is included in a RAN associated with the core network.

The aforementioned means may be one or more of the aforementioned components of the apparatus 2400 and/or the processing system 2510 of the apparatus 2505 configured to perform the functions recited by the aforementioned means. As described elsewhere herein, the processing system 2510 may include the memory 292, the controller/processor 290, and/or the communication unit 294 configured to perform the functions and/or operations recited herein.

FIG. 25 is provided as an example. Other examples may differ from what is described in connection with FIG. 25.

Figure 26:
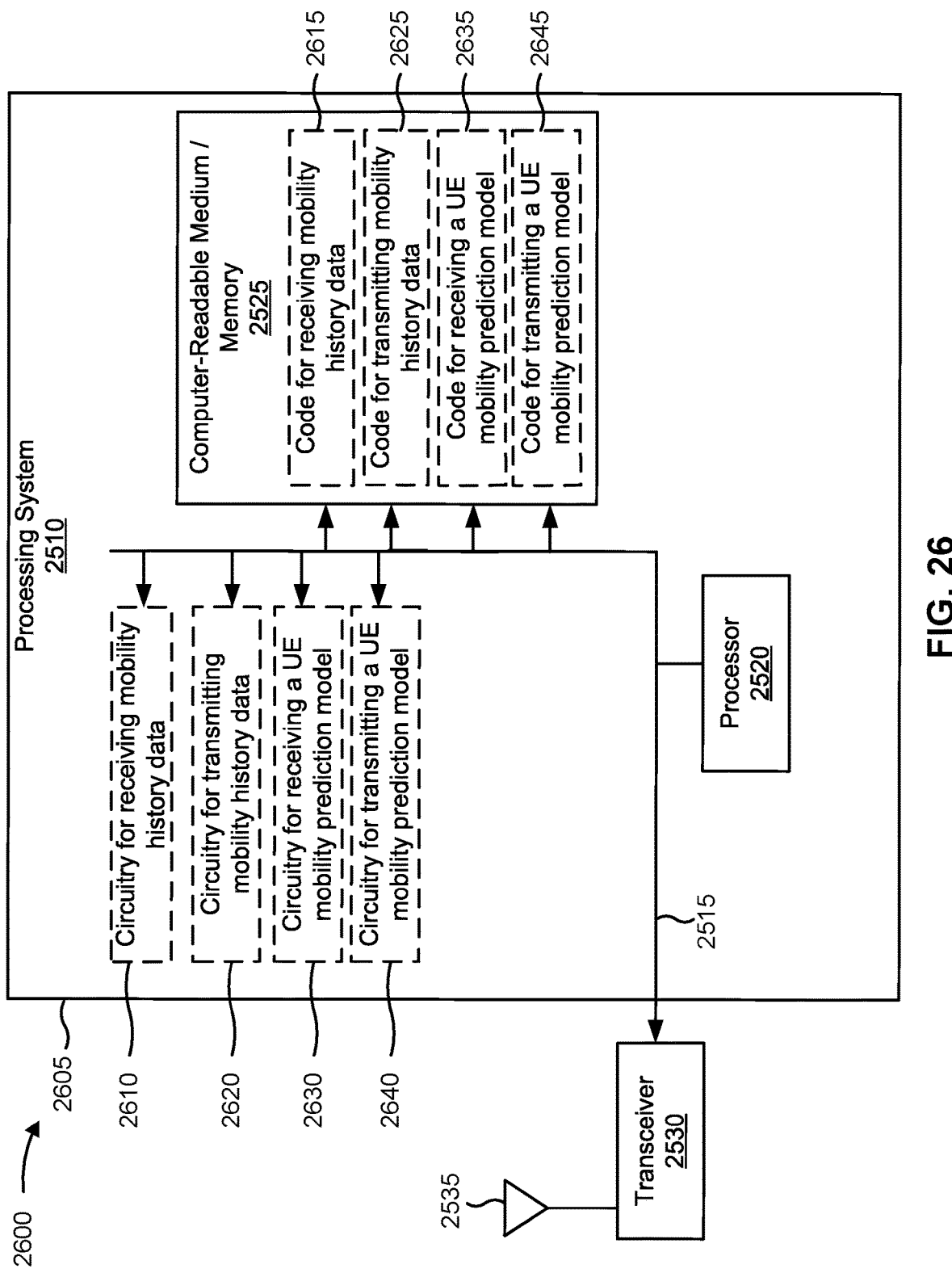
FIG. 26 is a diagram illustrating an example implementation of code and circuitry for an apparatus, in accordance with the present disclosure.

FIG. 26 is a diagram illustrating an example 2600 of an implementation of code and circuitry for an apparatus 2605, in accordance with the present disclosure. The apparatus 2605 may be a network node (e.g., a network node 130), or a network node may include the apparatus 2605.

As shown in FIG. 26, the apparatus 2605 may include circuitry for receiving mobility history data associated with a UE (circuitry 2610). For example, the circuitry 2610 may enable the apparatus 2605 to receive mobility history data associated with a UE.

As shown in FIG. 26, the apparatus 2605 may include, stored in computer-readable medium 2525, code for receiving mobility history data associated with a UE (code 2615). For example, the code 2615, when executed by processor 2520, may cause processor 2520 to cause transceiver 2530 to receive mobility history data associated with a UE.

As shown in FIG. 26, the apparatus 2605 may include circuitry for transmitting the mobility history data to a second network node in the core network for use in training a UE mobility prediction model (circuitry 2620). For example, the circuitry 2620 may enable the apparatus 2605 to transmit the mobility history data to a second network node in the core network for use in training a UE mobility prediction model.

As shown in FIG. 26, the apparatus 2605 may include, stored in computer-readable medium 2525, code for transmitting the mobility history data to a second network node in the core network for use in training a UE mobility prediction model (code 2625). For example, the code 2625, when executed by processor 2520, may cause processor 2520 to cause transceiver 2530 to transmit the mobility history data to a second network node in the core network for use in training a UE mobility prediction model.

As shown in FIG. 26, the apparatus 2605 may include circuitry for receiving a UE mobility prediction model (circuitry 2630). For example, the circuitry 2630 may enable the apparatus 2605 to receive a UE mobility prediction model.

As shown in FIG. 26, the apparatus 2605 may include, stored in computer-readable medium 2525, code for receiving a UE mobility prediction model (code 2635). For example, the code 2635, when executed by processor 2520, may cause processor 2520 to cause transceiver 2530 to receive a UE mobility prediction model.

As shown in FIG. 26, the apparatus 2605 may include circuitry for transmitting the UE mobility prediction model to a second network node in the core network for storage at the second network node (circuitry 2640). For example, the circuitry 2640 may enable the apparatus 2605 to transmit the UE mobility prediction model to a second network node in the core network for storage at the second network node.

As shown in FIG. 26, the apparatus 2605 may include, stored in computer-readable medium 2525, code for transmitting the UE mobility prediction model to a second network node in the core network for storage at the second network node (code 2645). For example, the code 2645, when executed by processor 2520, may cause processor 2520 to cause transceiver 2530 to transmit the UE mobility prediction model to a second network node in the core network for storage at the second network node.

FIG. 26 is provided as an example. Other examples may differ from what is described in connection with FIG. 26.

Figure 27:
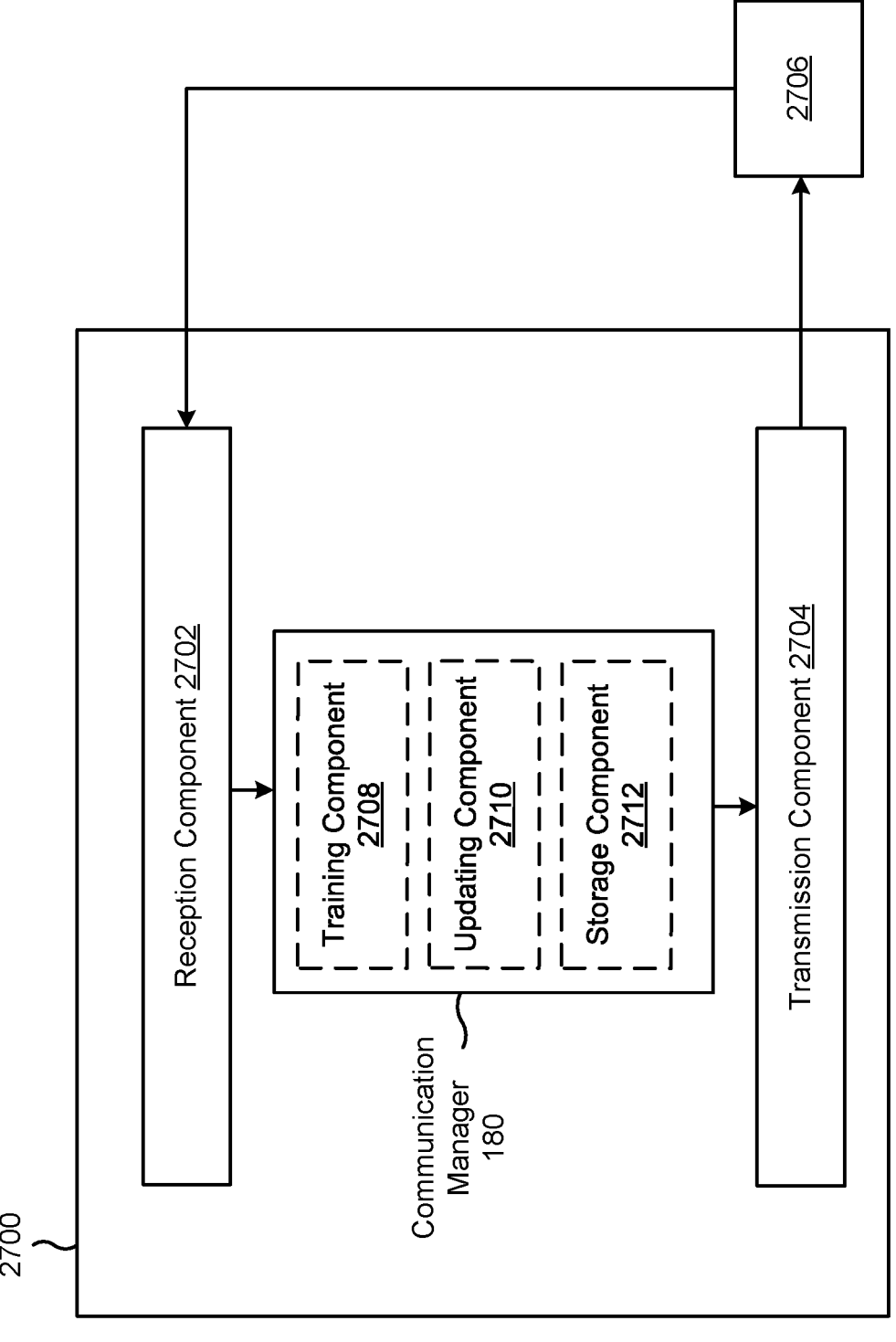
FIG. 27 is a diagram of an example apparatus for wireless communication, in accordance with the present disclosure.

FIG. 27 is a diagram of an example apparatus 2700 for wireless communication. The apparatus 2700 may be a network node (e.g., a network node 130), or a network node may include the apparatus 2700. In some aspects, the apparatus 2700 includes a reception component 2702 and a transmission component 2704, which may be in communication with one another (for example, via one or more buses and/or one or more other components). As shown, the apparatus 2700 may communicate with another apparatus 2706 (such as a UE, a base station, or another wireless communication device) using the reception component 2702 and the transmission component 2704. As further shown, the apparatus 2700 may include the communication manager 180. The communication manager 180 may include one or more of a training component 2708, an updating component 2710, or a storage component 2712, among other examples.

In some aspects, the apparatus 2700 may be configured to perform one or more operations described herein in connection with FIGS. 5-10. Additionally, or alternatively, the apparatus 2700 may be configured to perform one or more processes described herein, such as process 1700 of FIG. 17, process 1800 of FIG. 18, or a combination thereof. In some aspects, the apparatus 2700 and/or one or more components shown in FIG. 27 may include one or more components of the network node described in connection with FIG. 2. Additionally, or alternatively, one or more components shown in FIG. 27 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2702 may receive communications, such as reference signals, control information, data communications, or a combination thereof, from the apparatus 2706. The reception component 2702 may provide received communications to one or more other components of the apparatus 2700. In some aspects, the reception component 2702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2700. In some aspects, the reception component 2702 may include one or more antennas, a modem, a demodulator, a MIMO detector, a receive processor, a controller/processor, a memory, or a combination thereof, of the network node described in connection with FIG. 2.

The transmission component 2704 may transmit communications, such as reference signals, control information, data communications, or a combination thereof, to the apparatus 2706. In some aspects, one or more other components of the apparatus 2700 may generate communications and may provide the generated communications to the transmission component 2704 for transmission to the apparatus 2706. In some aspects, the transmission component 2704 may perform signal processing on the generated communications (such as filtering, amplification, modulation, digital-to-analog conversion, multiplexing, interleaving, mapping, or encoding, among other examples), and may transmit the processed signals to the apparatus 2706. In some aspects, the transmission component 2704 may include one or more antennas, a modem, a modulator, a transmit MIMO processor, a transmit processor, a controller/processor, a memory, or a combination thereof, of the network node described in connection with FIG. 2. In some aspects, the transmission component 2704 may be co-located with the reception component 2702 in a transceiver.

The reception component 2702 may receive mobility history data associated with a UE from an apparatus 2706 in a core network. The training component 2708 may train a UE mobility prediction model based at least in part on the mobility history data.

The transmission component 2704 may transmit the UE mobility prediction model to the apparatus 2706.

The reception component 2702 may receive mobility history data associated with a UE from an apparatus 2706 in a core network. The updating component 2710 may update long-term mobility history data associated with the UE based at least in part on the mobility history data. The storage component 2712 may store the updated long-term mobility history data at the first network node.

The transmission component 2704 may transmit the updated long-term mobility history data to the second network node.

The number and arrangement of components shown in FIG. 27 are provided as an example. In practice, there may be additional components, fewer components, different components, or differently arranged components than those shown in FIG. 27. Furthermore, two or more components shown in FIG. 27 may be implemented within a single component, or a single component shown in FIG. 27 may be implemented as multiple, distributed components. Additionally, or alternatively, a set of (one or more) components shown in FIG. 27 may perform one or more functions described as being performed by another set of components shown in FIG. 27.

Figure 28:
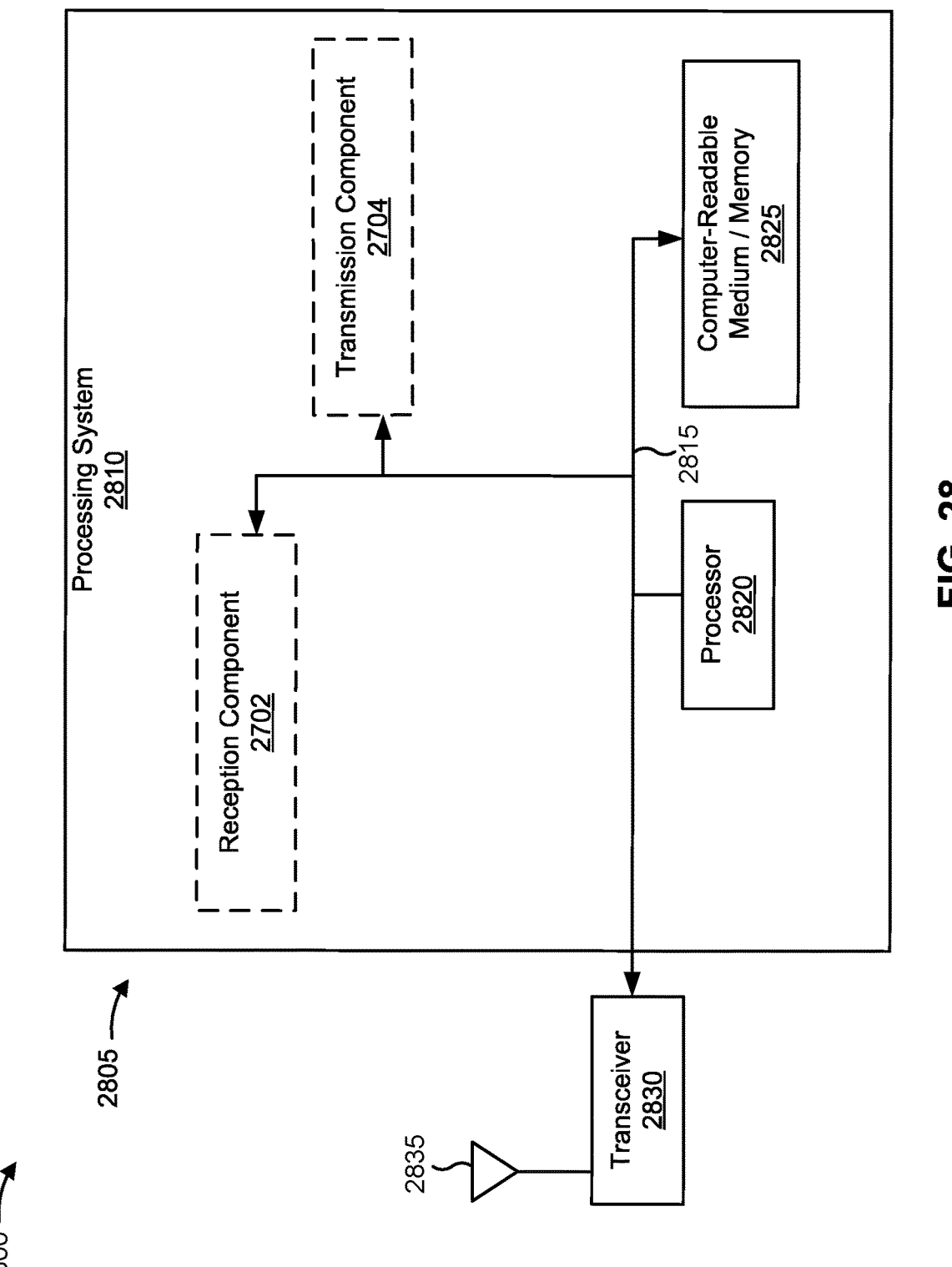
FIG. 28 is a diagram illustrating an example of a hardware implementation for an apparatus employing a processing system, in accordance with the present disclosure.

FIG. 28 is a diagram illustrating an example 2800 of a hardware implementation for an apparatus 2805 employing a processing system 2810. The apparatus 2805 may be a network node.

The processing system 2810 may be implemented with a bus architecture, represented generally by the bus 2815. The bus 2815 may include any number of interconnecting buses and bridges depending on the specific application of the processing system 2810 and the overall design constraints. The bus 2815 links together various circuits including one or more processors and/or hardware components, represented by the processor 2820, the illustrated components, and the computer-readable medium/memory 2825. The bus 2815 may also link various other circuits, such as timing sources, peripherals, voltage regulators, and/or power management circuits.

The processing system 2810 may be coupled to a transceiver 2830. The transceiver 2830 is coupled to one or more antennas 2835. The transceiver 2830 provides a means for communicating with various other apparatuses over a transmission medium. The transceiver 2830 receives a signal from the one or more antennas 2835, extracts information from the received signal, and provides the extracted information to the processing system 2810, specifically the reception component 2702. In addition, the transceiver 2830 receives information from the processing system 2810, specifically the transmission component 2704, and generates a signal to be applied to the one or more antennas 2835 based at least in part on the received information.

The processing system 2810 includes a processor 2820 coupled to a computer-readable medium/memory 2825. The processor 2820 is responsible for general processing, including the execution of software stored on the computer-readable medium/memory 2825. The software, when executed by the processor 2820, causes the processing system 2810 to perform the various functions described herein for any particular apparatus. The computer-readable medium/memory 2825 may also be used for storing data that is manipulated by the processor 2820 when executing software. The processing system further includes at least one of the illustrated components. The components may be software modules running in the processor 2820, resident/stored in the computer readable medium/memory 2825, one or more hardware modules coupled to the processor 2820, or some combination thereof.

In some aspects, the processing system 2810 may be a component of the network node 130 and may include the memory 292, the controller/processor 290, and/or the communication unit 294.

In some aspects, the apparatus 2805 for wireless communication includes means for receiving mobility history data associated with a UE from an apparatus 2706 in a core network; and means for training a UE mobility prediction model based at least in part on the mobility history data.

In some aspects, the apparatus 2805 for wireless communication includes means for transmitting the UE mobility prediction model to the apparatus 2706.

In some aspects, the apparatus 2805 for wireless communication includes means for receiving mobility history data associated with a UE from an apparatus 2706 in a core network; means for updating long-term mobility history data associated with the UE based at least in part on the mobility history data; and means for storing the updated long-term mobility history data at the first network node.

In some aspects, the apparatus 2805 for wireless communication includes means for transmitting the updated long-term mobility history data to the second network node.

The aforementioned means may be one or more of the aforementioned components of the apparatus 2700 and/or the processing system 2810 of the apparatus 2805 configured to perform the functions recited by the aforementioned means. As described elsewhere herein, the processing system 2810 may include the memory 292, the controller/processor 290, and/or the communication unit 294 configured to perform the functions and/or operations recited herein.

FIG. 28 is provided as an example. Other examples may differ from what is described in connection with FIG. 28.

Figure 29:
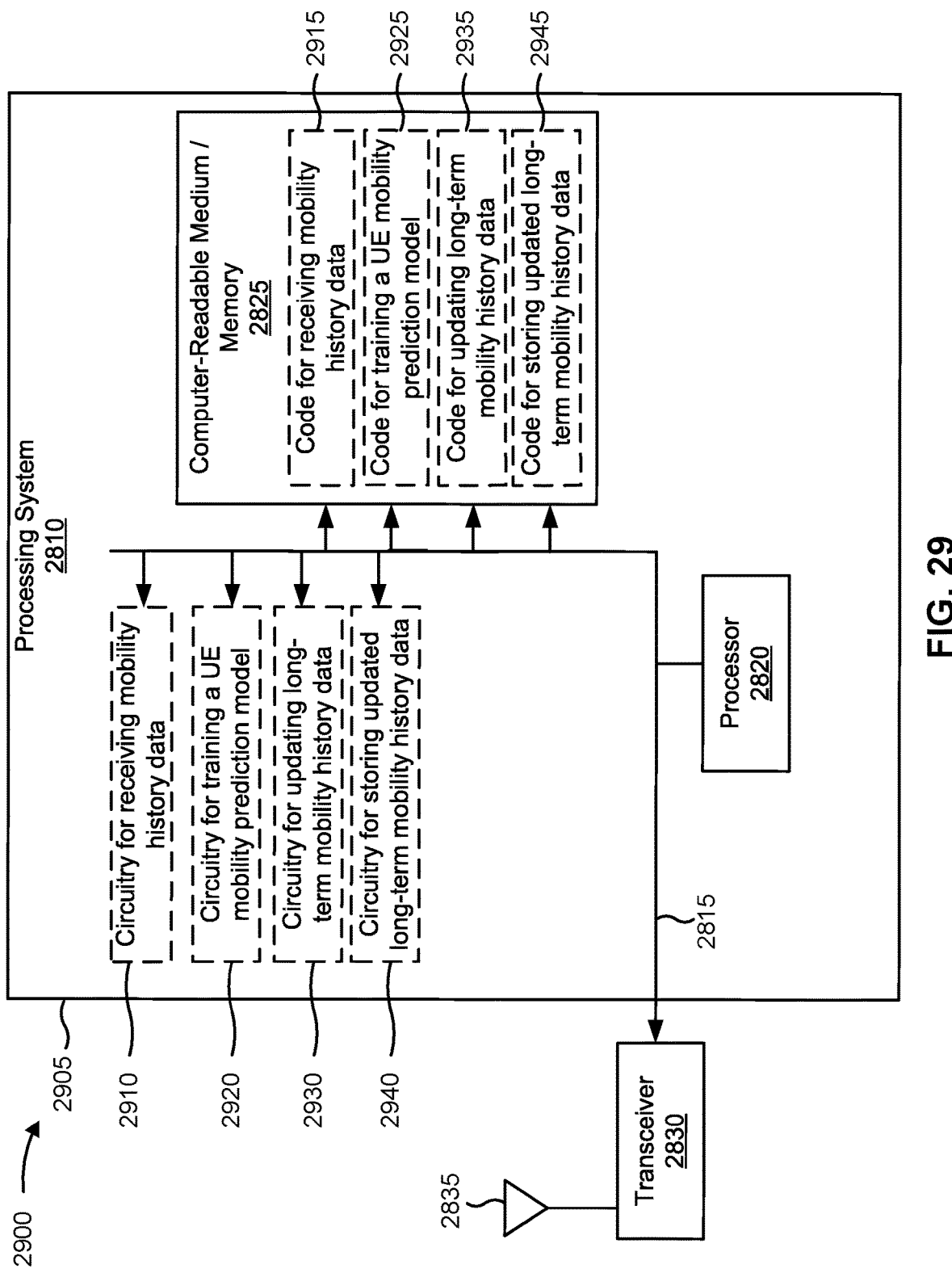
FIG. 29 is a diagram illustrating an example implementation of code and circuitry for an apparatus, in accordance with the present disclosure.

FIG. 29 is a diagram illustrating an example 2900 of an implementation of code and circuitry for an apparatus 2905, in accordance with the present disclosure. The apparatus 2905 may be a network node, or a network node may include the apparatus 2905.

As shown in FIG. 29, the apparatus 2905 may include circuitry for receiving mobility history data associated with a UE from a second network node in the core network (circuitry 2910). For example, the circuitry 2910 may enable the apparatus 2905 to receive mobility history data associated with a UE from a second network node in the core network.

As shown in FIG. 29, the apparatus 2905 may include, stored in computer-readable medium 2825, code for receiving mobility history data associated with a UE from a second network node in the core network (code 2915). For example, the code 2915, when executed by processor 2820, may cause processor 2820 to cause transceiver 2830 to receive mobility history data associated with a UE from a second network node in the core network.

As shown in FIG. 29, the apparatus 2905 may include circuitry for training a UE mobility prediction model based at least in part on the mobility history data (circuitry 2920). For example, the circuitry 2920 may enable the apparatus 2905 to train a UE mobility prediction model based at least in part on the mobility history data.

As shown in FIG. 29, the apparatus 2905 may include, stored in computer-readable medium 2825, code for training a UE mobility prediction model based at least in part on the mobility history data (code 2925). For example, the code 2925, when executed by processor 2820, may cause processor 2820 to train a UE mobility prediction model based at least in part on the mobility history data.

As shown in FIG. 29, the apparatus 2905 may include circuitry for receiving mobility history data associated with a UE from a second network node in the core network (circuitry 2910). For example, the circuitry 2910 may enable the apparatus 2905 to receive mobility history data associated with a UE from a second network node in the core network.

As shown in FIG. 29, the apparatus 2905 may include, stored in computer-readable medium 2825, code for receiving mobility history data associated with a UE from a second network node in the core network (code 2915). For example, the code 2915, when executed by processor 2820, may cause processor 2820 to cause transceiver 2830 to receive mobility history data associated with a UE from a second network node in the core network.

As shown in FIG. 29, the apparatus 2905 may include circuitry for updating long-term mobility history data associated with the UE based at least in part on the mobility history data (circuitry 2930). For example, the circuitry 2930 may enable the apparatus 2905 to update long-term mobility history data associated with the UE based at least in part on the mobility history data.

As shown in FIG. 29, the apparatus 2905 may include, stored in computer-readable medium 2825, code for updating long-term mobility history data associated with the UE based at least in part on the mobility history data (code 2935). For example, the code 2935, when executed by processor 2820, may cause processor 2820 to update long-term mobility history data associated with the UE based at least in part on the mobility history data.

As shown in FIG. 29, the apparatus 2905 may include circuitry for storing the updated long-term mobility history data at the first network node (circuitry 2940). For example, the circuitry 2940 may enable the apparatus 2905 to store the updated long-term mobility history data at the first network node.

As shown in FIG. 29, the apparatus 2905 may include, stored in computer-readable medium 2825, code for storing the updated long-term mobility history data at the first network node (code 2945). For example, the code 2945, when executed by processor 2820, may cause processor 2820 to store the updated long-term mobility history data at the first network node.

FIG. 29 is provided as an example. Other examples may differ from what is described in connection with FIG. 29.

Figure 30:
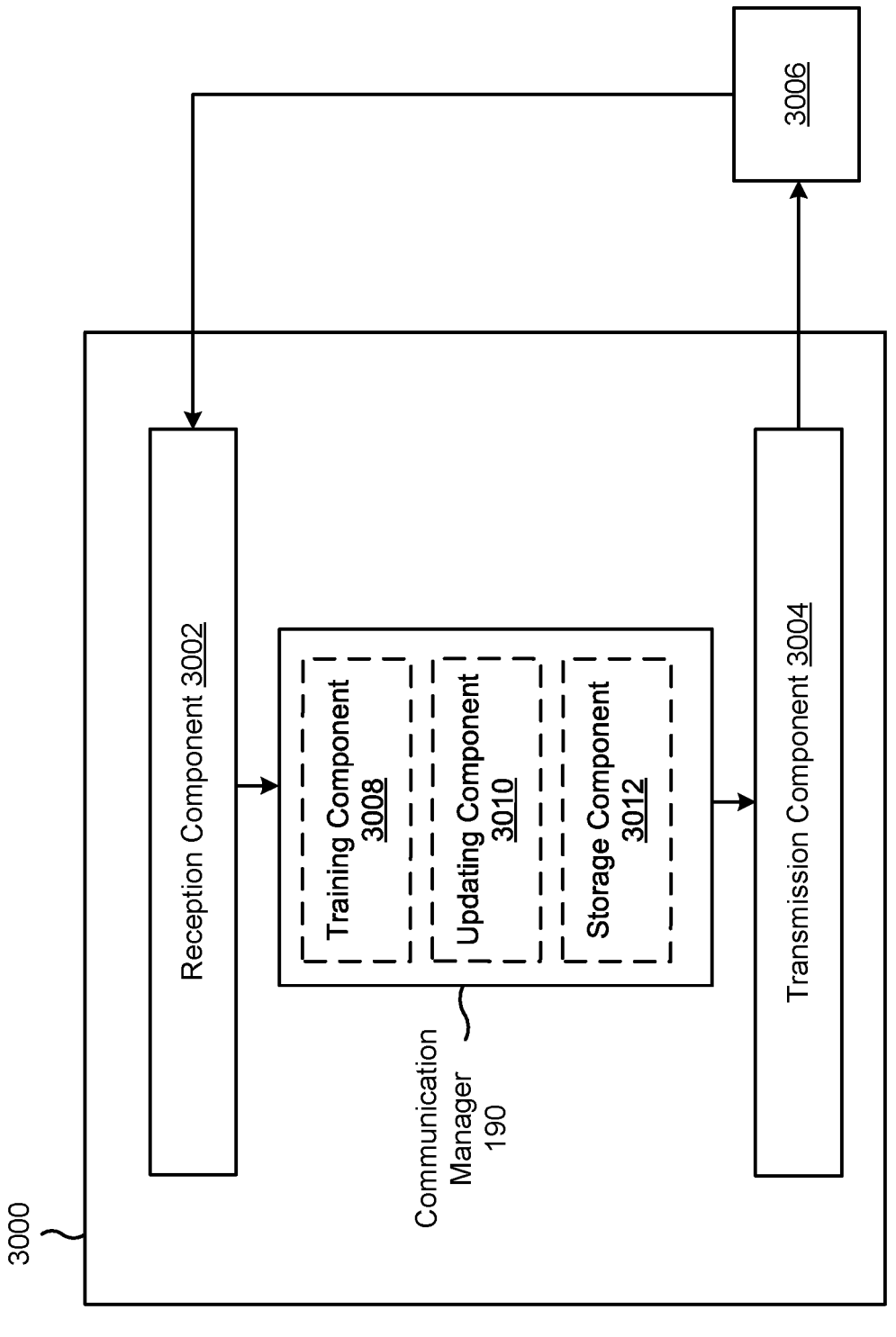
FIG. 30 is a diagram of an example apparatus for wireless communication, in accordance with the present disclosure.

FIG. 30 is a diagram of an example apparatus 3000 for wireless communication. The apparatus 3000 may be a network node (e.g., a network node 150), or a network node may include the apparatus 3000. In some aspects, the apparatus 3000 includes a reception component 3002 and a transmission component 3004, which may be in communication with one another (for example, via one or more buses and/or one or more other components). As shown, the apparatus 3000 may communicate with another apparatus 3006 (such as a UE, a base station, or another wireless communication device) using the reception component 3002 and the transmission component 3004. As further shown, the apparatus 3000 may include the communication manager 190. The communication manager 190) may include one or more of a training component 3008, an updating component 3010, or a storage component 3012, among other examples.

In some aspects, the apparatus 3000 may be configured to perform one or more operations described herein in connection with FIGS. 5-10. Additionally, or alternatively, the apparatus 3000 may be configured to perform one or more processes described herein, such as process 1900 of FIG. 19, process 2000 of FIG. 20, or a combination thereof. In some aspects, the apparatus 3000 and/or one or more components shown in FIG. 30 may include one or more components of the network node described in connection with FIG. 2. Additionally, or alternatively, one or more components shown in FIG. 30 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 3002 may receive communications, such as reference signals, control information, data communications, or a combination thereof, from the apparatus 3006. The reception component 3002 may provide received communications to one or more other components of the apparatus 3000. In some aspects, the reception component 3002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 3000. In some aspects, the reception component 3002 may include one or more antennas, a modem, a demodulator, a MIMO detector, a receive processor, a controller/processor, a memory, or a combination thereof, of the network node described in connection with FIG. 2.

The transmission component 3004 may transmit communications, such as reference signals, control information, data communications, or a combination thereof, to the apparatus 3006. In some aspects, one or more other components of the apparatus 3000 may generate communications and may provide the generated communications to the transmission component 3004 for transmission to the apparatus 3006. In some aspects, the transmission component 3004 may perform signal processing on the generated communications (such as filtering, amplification, modulation, digital-to-analog conversion, multiplexing, interleaving, mapping, or encoding, among other examples), and may transmit the processed signals to the apparatus 3006. In some aspects, the transmission component 3004 may include one or more antennas, a modem, a modulator, a transmit MIMO processor, a transmit processor, a controller/processor, a memory, or a combination thereof, of the network node described in connection with FIG. 2. In some aspects, the transmission component 3004 may be co-located with the reception component 3002 in a transceiver.

The reception component 3002 may receive mobility history data associated with a UE from an apparatus 3006 in the disaggregated RAN. The training component 3008 may train a UE mobility prediction model based at least in part on the mobility history data.

The transmission component 3004 may transmit the UE mobility prediction model to the apparatus 3006.

The reception component 3002 may receive mobility history data associated with a UE from an apparatus 3006 in the disaggregated RAN. The updating component 2710 may update long-term mobility history data associated with the UE based at least in part on the mobility history data. The storage component 2712 may store the updated long-term mobility history data.

The transmission component 3004 may transmit the updated long-term mobility history data to the apparatus 3006.

The number and arrangement of components shown in FIG. 30 are provided as an example. In practice, there may be additional components, fewer components, different components, or differently arranged components than those shown in FIG. 30. Furthermore, two or more components shown in FIG. 30 may be implemented within a single component, or a single component shown in FIG. 30 may be implemented as multiple, distributed components. Additionally, or alternatively, a set of (one or more) components shown in FIG. 30 may perform one or more functions described as being performed by another set of components shown in FIG. 30.

Figure 31:
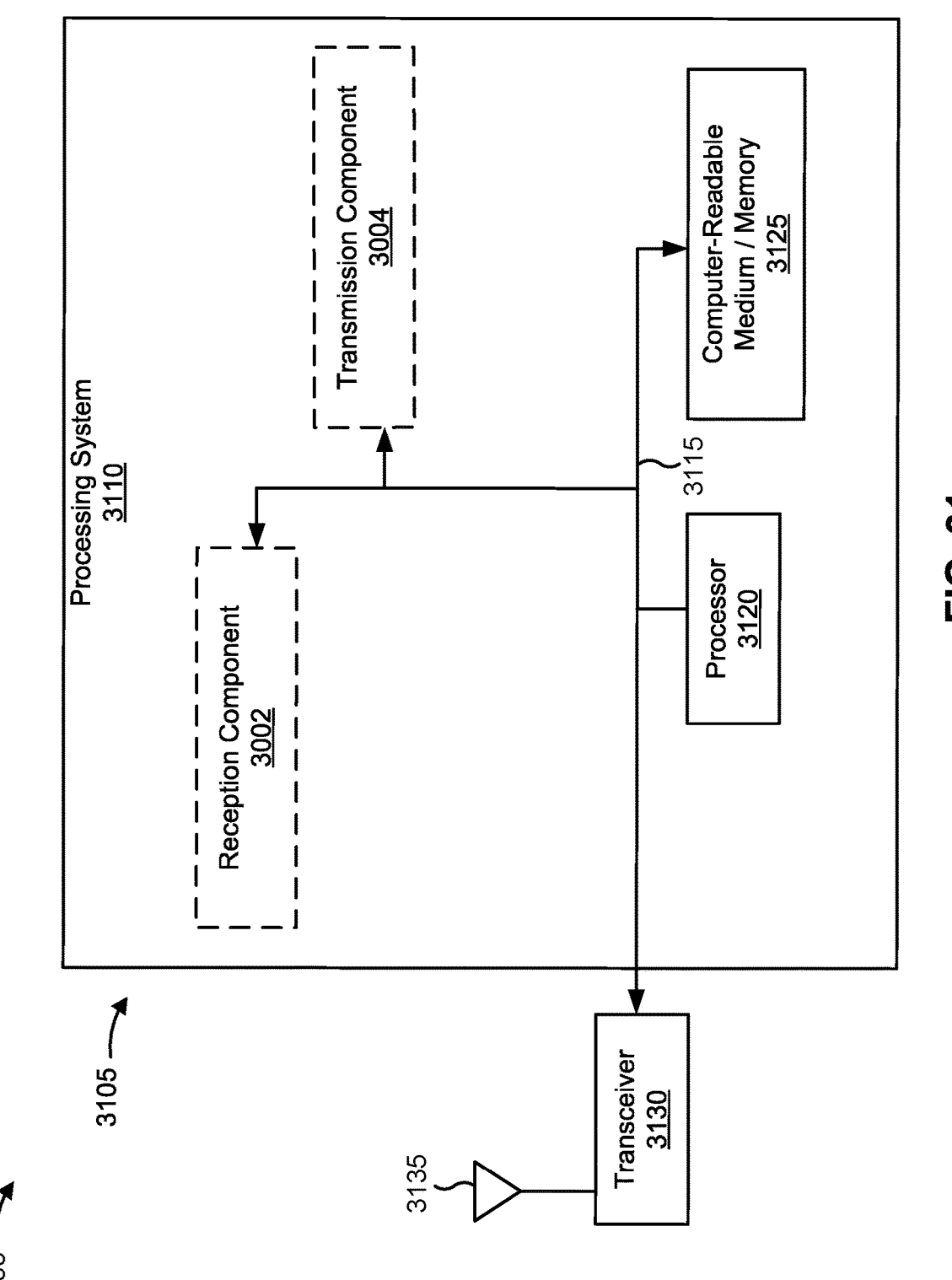
FIG. 31 is a diagram illustrating an example of a hardware implementation for an apparatus employing a processing system, in accordance with the present disclosure.

FIG. 31 is a diagram illustrating an example 3100 of a hardware implementation for an apparatus 3105 employing a processing system 3110. The apparatus 3105 may be a network node (e.g., a network node 150).

The processing system 3110 may be implemented with a bus architecture, represented generally by the bus 3115. The bus 3115 may include any number of interconnecting buses and bridges depending on the specific application of the processing system 3110 and the overall design constraints. The bus 3115 links together various circuits including one or more processors and/or hardware components, represented by the processor 3120, the illustrated components, and the computer-readable medium/memory 3125. The bus 3115 may also link various other circuits, such as timing sources, peripherals, voltage regulators, and/or power management circuits.

The processing system 3110 may be coupled to a transceiver 3130. The transceiver 3130 is coupled to one or more antennas 3135. The transceiver 3130 provides a means for communicating with various other apparatuses over a transmission medium. The transceiver 3130 receives a signal from the one or more antennas 3135, extracts information from the received signal, and provides the extracted information to the processing system 3110, specifically the reception component 3002. In addition, the transceiver 3130 receives information from the processing system 3110, specifically the transmission component 3004, and generates a signal to be applied to the one or more antennas 3135 based at least in part on the received information.

The processing system 3110 includes a processor 3120 coupled to a computer-readable medium/memory 3125. The processor 3120 is responsible for general processing, including the execution of software stored on the computer-readable medium/memory 3125. The software, when executed by the processor 3120, causes the processing system 3110 to perform the various functions described herein for any particular apparatus. The computer-readable medium/memory 3125 may also be used for storing data that is manipulated by the processor 3120 when executing software. The processing system further includes at least one of the illustrated components. The components may be software modules running in the processor 3120, resident/stored in the computer readable medium/memory 3125, one or more hardware modules coupled to the processor 3120, or some combination thereof.

In some aspects, the processing system 3110 may be a component of the network node 150 and may include the memory 292, the controller/processor 290, and/or the communication unit 294.

In some aspects, the apparatus 3105 for wireless communication includes means for receiving mobility history data associated with a UE from an apparatus 3006 in the disaggregated RAN; and means for training a UE mobility prediction model based at least in part on the mobility history data.

In some aspects, the apparatus 3105 for wireless communication includes means for transmitting the UE mobility prediction model to the apparatus 3006.

In some aspects, the apparatus 3105 for wireless communication includes means for receiving mobility history data associated with a UE from an apparatus 3006 in the disaggregated RAN; means for updating long-term mobility history data associated with the UE based at least in part on the mobility history data; and means for storing the updated long-term mobility history data.

In some aspects, the apparatus 3105 for wireless communication includes means for transmitting the updated long-term mobility history data to the apparatus 3006.

The aforementioned means may be one or more of the aforementioned components of the apparatus 3000 and/or the processing system 3110 of the apparatus 3105 configured to perform the functions recited by the aforementioned means. As described elsewhere herein, the processing system 3110 may include the memory 292, the controller/processor 290, and/or the communication unit 294 configured to perform the functions and/or operations recited herein.

FIG. 31 is provided as an example. Other examples may differ from what is described in connection with FIG. 31.

Figure 32:
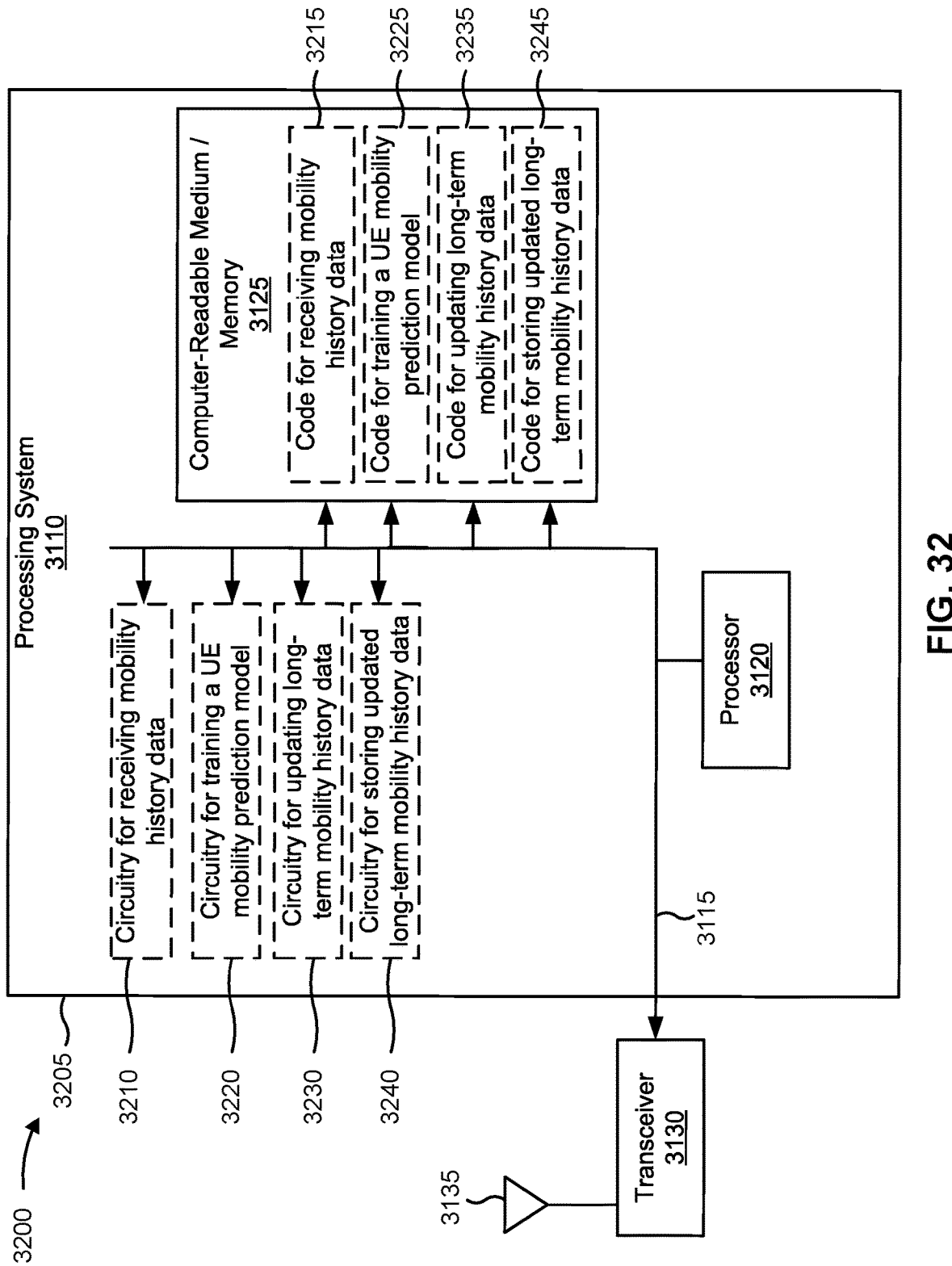
FIG. 32 is a diagram illustrating an example implementation of code and circuitry for an apparatus, in accordance with the present disclosure.

FIG. 32 is a diagram illustrating an example 3200 of an implementation of code and circuitry for an apparatus 3205, in accordance with the present disclosure. The apparatus 3205 may be a network node, or a network node may include the apparatus 3205.

As shown in FIG. 32, the apparatus 3205 may include circuitry for receiving mobility history data associated with a UE from a second network node in the disaggregated RAN (circuitry 3210). For example, the circuitry 3210 may enable the apparatus 3205 to receive mobility history data associated with a UE from a second network node in the disaggregated RAN.

As shown in FIG. 32, the apparatus 3205 may include, stored in computer-readable medium 3125, code for receiving mobility history data associated with a UE from a second network node in the disaggregated RAN (code 3215). For example, the code 3215, when executed by processor 3120, may cause processor 3120 to cause transceiver 3130 to receive mobility history data associated with a user equipment (UE) from a second network node in the disaggregated RAN.

As shown in FIG. 32, the apparatus 3205 may include circuitry for training a UE mobility prediction model based at least in part on the mobility history data (circuitry 3220). For example, the circuitry 3220 may enable the apparatus

3205 to train a UE mobility prediction model based at least in part on the mobility history data.

As shown in FIG. 32, the apparatus 3205 may include, stored in computer-readable medium 3125, code for training a UE mobility prediction model based at least in part on the mobility history data (code 3225). For example, the code 3225, when executed by processor 3120, may cause processor 3120 to train a UE mobility prediction model based at least in part on the mobility history data.

As shown in FIG. 32, the apparatus 3205 may include circuitry for receiving mobility history data associated with a UE from a second network node in the disaggregated RAN (circuitry 3210). For example, the circuitry 3210 may enable the apparatus 3205 to receive mobility history data associated with a UE from a second network node in the disaggregated RAN.

As shown in FIG. 32, the apparatus 3205 may include, stored in computer-readable medium 3125, code for receiving mobility history data associated with a UE from a second network node in the disaggregated RAN (code 3215). For example, the code 3215, when executed by processor 3120, may cause processor 3120 to cause transceiver 3130 to receive mobility history data associated with a user equipment (UE) from a second network node in the disaggregated RAN.

As shown in FIG. 32, the apparatus 3205 may include circuitry for updating long-term mobility history data associated with the UE based at least in part on the mobility history data (circuitry 3230). For example, the circuitry 3230 may enable the apparatus 3205 to update long-term mobility history data associated with the UE based at least in part on the mobility history data.

As shown in FIG. 32, the apparatus 3205 may include, stored in computer-readable medium 3125, code for updating long-term mobility history data associated with the UE based at least in part on the mobility history data (code 3235). For example, the code 3235, when executed by processor 3120, may cause processor 3120 to update long-term mobility history data associated with the UE based at least in part on the mobility history data.

As shown in FIG. 32, the apparatus 3205 may include circuitry for storing the updated long-term mobility history data at the first network node (circuitry 3240). For example, the circuitry 3240 may enable the apparatus 3205 to store the updated long-term mobility history data at the first network node.

As shown in FIG. 32, the apparatus 3205 may include, stored in computer-readable medium 3125, code for storing the updated long-term mobility history data at the first network node (code 3245). For example, the code 3245, when executed by processor 3120, may cause processor 3120 to store the updated long-term mobility history data at the first network node.

FIG. 32 is provided as an example. Other examples may differ from what is described in connection with FIG. 32.

The following provides an overview of some Aspects of the present disclosure:

Aspect 1: A method of wireless communication performed by a first network node in a radio access network (RAN), comprising: transmitting mobility history data for a user equipment (UE) to a second network node in a core network associated with the RAN; and receiving a UE mobility prediction model that is based at least in part on the mobility history data from the second network node.

Aspect 2: The method of Aspect 1, wherein the second network node is an access management function (AMF) node.

Aspect 3: The method of Aspect 1 or 2, wherein transmitting the mobility history data to the second network node comprises: transmitting the mobility history data to the second network node in a UE context release complete message.

Aspect 4: The method of one or more of Aspects 1-3, wherein transmitting the mobility history data to the second network node comprises: transmitting the mobility history data to the second network node in a path switch request message.

Aspect 5: The method of one or more of Aspects 1-4, wherein receiving the UE mobility prediction model from the second network node comprises: receiving the UE mobility prediction model from the second network node during a radio resource control (RRC) connection setup procedure for the UE.

Aspect 6: The method of one or more of Aspects 1-5, wherein receiving the UE mobility prediction model from the second network node comprises: receiving the UE mobility prediction model from the second network node during a handover procedure for the UE.

Aspect 7: The method of one or more of Aspects 1-6, wherein receiving the UE mobility prediction model from the second network node comprises: receiving the UE mobility prediction model from the second network node in an initial UE context setup request message.

Aspect 8: The method of one or more of Aspects 17, wherein receiving the UE mobility prediction model from the second network node comprises: receiving the UE mobility prediction model from the second network node in a UE context modification request message.

Aspect 9: The method of one or more of Aspects 1-8, wherein receiving the UE mobility prediction model from the second network node comprises: receiving the UE mobility prediction model from the second network node in a path switch request acknowledgement message.

Aspect 10: The method of one or more of Aspects 1-9, wherein the UE mobility prediction model is trained based at least in part on: recent mobility history data associated with a UE, and long-term mobility history data collected for the UE.

Aspect 11: The method of one or more of Aspects 1-10, wherein the UE mobility prediction model comprises: a UE-specific UE mobility prediction model for the UE.

Aspect 12: A method of wireless communication performed by a first network node in a radio access network (RAN), comprising: transmitting mobility history data for a user equipment (UE) to a second network node in a core network associated with the RAN; and receiving updated long-term mobility history data that is based at least in part on the mobility history data from the second network node.

Aspect 13: The method of Aspect 12, wherein the second network node is an access management function (AMF) node.

Aspect 14: The method of Aspect 12 or 13, wherein transmitting the mobility history data to the second network node comprises: transmitting the mobility history data to the second network node in a UE context release complete message.

Aspect 15: The method of one or more of Aspects 12-14, wherein transmitting the mobility history data to the second network node comprises: transmitting the mobility history data to the second network node in a path switch request message.

Aspect 16: The method of one or more of Aspects 12-15, wherein receiving the updated long-term mobility history data from the second network node comprises: receiving the updated long-term mobility history data from the second network node during a radio resource control (RRC) connection setup procedure for the UE.

Aspect 17: The method of one or more of Aspects 12-16, wherein receiving the updated long-term mobility history data from the second network node comprises: receiving the updated long-term mobility history data from the second network node during a handover procedure for the UE.

Aspect 18: The method of one or more of Aspects 12-17, wherein receiving the updated long-term mobility history data from the second network node comprises: receiving the updated long-term mobility history data from the second network node in an initial UE context setup request message.

Aspect 19: The method of one or more of Aspects 12-18, wherein receiving the updated long-term mobility history data from the second network node comprises: receiving the updated long-term mobility history data from the second network node in a UE context modification request message.

Aspect 20: The method of one or more of Aspects 12-19, wherein receiving the updated long-term mobility history data from the second network node comprises: receiving the updated long-term mobility history data from the second network node in a path switch request acknowledgement message.

Aspect 21: A method of wireless communication performed by a first network node in a disaggregated radio access network (RAN), comprising: transmitting mobility history data for a user equipment (UE) to a second network node in the disaggregated RAN; and receiving a UE mobility prediction model that is based at least in part on the mobility history data from the second network node.

Aspect 22: The method of Aspect 21, wherein the first network node is a base station.

Aspect 23: The method of Aspect 21 or 22, wherein the first network node is a central unit.

Aspect 24: The method of one or more of Aspects 21-23, wherein the first network node is a distributed unit.

Aspect 25: The method of one or more of Aspects 21-24, wherein the first network node is a radio unit.

Aspect 26: The method of one or more of Aspects 21-25, wherein the second network node is a service management and orchestration (SMO) node.

Aspect 27: The method of one or more of Aspects 21-26, wherein the second network node is a RAN intelligent controller (RIC) node.

Aspect 28: The method of one or more of Aspects 21-27, wherein transmitting the mobility history data to the second network node comprises: transmitting the mobility history data to the second network node in an event report.

Aspect 29: The method of one or more of Aspects 21-28, wherein receiving the UE mobility prediction model from the second network node comprises: receiving the UE mobility prediction model from the second network node during a radio resource control (RRC) connection setup procedure for the UE.

Aspect 30: The method of one or more of Aspects 21-29, wherein receiving the UE mobility prediction model from the second network node comprises: receiving the UE mobility prediction model from the second network node during a handover procedure for the UE.

Aspect 31: The method of one or more of Aspects 21-30, wherein receiving the UE mobility prediction model from the second network node comprises: receiving the UE mobility prediction model from the second network node in a UE context setup message.

Aspect 32: The method of one or more of Aspects 21-31, wherein the UE mobility prediction model is trained based at least in part on: recent mobility history data associated with a UE, and long-term mobility history data collected for the UE.

Aspect 33: The method of one or more of Aspects 21-32, wherein the UE mobility prediction model comprises: a UE-specific UE mobility prediction model for the UE.

Aspect 34: A method of wireless communication performed by a first network node in a disaggregated radio access network (RAN), comprising: transmitting mobility history data for a user equipment (UE) to a second network node in the disaggregated RAN; and receiving updated long-term mobility history data that is based at least in part on the mobility history data from the second network node.

Aspect 35: The method of Aspect 34, wherein the first network node is a base station.

Aspect 36: The method of Aspect 34 or 35, wherein the first network node is a central unit.

Aspect 37: The method of one or more of Aspects 34-36, wherein the first network node is a distributed unit.

Aspect 38: The method of one or more of Aspects 34-37, wherein the first network node is a radio unit.

Aspect 39: The method of one or more of Aspects 34-38, wherein the second network node is a service management and orchestration (SMO) node.

Aspect 40: The method of one or more of Aspects 34-39, wherein the second network node is a RAN intelligent controller (RIC) node.

Aspect 41: The method of one or more of Aspects 34-40, wherein transmitting the mobility history data to the second network node comprises: transmitting the mobility history data to the second network node in an event report.

Aspect 42: The method of one or more of Aspects 34-41, wherein receiving the updated long-term mobility history data from the second network node comprises: receiving the updated long-term mobility history data from the second network node during a radio resource control (RRC) connection setup procedure for the UE.

Aspect 43: The method of one or more of Aspects 34-42, wherein receiving the updated long-term mobility history data from the second network node comprises: receiving the updated long-term mobility history data from the second network node during a handover procedure for the UE.

Aspect 44: The method of one or more of Aspects 34-43, wherein receiving the updated long-term mobility history data from the second network node comprises: receiving the updated long-term mobility history data from the second network node in a UE context setup message.

Aspect 45: A method of wireless communication performed by a first network node in a core network, comprising: receiving mobility history data associated with a user equipment (UE); and transmitting the mobility history data to a second network node in the core network for use in training a UE mobility prediction model.

Aspect 46: The method of Aspect 45, wherein receiving the mobility history data comprises: receiving the mobility history data from a third network node that is included in a radio access network (RAN) associated with the core network.

Aspect 47: The method of Aspect 46, wherein receiving the mobility history data from the third network node comprises: receiving the mobility history data from the third network node in a UE context release complete message.

Aspect 48: The method of Aspect 46 or 47, wherein receiving the mobility history data from the third network node comprises: receiving the mobility history data from the third network node in a path switch request message.

Aspect 49: The method of one or more of Aspects 46-48, wherein the first network node is an access management function (AMF) node; and wherein the third network node is a base station.

Aspect 50: The method of Aspect 49, wherein the second network node is at least one of: a unified data management (UDM) node, a unified data repository (UDR) node, or a home subscriber service (HSS) node.

Aspect 51: The method of Aspect 49 or 50, wherein the second network node is a network data analytics function (NWDAF) node.

Aspect 52: The method of one or more of Aspects 49-51, wherein the second network node is a machine learning model server node.

Aspect 53: The method of one or more of Aspects 45-52, wherein transmitting the mobility history data to the second network node comprises: transmitting the mobility history data to the second network node for use in training a UE mobility prediction model.

Aspect 54: The method of Aspect 53, further comprising: receiving the UE mobility prediction model from the second network node; and transmitting the UE mobility prediction model to a third network node that is included in a radio access network (RAN) associated with the core network.

Aspect 55: The method of Aspect 54, wherein transmitting the UE mobility prediction model to the third network node comprises: transmitting the UE mobility prediction model to the third network node during a radio resource control (RRC) connection setup procedure for the UE.

Aspect 56: The method of Aspect 54 or 55, wherein transmitting the UE mobility prediction model to the third network node comprises: transmitting the UE mobility prediction model to the third network node during a handover procedure for the UE.

Aspect 57: The method of one or more of Aspects 54-56, wherein transmitting the UE mobility prediction model to the third network node comprises: transmitting the UE mobility prediction model to the third network node in an initial UE context setup request message.

Aspect 58: The method of one or more of Aspects 54-57, wherein transmitting the UE mobility prediction model to the third network node comprises: transmitting the UE mobility prediction model to the third network node in a UE context modification request message.

Aspect 59: The method of one or more of Aspects 54-58, wherein transmitting the UE mobility prediction model to the third network node comprises: transmitting the UE mobility prediction model to the third network node in a path switch request acknowledgement message.

Aspect 60: The method of one or more of Aspects 53-59, wherein the UE mobility prediction model is trained based at least in part on: the mobility history data, and long-term mobility history data collected for the UE.

Aspect 61: The method of one or more of Aspects 45-60, wherein transmitting the mobility history data to the second network node comprises: transmitting the mobility history data to the second network node for storage at the second network node.

Aspect 62: The method of Aspect 61, further comprising: receiving long-term mobility history data from the second network node, wherein the long-term mobility history data is based at least in part on the mobility history data; and transmitting the long-term mobility history data to a third network node that is included in a radio access network (RAN) associated with the core network.

Aspect 63: The method of Aspect 62, wherein transmitting the long-term mobility history data to the third network node comprises: transmitting the long-term mobility history data to the third network node during a radio resource control (RRC) connection setup procedure for the UE.

Aspect 64: The method of Aspect 62 or 63, wherein transmitting the long-term mobility history data to the third network node comprises: transmitting the long-term mobility history data to the third network node during a handover procedure for the UE.

Aspect 65: The method of one or more of Aspects 62-64, wherein transmitting the long-term mobility history data to the third network node comprises: transmitting the long-term mobility history data to the third network node in an initial UE context setup request message.

Aspect 66: The method of one or more of Aspects 62-65, wherein transmitting the long-term mobility history data to the third network node comprises: transmitting the long-term mobility history data to the third network node in a UE context modification request message.

Aspect 67: The method of one or more of Aspects 62-66, wherein transmitting the long-term mobility history data to the third network node comprises: transmitting the long-term mobility history data to the third network node in a path switch request acknowledgement message.

Aspect 68: A method of wireless communication performed by a first network node in a core network, comprising: receiving a user equipment (UE) mobility prediction model; and transmitting the UE mobility prediction model to a second network node in the core network for storage at the second network node.

Aspect 69: The method of Aspect 68, wherein receiving the UE mobility prediction model comprises: receiving the UE mobility prediction model from a third network node that is included in a radio access network (RAN) associated with the core network.

Aspect 70: The method of Aspect 69, wherein receiving the UE mobility prediction model from the third network node comprises: receiving the UE mobility prediction model from the third network node in a UE context release complete message.

Aspect 71: The method of Aspect 69 or 70, wherein receiving the UE mobility prediction model from the third network node comprises: receiving the UE mobility prediction model from the third network node in a path switch request message.

Aspect 72: The method of one or more of Aspects 69-71, wherein the first network node is an access management function (AMF) node; and wherein the third network node is a base station.

Aspect 73: The method of Aspect 72, wherein the second network node is a unified data management (UDM) node.

Aspect 74: The method of Aspect 72 or 73, wherein the second network node is a unified data repository (UDR) node.

Aspect 75: The method of one or more of Aspects 72-74, wherein the second network node is a home subscriber service (HSS) node.

Aspect 76: The method of one or more of Aspects 72-75, wherein the second network node is a network data analytics function (NWDAF) node.

Aspect 77: The method of one or more of Aspects 72-76, wherein the second network node is a machine learning model server node.

Aspect 78: The method of one or more of Aspects 68-77, further comprising: receiving the UE mobility prediction model from the second network node; and transmitting the UE mobility prediction model to a third network node that is included in a radio access network (RAN) associated with the core network.

Aspect 79: The method of Aspect 78, wherein transmitting the UE mobility prediction model to the third network node comprises: transmitting the UE mobility prediction model to the third network node during a radio resource control (RRC) connection setup procedure for the UE.

Aspect 80: The method of Aspect 78 or 79, wherein transmitting the UE mobility prediction model to the third network node comprises: transmitting the UE mobility prediction model to the third network node during a handover procedure for the UE.

Aspect 81: The method of one or more of Aspects 78-80, wherein transmitting the UE mobility prediction model to the third network node comprises: transmitting the UE mobility prediction model to the third network node in an initial UE context setup request message.

Aspect 82: The method of one or more of Aspects 78-81, wherein transmitting the UE mobility prediction model to the third network node comprises: transmitting the UE mobility prediction model to the third network node in a UE context modification request message.

Aspect 83: The method of one or more of Aspects 78-82, wherein transmitting the UE mobility prediction model to the third network node comprises: transmitting the UE mobility prediction model to the third network node in a path switch request acknowledgement message.

Aspect 84: The method of one or more of Aspects 78-83, wherein the UE mobility prediction model is trained based at least in part on: recent mobility history data associated with a UE, and long-term mobility history data collected for the UE.

Aspect 85: The method of Aspect 84, wherein the UE mobility prediction model comprises: a UE-specific UE mobility prediction model for the UE.

Aspect 86: A method of wireless communication performed by a first network node in a core network, comprising: receiving mobility history data associated with a user equipment (UE) from a second network node in the core network; and training a UE mobility prediction model based at least in part on the mobility history data.

Aspect 87: The method of Aspect 86, wherein the second network node is an access management function (AMF) node.

Aspect 88: The method of Aspect 86 or 87, wherein the first network node is a unified data management (UDM) node.

Aspect 89: The method of one or more of Aspects 86-88, wherein the first network node is a unified data repository (UDR) node.

Aspect 90: The method of one or more of Aspects 86-89, wherein the first network node is a home subscriber service (HSS) node.

Aspect 91: The method of one or more of Aspects 86-98, wherein the first network node is a network data analytics function (NWDAF) node.

Aspect 92: The method of one or more of Aspects 86-91, wherein the first network node is a machine learning model server node.

Aspect 93: The method of one or more of Aspects 86-92, wherein training the UE mobility prediction model comprises: training a UE-specific UE mobility prediction model for the UE.

Aspect 94: The method of one or more of Aspects 86-93, further comprising: transmitting the UE mobility prediction model to the second network node.

Aspect 95: The method of Aspect 94, wherein transmitting the UE mobility prediction model to the second network node comprises: transmitting the UE mobility prediction model to the second network node during a radio resource control (RRC) connection setup procedure for the UE.

Aspect 96: The method of Aspect 94 or 95, wherein transmitting the UE mobility prediction model to the second network node comprises: transmitting the UE mobility prediction model to the second network node during a handover procedure for the UE.

Aspect 97: The method of one or more of Aspects 94-96, wherein transmitting the UE mobility prediction model to the second network node comprises: transmitting the UE mobility prediction model to the second network node in a unified data management (UDM) response message.

Aspect 98: The method of one or more of Aspects 86-97, wherein training the UE mobility prediction model comprises: training the UE mobility prediction model based at least in part on long-term mobility history data collected for the UE.

Aspect 99: A method of wireless communication performed by a first network node in a core network, comprising: receiving mobility history data associated with a user equipment (UE) from a second network node in the core network; updating long-term mobility history data associated with the UE based at least in part on the mobility history data; and storing the updated long-term mobility history data at the first network node.

Aspect 100: The method of Aspect 99, wherein the second network node is an access management function (AMF) node.

Aspect 101: The method of Aspect 99 or 100, wherein the first network node is a unified data management (UDM) node.

Aspect 102: The method of one or more of Aspects 99-101, wherein the first network node is a unified data repository (UDR) node.

Aspect 103: The method of one or more of Aspects 99-102, wherein the first network node is a home subscriber service (HSS) node.

Aspect 104: The method of one or more of Aspects 99-103, wherein the first network node is a network data analytics function (NWDAF) node.

Aspect 105: The method of one or more of Aspects 99-104, wherein the first network node is a machine learning model server node.

Aspect 106: The method of one or more of Aspects 99-105, further comprising: transmitting the updated long-term mobility history data to the second network node.

Aspect 107: The method of Aspect 106, wherein transmitting the updated long-term mobility history data to the second network node comprises: transmitting the updated long-term mobility history data to the second network node during a radio resource control (RRC) connection setup procedure for the UE.

Aspect 108: The method of Aspect 106 or 107, wherein transmitting the updated long-term mobility history data to the second network node comprises: transmitting the updated long-term mobility history data to the second network node during a handover procedure for the UE.

Aspect 109: The method of one or more of Aspects 106-109, wherein transmitting the updated long-term mobility history data to the second network node comprises: transmitting the updated long-term mobility history data to the second network node in a unified data management (UDM) response message.

Aspect 110: A method of wireless communication performed by a first network node in a disaggregated radio access network (RAN), comprising: receiving mobility history data associated with a user equipment (UE) from a second network node in the disaggregated RAN; and training a UE mobility prediction model based at least in part on the mobility history data.

Aspect 111: The method of Aspect 110, wherein the second network node is a base station.

Aspect 112: The method of Aspect 110 or 111, wherein the second network node is a central unit.

Aspect 113: The method of one or more of Aspects 110-112, wherein the second network node is a distributed unit.

Aspect 114: The method of one or more of Aspects 110-113, wherein the second network node is a radio unit.

Aspect 115: The method of one or more of Aspects 110-114, wherein the first network node is a service management and orchestration (SMO) node.

Aspect 116: The method of one or more of Aspects 110-115, wherein the first network node is a RAN intelligent controller (RIC) node.

Aspect 117: The method of one or more of Aspects 110-115, wherein training the UE mobility prediction model comprises: training a UE-specific UE mobility prediction model for the UE.

Aspect 118: The method of one or more of Aspects 110-116, further comprising: transmitting the UE mobility prediction model to the second network node.

Aspect 119: The method of one or more of Aspects 110-116, wherein receiving the mobility history data from the second network node comprises: receiving the mobility history data in an event report from the second network node.

Aspect 120: The method of Aspect 119, wherein transmitting the UE mobility prediction model to the second network node comprises: transmitting the UE mobility prediction model to the second network node during a radio resource control (RRC) connection setup procedure for the UE.

Aspect 121: The method of Aspect 119 or 120, wherein transmitting the UE mobility prediction model to the second network node comprises: transmitting the UE mobility prediction model to the second network node during a handover procedure for the UE.

Aspect 122: The method of one or more of Aspects 119-121, wherein transmitting the UE mobility prediction model to the second network node comprises: transmitting the UE mobility prediction model to the second network node in a UE context setup message.

Aspect 123: The method of one or more of Aspects 110-122, wherein training the UE mobility prediction model comprises: training the UE mobility prediction model based at least in part on long-term mobility history data collected for the UE.

Aspect 124: A method of wireless communication performed by a first network node in a disaggregated radio access network (RAN), comprising: receiving mobility history data associated with a user equipment (UE) from a second network node in the disaggregated RAN; updating long-term mobility history data associated with the UE based at least in part on the mobility history data; and storing the updated long-term mobility history data at the first network node.

Aspect 125: The method of Aspect 124, wherein the second network node is a base station.

Aspect 126: The method of Aspect 124 125, wherein the second network node is a central unit.

Aspect 127: The method of one or more of Aspects 124-126, wherein the second network node is a distributed unit.

Aspect 128: The method of one or more of Aspects 124-127, wherein the second network node is a radio unit.

Aspect 129: The method of one or more of Aspects 124-128, wherein the first network node is a service management and orchestration (SMO) node.

Aspect 130: The method of one or more of Aspects 124-129, wherein the first network node is a RAN intelligent controller (RIC) node.

Aspect 131: The method of one or more of Aspects 124-130, further comprising: transmitting the updated long-term mobility history data to the second network node.

Aspect 132: The method of Aspect 131, wherein transmitting the updated long-term mobility history data to the second network node comprises: transmitting the updated long-term mobility history data to the second network node during a radio resource control (RRC) connection setup procedure for the UE.

Aspect 133: The method of Aspect 131 or 132, wherein transmitting the updated long-term mobility history data to the second network node comprises: transmitting the updated long-term mobility history data to the second network node during a handover procedure for the UE.

Aspect 134: The method of one or more of Aspects 131-133, wherein transmitting the updated long-term mobility history data to the second network node comprises: transmitting the updated long-term mobility history data to the second network node in a UE context setup message.

Aspect 135: An apparatus for wireless communication at a device, comprising a processor; memory coupled with the processor; and instructions stored in the memory and executable by the processor to cause the apparatus to perform the method of one or more of Aspects 1-11.

Aspect 136: A device for wireless communication, comprising a memory and one or more processors coupled to the memory, the one or more processors configured to perform the method of one or more of Aspects 1-11.

Aspect 137: An apparatus for wireless communication, comprising at least one means for performing the method of one or more of Aspects 1-11.

Aspect 138: A non-transitory computer-readable medium storing code for wireless communication, the code comprising instructions executable by a processor to perform the method of one or more of Aspects 1-11.

Aspect 139: A non-transitory computer-readable medium storing a set of instructions for wireless communication, the set of instructions comprising one or more instructions that, when executed by one or more processors of a device, cause the device to perform the method of one or more of Aspects 1-11.

Aspect 140: An apparatus for wireless communication at a device, comprising a processor; memory coupled with the processor; and instructions stored in the memory and executable by the processor to cause the apparatus to perform the method of one or more of Aspects 12-20.

Aspect 141: A device for wireless communication, comprising a memory and one or more processors coupled to the memory, the one or more processors configured to perform the method of one or more of Aspects 12-20.

Aspect 142: An apparatus for wireless communication, comprising at least one means for performing the method of one or more of Aspects 12-20.

Aspect 143: A non-transitory computer-readable medium storing code for wireless communication, the code comprising instructions executable by a processor to perform the method of one or more of Aspects 12-20.

Aspect 144: A non-transitory computer-readable medium storing a set of instructions for wireless communication, the set of instructions comprising one or more instructions that, when executed by one or more processors of a device, cause the device to perform the method of one or more of Aspects 12-20.

Aspect 145: An apparatus for wireless communication at a device, comprising a processor; memory coupled with the processor; and instructions stored in the memory and executable by the processor to cause the apparatus to perform the method of one or more of Aspects 21-33.

Aspect 146: A device for wireless communication, comprising a memory and one or more processors coupled to the memory, the one or more processors configured to perform the method of one or more of Aspects 21-33.

Aspect 147: An apparatus for wireless communication, comprising at least one means for performing the method of one or more of Aspects 21-33.

Aspect 148: A non-transitory computer-readable medium storing code for wireless communication, the code comprising instructions executable by a processor to perform the method of one or more of Aspects 21-33.

Aspect 148: A non-transitory computer-readable medium storing a set of instructions for wireless communication, the set of instructions comprising one or more instructions that, when executed by one or more processors of a device, cause the device to perform the method of one or more of Aspects 21-33.

Aspect 149: An apparatus for wireless communication at a device, comprising a processor; memory coupled with the processor; and instructions stored in the memory and executable by the processor to cause the apparatus to perform the method of one or more of Aspects 34-44.

Aspect 150: A device for wireless communication, comprising a memory and one or more processors coupled to the memory, the one or more processors configured to perform the method of one or more of Aspects 34-44.

Aspect 151: An apparatus for wireless communication, comprising at least one means for performing the method of one or more of Aspects 34-44.

Aspect 152: A non-transitory computer-readable medium storing code for wireless communication, the code comprising instructions executable by a processor to perform the method of one or more of Aspects 34-44.

Aspect 153: A non-transitory computer-readable medium storing a set of instructions for wireless communication, the set of instructions comprising one or more instructions that, when executed by one or more processors of a device, cause the device to perform the method of one or more of Aspects 34-44.

Aspect 154: An apparatus for wireless communication at a device, comprising a processor; memory coupled with the processor; and instructions stored in the memory and executable by the processor to cause the apparatus to perform the method of one or more of Aspects 45-67.

Aspect 155: A device for wireless communication, comprising a memory and one or more processors coupled to the memory, the one or more processors configured to perform the method of one or more of Aspects 45-67.

Aspect 156: An apparatus for wireless communication, comprising at least one means for performing the method of one or more of Aspects 45-67.

Aspect 157: A non-transitory computer-readable medium storing code for wireless communication, the code comprising instructions executable by a processor to perform the method of one or more of Aspects 45-67.

Aspect 158: A non-transitory computer-readable medium storing a set of instructions for wireless communication, the set of instructions comprising one or more instructions that, when executed by one or more processors of a device, cause the device to perform the method of one or more of Aspects 45-67.

Aspect 159: An apparatus for wireless communication at a device, comprising a processor; memory coupled with the processor; and instructions stored in the memory and executable by the processor to cause the apparatus to perform the method of one or more of Aspects 68-85.

Aspect 160: A device for wireless communication, comprising a memory and one or more processors coupled to the memory, the one or more processors configured to perform the method of one or more of Aspects 68-85.

Aspect 161: An apparatus for wireless communication, comprising at least one means for performing the method of one or more of Aspects 68-85.

Aspect 162: A non-transitory computer-readable medium storing code for wireless communication, the code comprising instructions executable by a processor to perform the method of one or more of Aspects 68-85.

Aspect 163: A non-transitory computer-readable medium storing a set of instructions for wireless communication, the set of instructions comprising one or more instructions that, when executed by one or more processors of a device, cause the device to perform the method of one or more of Aspects 68-85.

Aspect 164: An apparatus for wireless communication at a device, comprising a processor; memory coupled with the processor; and instructions stored in the memory and executable by the processor to cause the apparatus to perform the method of one or more of Aspects 86-98.

Aspect 165: A device for wireless communication, comprising a memory and one or more processors coupled to the memory, the one or more processors configured to perform the method of one or more of Aspects 86-98.

Aspect 166: An apparatus for wireless communication, comprising at least one means for performing the method of one or more of Aspects 86-98.

Aspect 167: A non-transitory computer-readable medium storing code for wireless communication, the code comprising instructions executable by a processor to perform the method of one or more of Aspects 86-98.

Aspect 168: A non-transitory computer-readable medium storing a set of instructions for wireless communication, the set of instructions comprising one or more instructions that, when executed by one or more processors of a device, cause the device to perform the method of one or more of Aspects 86-98.

Aspect 169: An apparatus for wireless communication at a device, comprising a processor; memory coupled with the processor; and instructions stored in the memory and executable by the processor to cause the apparatus to perform the method of one or more of Aspects 99-109.

Aspect 170: A device for wireless communication, comprising a memory and one or more processors coupled to the memory, the one or more processors configured to perform the method of one or more of Aspects 99-109.

Aspect 171: An apparatus for wireless communication, comprising at least one means for performing the method of one or more of Aspects 99-109.

Aspect 172: A non-transitory computer-readable medium storing code for wireless communication, the code comprising instructions executable by a processor to perform the method of one or more of Aspects 99-109.

Aspect 173: A non-transitory computer-readable medium storing a set of instructions for wireless communication, the set of instructions comprising one or more instructions that, when executed by one or more processors of a device, cause the device to perform the method of one or more of Aspects 99-109.

Aspect 174: An apparatus for wireless communication at a device, comprising a processor; memory coupled with the processor; and instructions stored in the memory and executable by the processor to cause the apparatus to perform the method of one or more of Aspects 110-123.

Aspect 175: A device for wireless communication, comprising a memory and one or more processors coupled to the memory, the one or more processors configured to perform the method of one or more of Aspects 110-123.

Aspect 176: An apparatus for wireless communication, comprising at least one means for performing the method of one or more of Aspects 111-123.

Aspect 177: A non-transitory computer-readable medium storing code for wireless communication, the code comprising instructions executable by a processor to perform the method of one or more of Aspects 110-123.

Aspect 178: A non-transitory computer-readable medium storing a set of instructions for wireless communication, the set of instructions comprising one or more instructions that, when executed by one or more processors of a device, cause the device to perform the method of one or more of Aspects 111-123.

Aspect 179: An apparatus for wireless communication at a device, comprising a processor; memory coupled with the processor; and instructions stored in the memory and executable by the processor to cause the apparatus to perform the method of one or more of Aspects 124-134.

Aspect 180: A device for wireless communication, comprising a memory and one or more processors coupled to the memory, the one or more processors configured to perform the method of one or more of Aspects 124-134.

Aspect 181: An apparatus for wireless communication, comprising at least one means for performing the method of one or more of Aspects 124-134.

Aspect 182: A non-transitory computer-readable medium storing code for wireless communication, the code comprising instructions executable by a processor to perform the method of one or more of Aspects 124-134.

Aspect 183: A non-transitory computer-readable medium storing a set of instructions for wireless communication, the set of instructions comprising one or more instructions that, when executed by one or more processors of a device, cause the device to perform the method of one or more of Aspects 124-134.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first network node, comprising:
   one or more memories; and
   one or more processors, coupled to the one or more memories, configured to cause the first network node to:
      transmit mobility history data for a user equipment (UE) to a second network node in a core network associated with a radio access network (RAN), wherein the mobility history data includes locations of the UE and respective durations corresponding to the locations, and wherein the first network node is configured to operate in the RAN; and
      receive, from the second network node, a UE mobility prediction model that is based at least in part on the mobility history data, wherein the UE mobility prediction model comprises a UE-specific mobility prediction model for the UE.

2. The apparatus of claim 1, wherein the second network node is an access management function (AMF) node.

3. The apparatus of claim 1, wherein, to transmit the mobility history data to the second network node, the one or more processors are configured to cause the first network node to:
   transmit the mobility history data to the second network node in a UE context release complete message.

4. The apparatus of claim 1, wherein, to transmit the mobility history data to the second network node, the one or more processors are configured to cause the first network node to:
   transmit the mobility history data to the second network node in a path switch request message.

5. The apparatus of claim 1, wherein, to receive the UE mobility prediction model from the second network node, the one or more processors are configured to cause the first network node to:
   receive the UE mobility prediction model from the second network node during a radio resource control (RRC) connection setup procedure for the UE.

6. The apparatus of claim 1, wherein, to receive the UE mobility prediction model from the second network node, the one or more processors are configured to cause the first network node to:
   receive the UE mobility prediction model from the second network node during a handover procedure for the UE.

7. The apparatus of claim 1, wherein, to receive the UE mobility prediction model from the second network node, the one or more processors are configured to cause the first network node to:
   receive the UE mobility prediction model from the second network node in an initial UE context setup request message.

8. An apparatus for wireless communication at a first network node, comprising:
   one or more memories; and
   one or more processors, coupled to the one or more memories, configured to cause the first network node to:
      transmit mobility history data for a user equipment (UE) to a second network node in a core network associated with a radio access network (RAN), wherein the mobility history data includes locations of the UE and respective durations corresponding to the locations, and wherein the first network node is configured to operate in the RAN; and
      receive, from the second network node, updated long-term mobility history data that is based at least in part on the mobility history data, wherein the updated long-term mobility history data comprises UE-specific long-term mobility history data for the UE.

9. The apparatus of claim 8, wherein the second network node is an access management function (AMF) node.

10. The apparatus of claim 8, wherein, to transmit the mobility history data to the second network node, the one or more processors are configured to cause the first network node to:

transmit the mobility history data to the second network node in a UE context release complete message.

11. The apparatus of claim 8, wherein, to transmit the mobility history data to the second network node, the one or more processors are configured to cause the first network node to:

transmit the mobility history data to the second network node in a path switch request message.

12. The apparatus of claim 8, wherein, to receive the updated long-term mobility history data from the second network node, the one or more processors are configured to cause the first network node to:

receive the updated long-term mobility history data from the second network node during a radio resource control (RRC) connection setup procedure for the UE.

13. The apparatus of claim 8, wherein, to receive the updated long-term mobility history data from the second network node, the one or more processors are configured to cause the first network node to:

receive the updated long-term mobility history data from the second network node during a handover procedure for the UE.

14. The apparatus of claim 8, wherein, to receive the updated long-term mobility history data from the second network node, the one or more processors are configured to cause the first network node to:

receive the updated long-term mobility history data from the second network node in an initial UE context setup request message.

15. The apparatus of claim 8, wherein, to receive the updated long-term mobility history data from the second network node, the one or more processors are configured to cause the first network node to:

receive the updated long-term mobility history data from the second network node in a UE context modification request message.

16. The apparatus of claim 8, wherein, to receive the updated long-term mobility history data from the second network node, the one or more processors are configured to cause the first network node to:

receive the updated long-term mobility history data from the second network node in a path switch request acknowledgement message.

17. An apparatus for wireless communication at a first network node, comprising:

one or more memories; and one or more processors, coupled to the one or more memories, configured to cause the first network node to:

provide mobility history data for a user equipment (UE) to a second network node in a disaggregated radio access network (RAN), wherein the mobility history data includes locations of the UE and respective durations corresponding to the locations, and wherein the first network node is configured to operate in the disaggregated RAN; and obtain, from the second network node, a UE mobility prediction model that is based at least in part on the mobility history data, wherein the UE mobility prediction model comprises a UE-specific mobility prediction model for the UE.

18. The apparatus of claim 17, wherein, to transmit the mobility history data to the second network node, the one or more processors are configured to cause the first network node to:

provide the mobility history data to the second network node in an event report.

19. The apparatus of claim 17, wherein, to obtain the UE mobility prediction model from the second network node, the one or more processors are configured to cause the first network node to:

obtain the UE mobility prediction model from the second network node during a radio resource control (RRC) connection setup procedure for the UE.

20. The apparatus of claim 17, wherein, to obtain the UE mobility prediction model from the second network node, the one or more processors are configured to cause the first network node to:

obtain the UE mobility prediction model from the second network node during a handover procedure for the UE.

21. The apparatus of claim 17, wherein, to obtain the UE mobility prediction model from the second network node, the one or more processors are configured to cause the first network node to:

obtain the UE mobility prediction model from the second network node in a UE context setup message.

22. The apparatus of claim 17, wherein the UE mobility prediction model is trained based at least in part on:

recent mobility history data associated with the UE, and long-term mobility history data collected for the UE.

23. The apparatus of claim 17, wherein the second network node is an access management function (AMF) node.

24. An apparatus for wireless communication at a first network node, comprising:

one or more memories; and one or more processors, coupled to the one or more memories, configured to cause the first network node to:

provide mobility history data for a user equipment (UE) to a second network node in a disaggregated radio access network (RAN), wherein the mobility history data includes locations of the UE and respective durations corresponding to the locations, and wherein the first network node is configured to operate in the disaggregated RAN; and obtain, from the second network node, updated long-term mobility history data that is based at least in part on the mobility history data, wherein the updated long-term mobility history data comprises UE-specific long-term mobility history data for the UE.

25. The apparatus of claim 24, wherein the second network node is a service management and orchestration (SMO) node.

26. The apparatus of claim 24, wherein the second network node is a RAN intelligent controller (RIC) node.

27. The apparatus of claim 24, wherein, to provide the mobility history data to the second network node, the one or more processors are configured to cause the first network node to:

provide the mobility history data to the second network node in an event report.

28. The apparatus of claim 24, wherein, to obtain the updated long-term mobility history data from the second network node, the one or more processors are configured to cause the first network node to:

obtain the updated long-term mobility history data from the second network node during a radio resource control (RRC) connection setup procedure for the UE.

29. The apparatus of claim 24, wherein, to obtain the updated long-term mobility history data from the second network node, the one or more processors are configured to cause the first network node to:

obtain the updated long-term mobility history data from the second network node during a handover procedure for the UE.

30. The apparatus of claim 24, wherein, to obtain the updated long-term mobility history data from the second network node, the one or more processors are configured to cause the first network node to:

obtain the updated long-term mobility history data from the second network node in a UE context setup message.

31. A method of wireless communication performed at a first network node, comprising:

transmitting mobility history data for a user equipment (UE) to a second network node in a core network associated with a radio access network (RAN), wherein the mobility history data includes locations of the UE and respective durations corresponding to the locations, and wherein the first network node is configured to operate in the RAN; and receiving, from the second network node, a UE mobility prediction model that is based at least in part on the mobility history data, the UE mobility prediction model comprising a UE-specific mobility prediction model for the UE.

32. A method of wireless communication performed at a first network node, comprising:

transmitting mobility history data for a user equipment (UE) to a second network node in a core network associated with a radio access network (RAN), wherein the mobility history data includes locations of the UE and respective durations corresponding to the locations, and wherein the first network node is configured to operate in the RAN; and receiving, from the second network node, updated long-term mobility history data that is based at least in part on the mobility history data, the updated long-term mobility history data comprising UE-specific long-term mobility history data for the UE.

33. A method of wireless communication performed at a first network node, comprising:

providing mobility history data for a user equipment (UE) to a second network node in a disaggregated radio access network (RAN), wherein the mobility history data includes locations of the UE and respective durations corresponding to the locations, and wherein the first network node is configured to operate in the disaggregated RAN; and obtaining, from the second network node, a UE mobility prediction model that is based at least in part on the mobility history data, the UE mobility prediction model comprising a UE-specific mobility prediction model for the UE.

34. A method of wireless communication performed at a first network node, comprising:

providing mobility history data for a user equipment (UE) to a second network node in a disaggregated radio access network (RAN), wherein the mobility history data includes locations of the UE and respective durations corresponding to the locations, and wherein the first network node is configured to operate in the disaggregated RAN; and obtaining, from the second network node, updated long-term mobility history data that is based at least in part on the mobility history data, the updated long-term mobility history data comprising UE-specific long-term mobility history data for the UE.

\* \* \* \* \*